May 30, 1967  R. W. VERGOBBI ET AL  3,322,596
LABELING MACHINE WITH MEANS TO FEED AND LABEL
ARTICLES IN GROUPS
Filed Feb. 19, 1963  36 Sheets-Sheet 1

INVENTORS.
R.W. VERGOBBI
A.C. EVERETT
D.R. EGLES
BY Robert R. Churchill
ATTORNEY

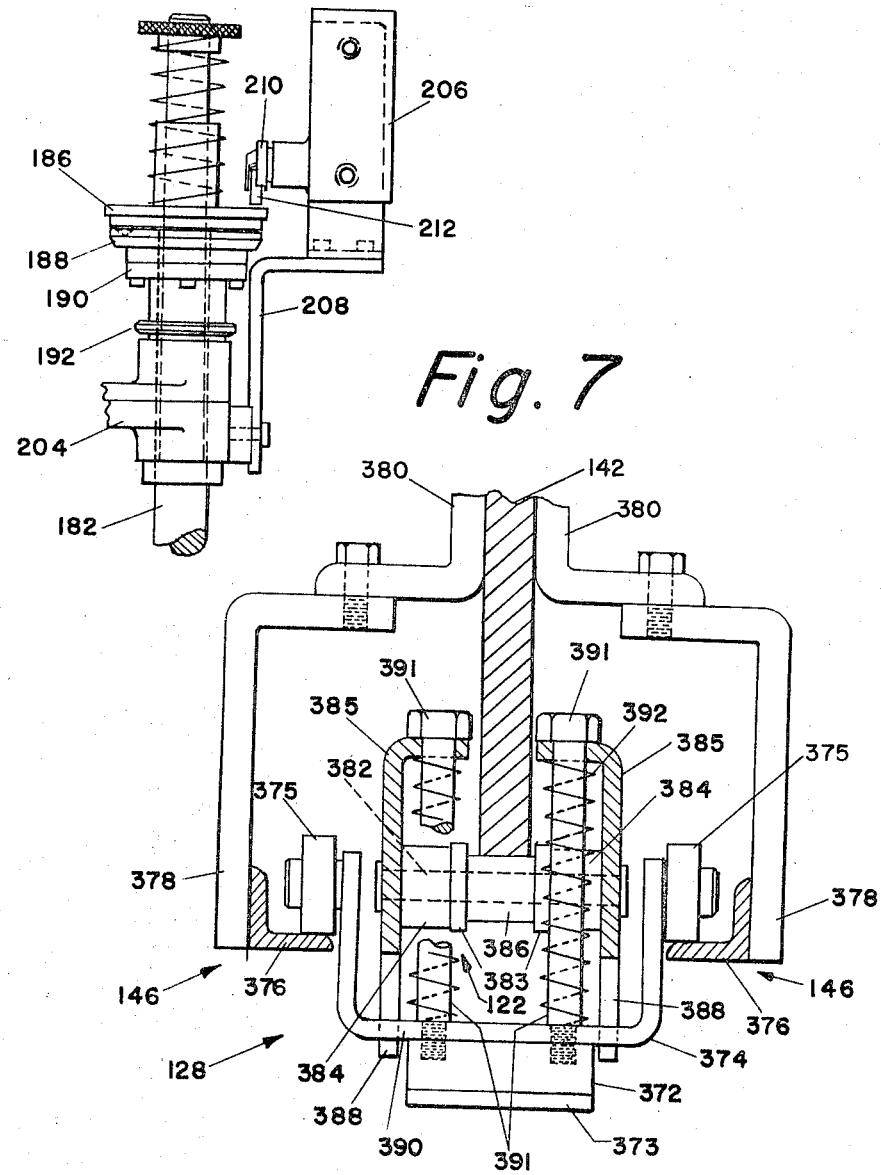

INVENTORS.
R. W. VERGOBBI
A. C. EVERETT
D. R. EGLES
BY Robert H. Churchill
ATTORNEY

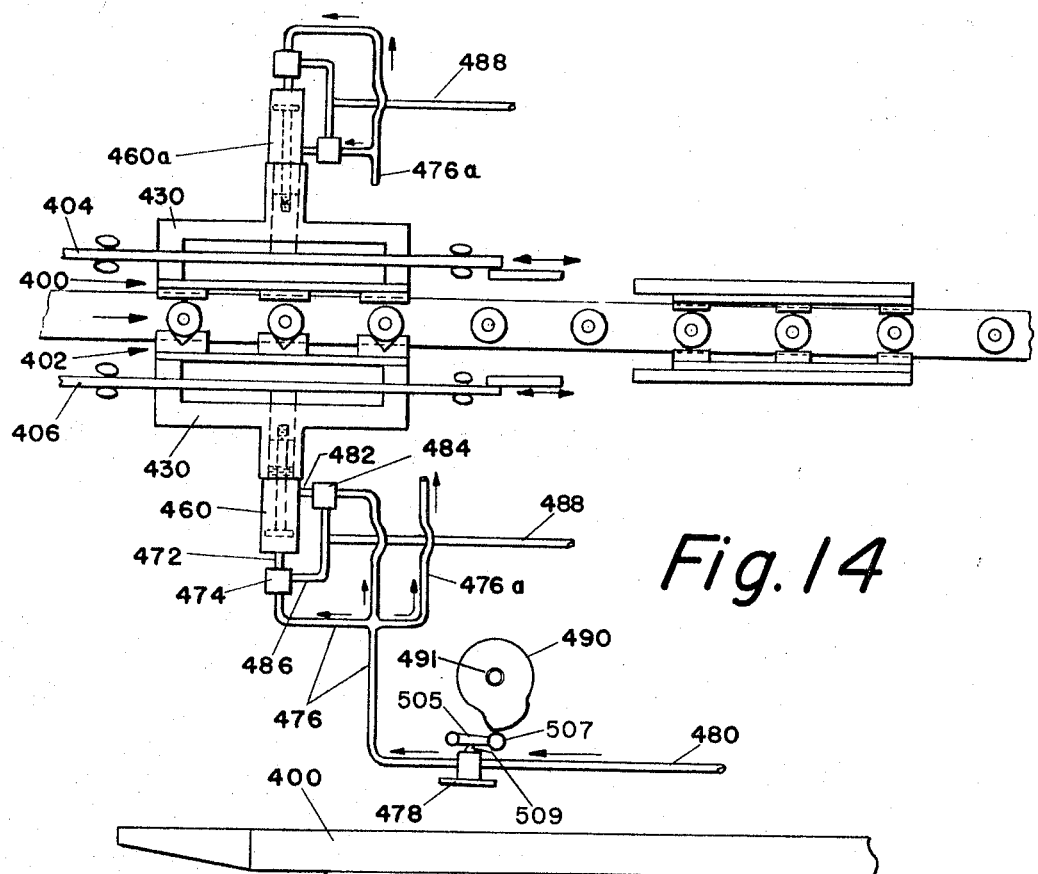
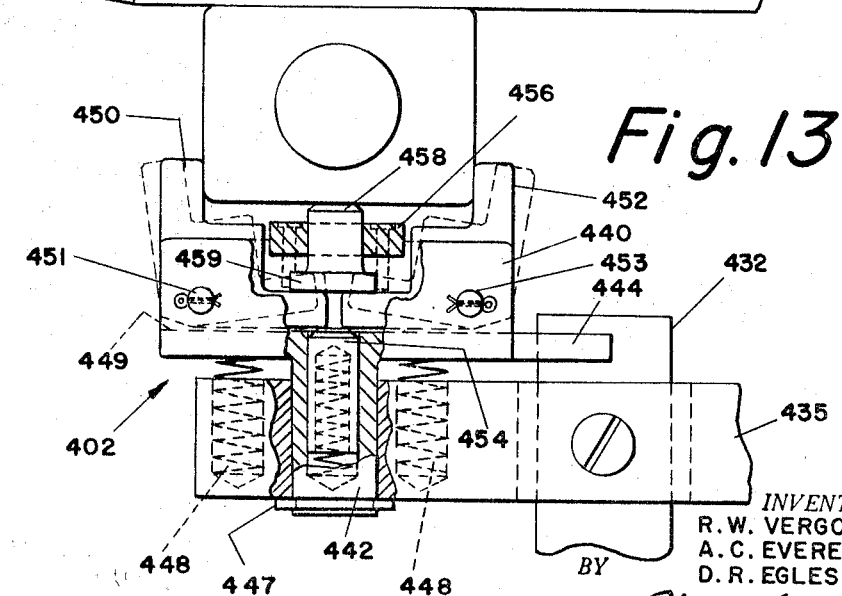

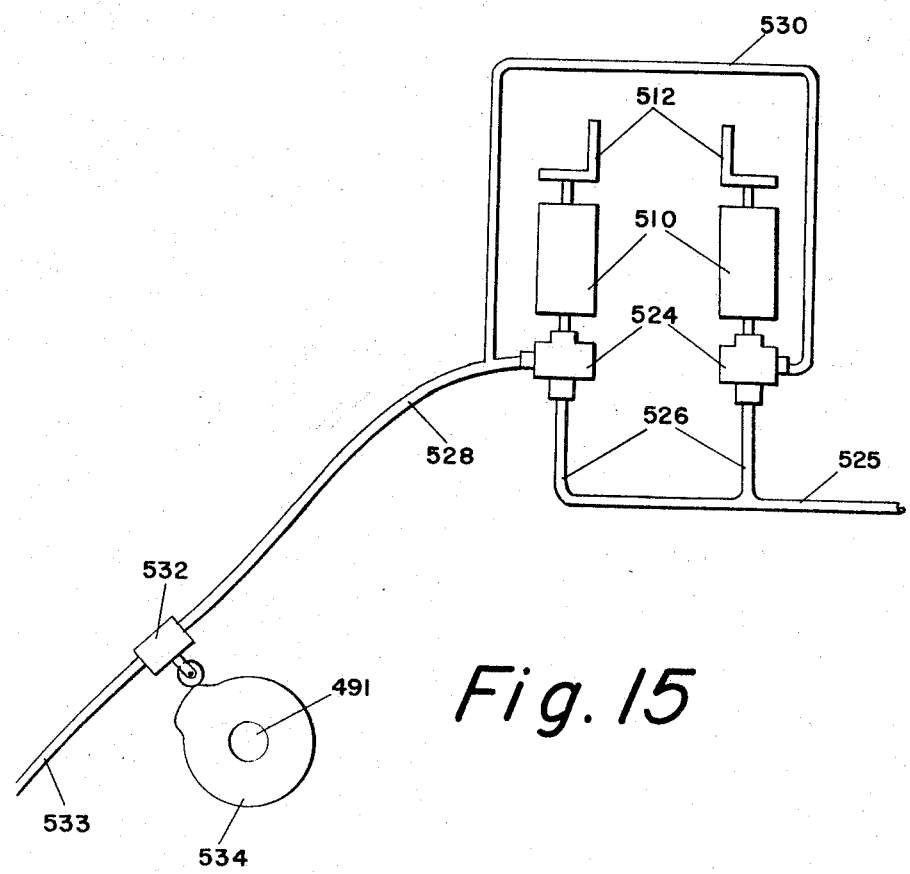

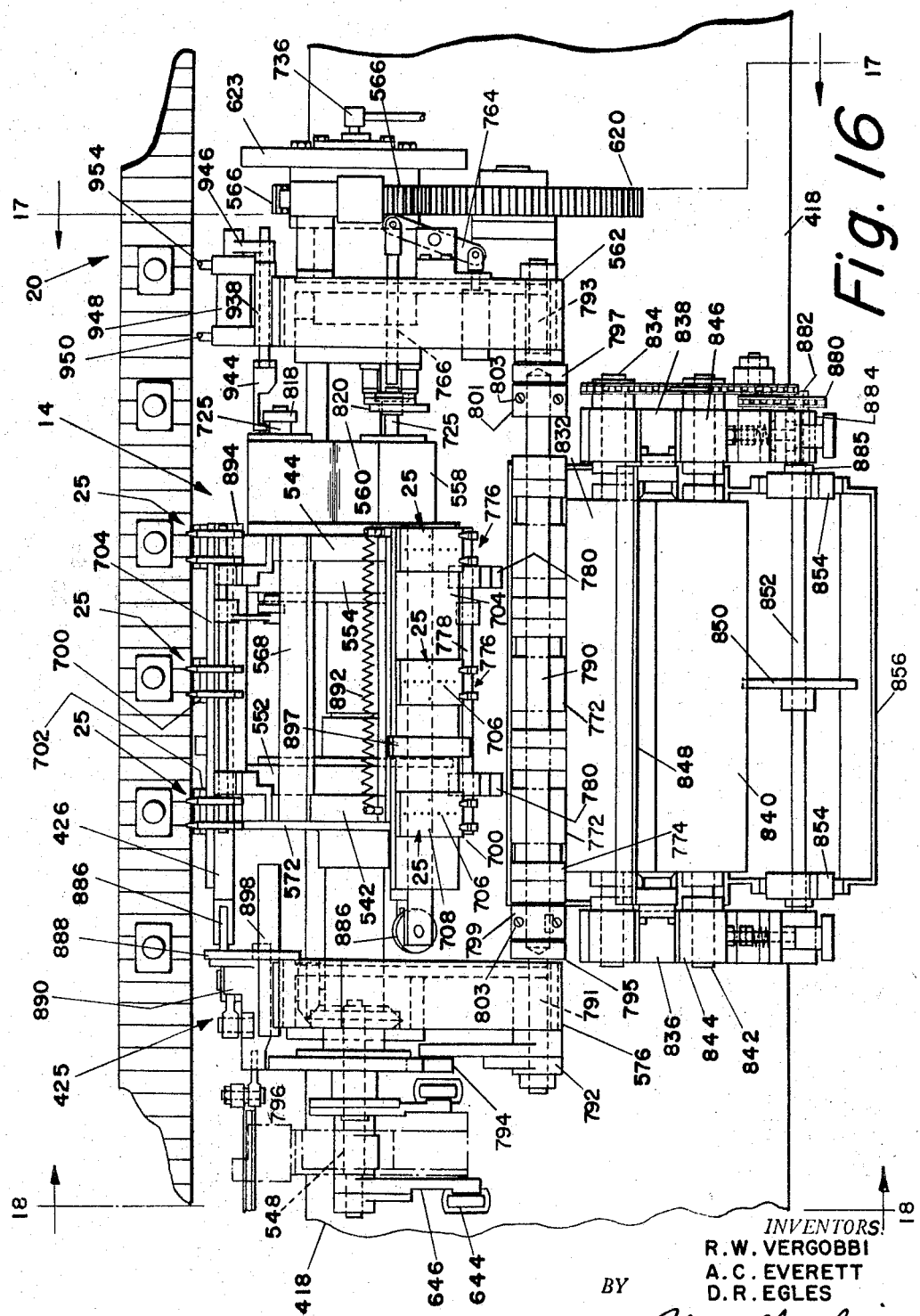

Fig. 17

INVENTORS.
R. W. VERGOBBI
A. C. EVERETT
D. R. EGLES

ATTORNEY

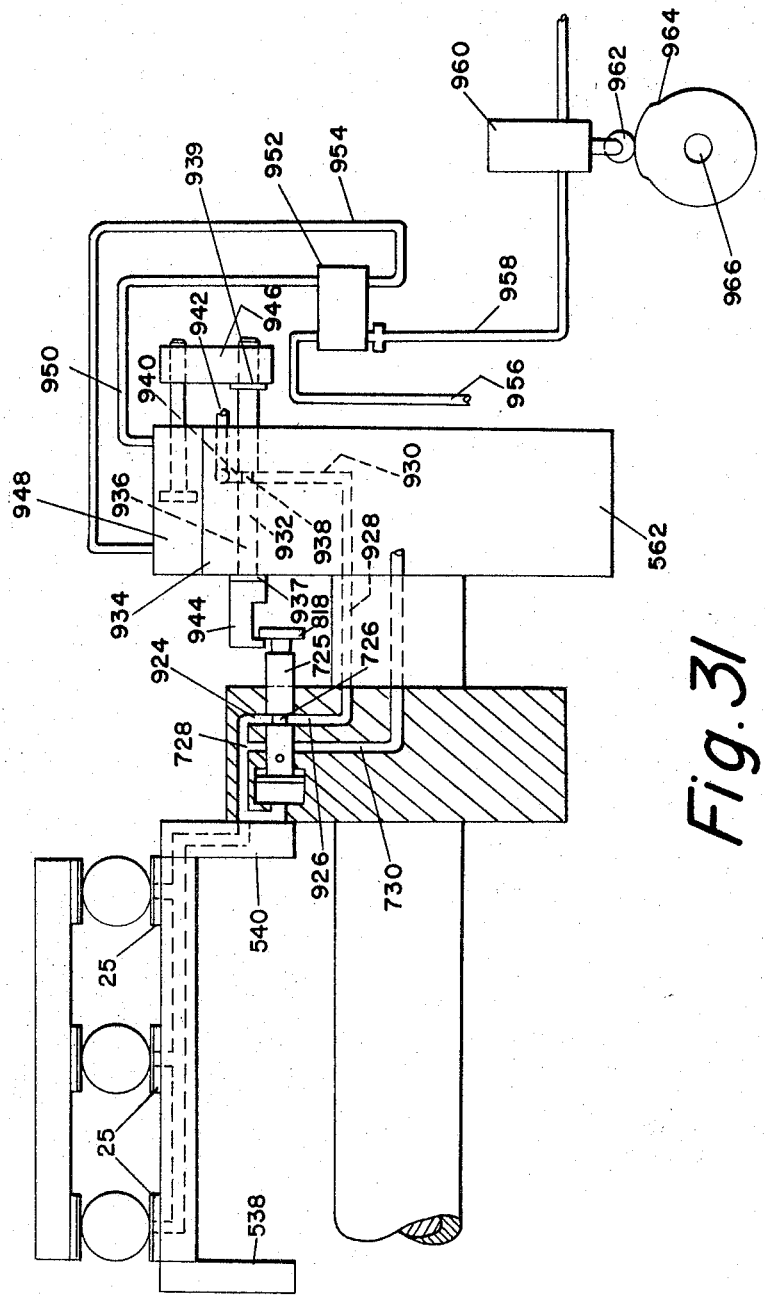

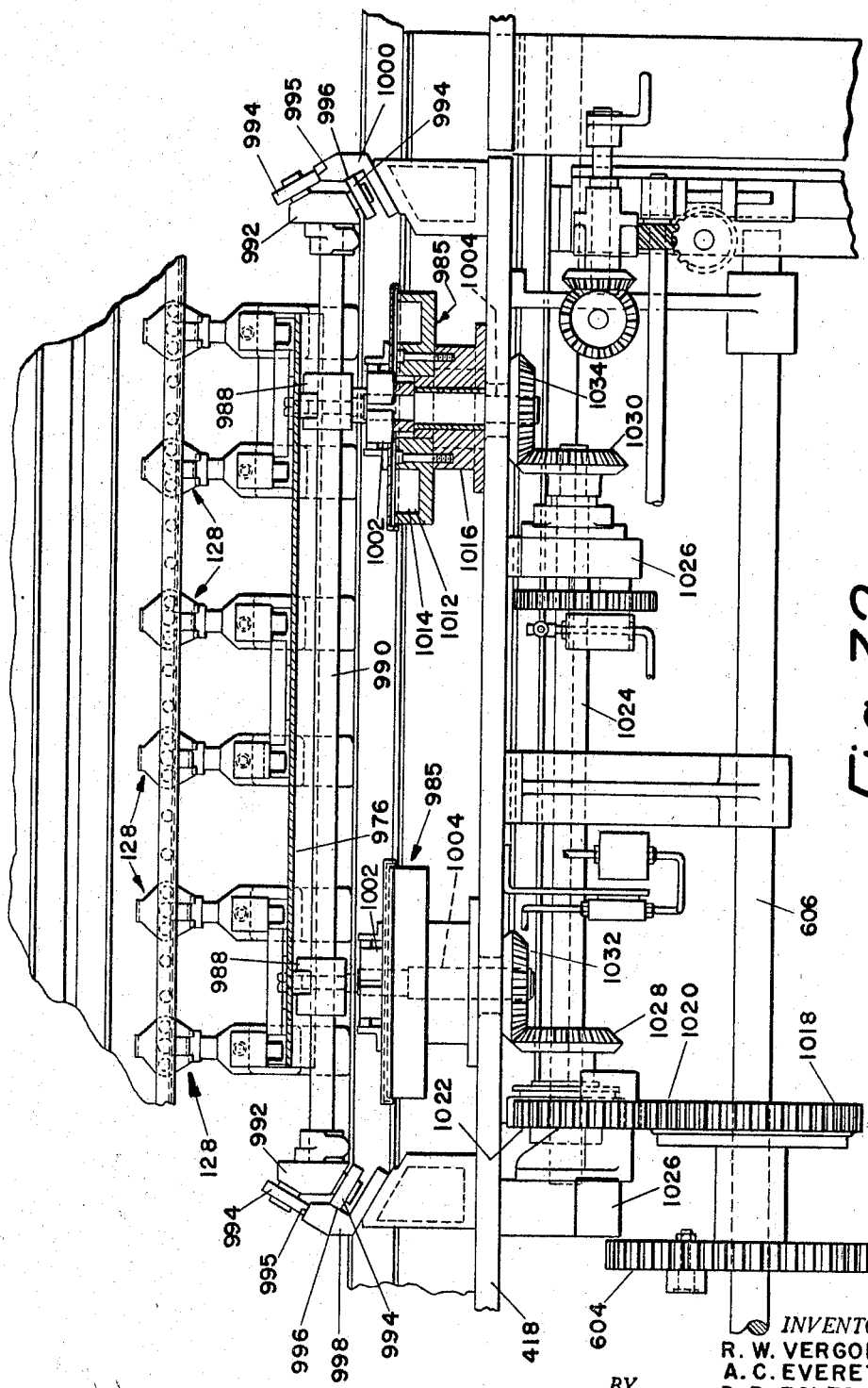

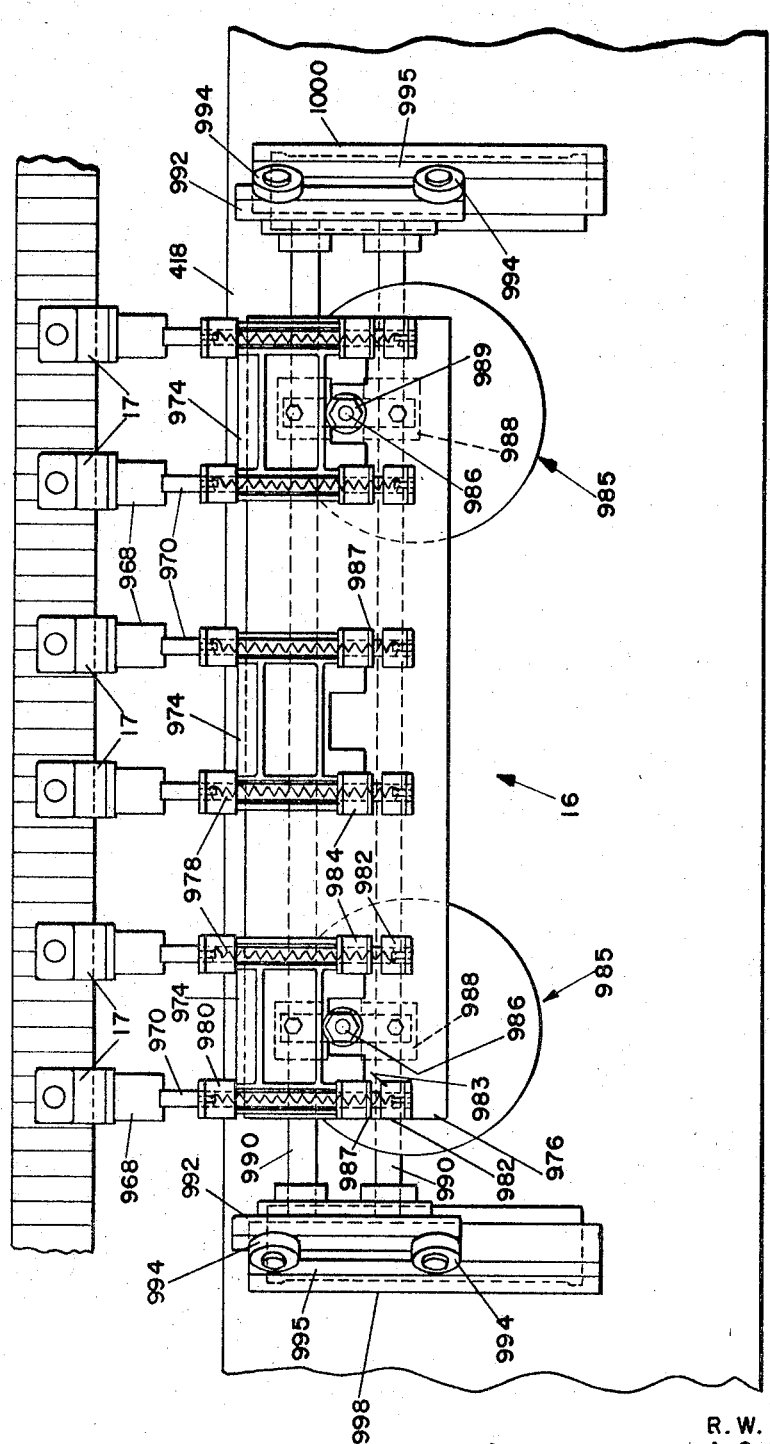

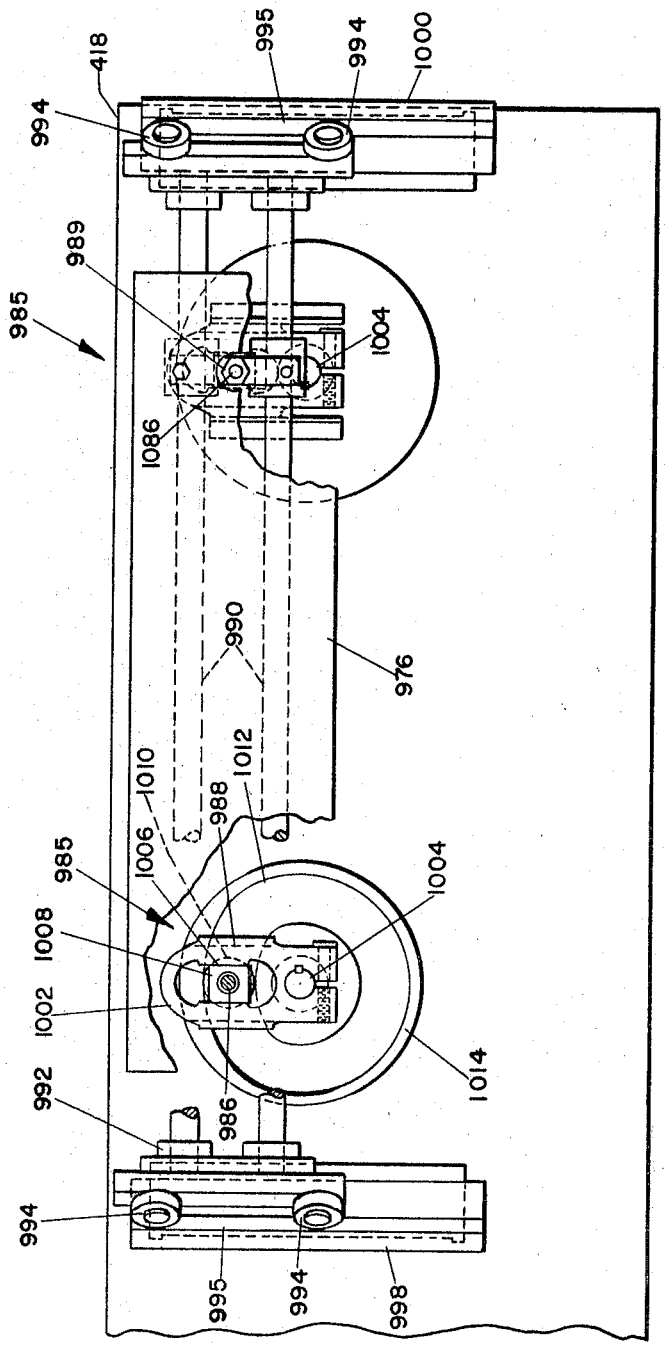

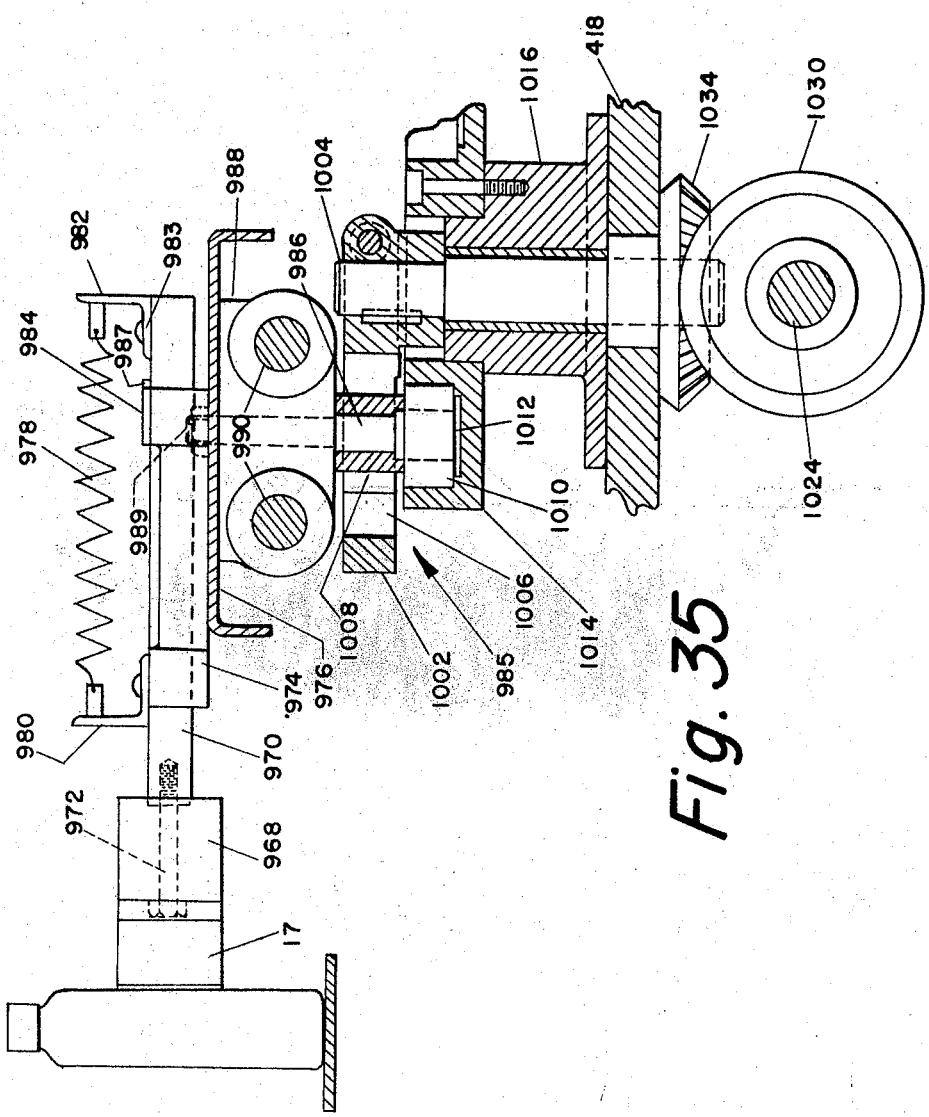

May 30, 1967    R. W. VERGOBBI ET AL    3,322,596
LABELING MACHINE WITH MEANS TO FEED AND LABEL ARTICLES IN GROUPS
Filed Feb. 19, 1963    36 Sheets-Sheet 34

INVENTORS.
R.W. VERGOBBI
A.C. EVERETT
D.R. EGLES
BY
Robert A. Churchill
ATTORNEY

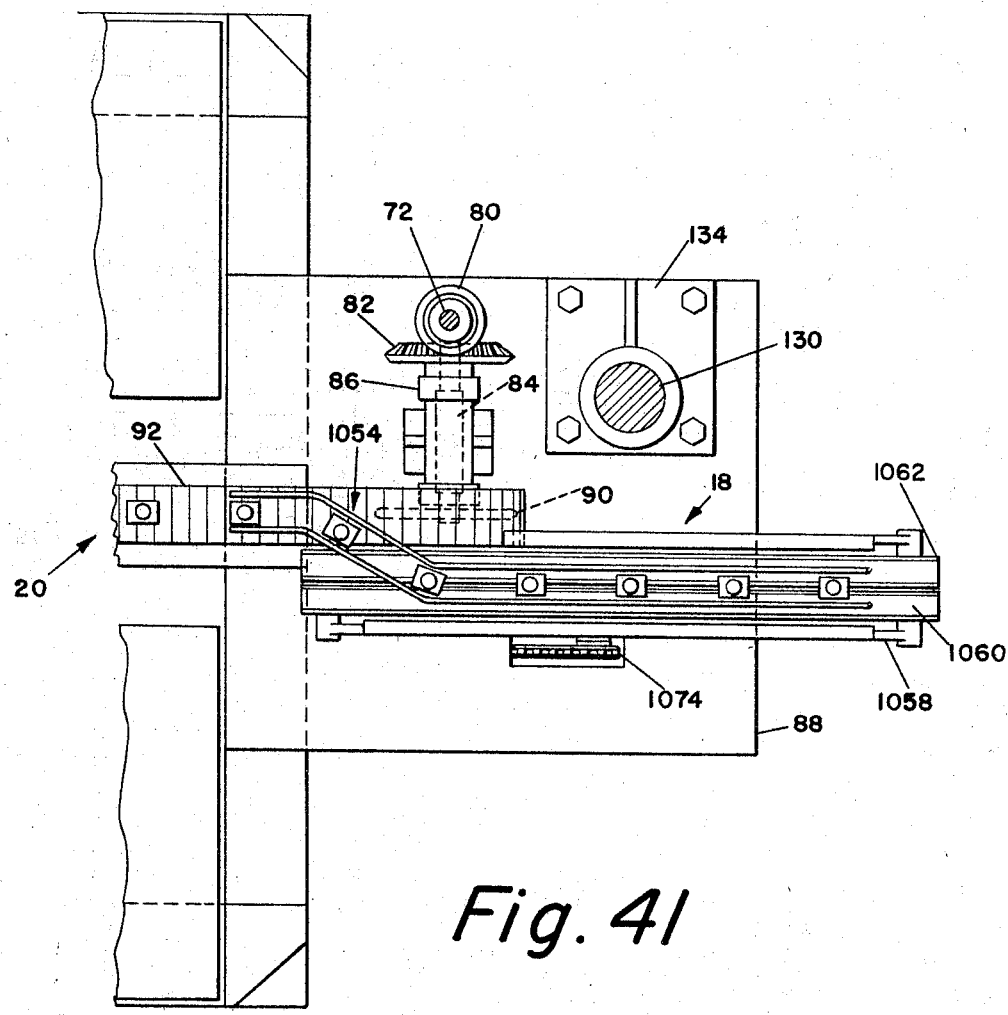

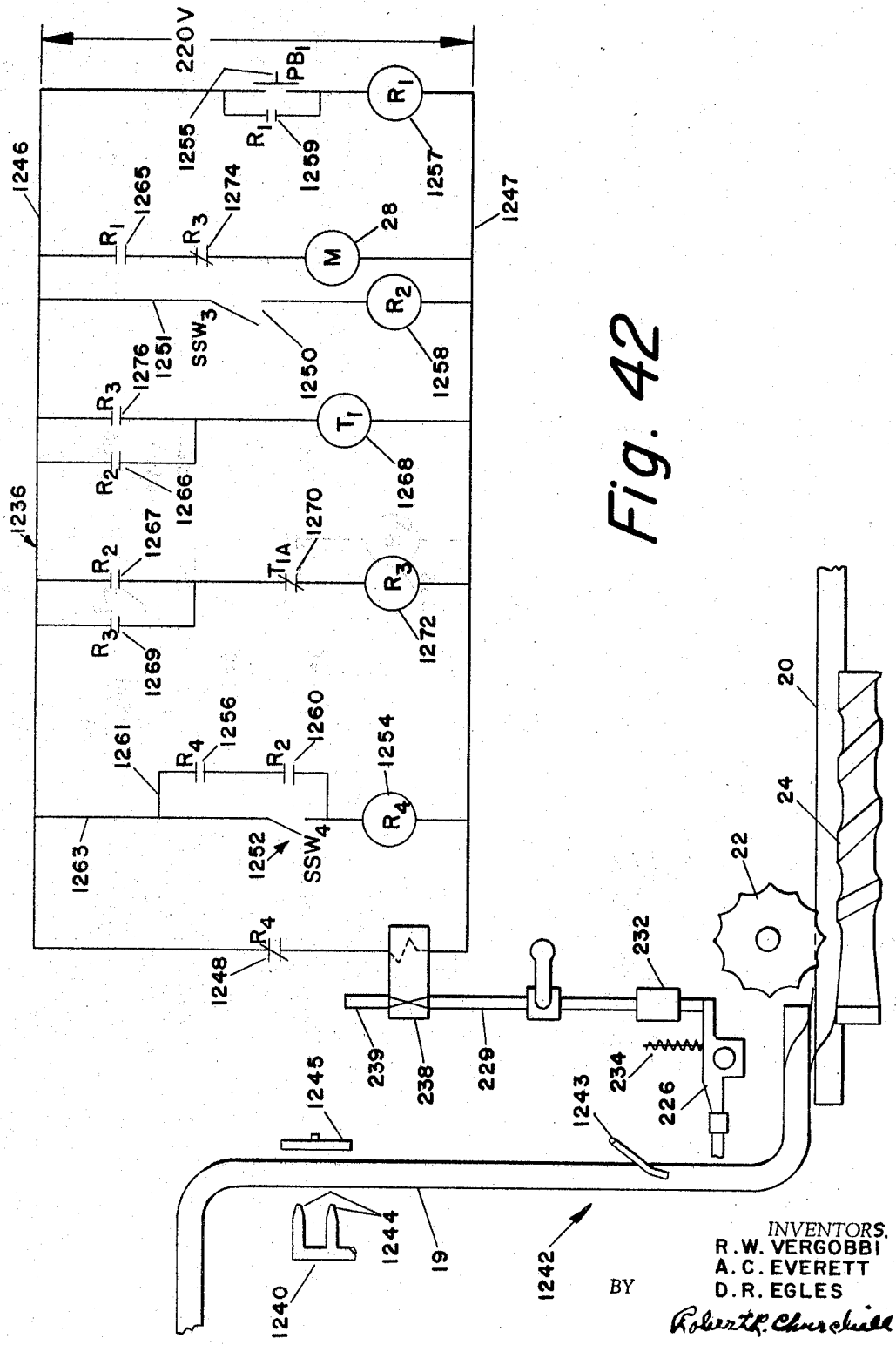

United States Patent Office 3,322,596
Patented May 30, 1967

3,322,596
LABELING MACHINE WITH MEANS TO FEED
AND LABEL ARTICLES IN GROUPS
Robert W. Vergobbi, Braintree, Arthur C. Everett, Wollaston, and Douglas R. Egles, Holbrook, Mass., assignors to Pneumatic Scale Corporation, Limited, Quincy, Mass., a corporation of Massachusetts
Filed Feb. 19, 1963, Ser. No. 259,587
52 Claims. (Cl. 156—363)

This invention relates to a labeling machine.

The invention has for an object to provide a novel and improved labeling machine adapted to apply labels to containers being moved continuously through the machine and which is capable of applying labels to one or both sides of successive groups of containers in a rapid and efficient manner as they are continuously moved through the machine.

Another object of the invention is to provide a novel and improved labeling machine of the character specified operating in successive cycles wherein novel control means is provided for assuring that successive groups of a predetermined number of containers corresponding to the number of bottles to be labeled are fed into the machine each cycle of operation.

A further object of the invention is to provide a novel and improved labeling machine of the character specified having novel control means for coordinating the operation of the machine, being driven at a constant rate of speed, with the incoming supply of containers being supplied at a slightly lower rate of speed.

A still further object of the invention is to provide a novel and improved labeling machine of the character specified having novel container actuated control means for detecting the presence or absence of successive groups of containers for rendering the labeling mechanism inoperative when the absence of a group of containers is detected.

Another object of the invention is to provide a novel and improved labeling machine of the character specified wherein novel control means is provided for rendering the adhesive applying mechanism inoperative in the event that no labels or less than a full set of labels is present on the labeling pads whereby to prevent application of adhesive to the pads.

A still further object of the invention is to provide a novel and improved labeling machine of the character specified having novel crank operated wiping mechanism modified to move the wiping pads through a relatively long, approximately rectilinear path which is substantially parallel to and at the same speed as the containers whereby to maintain a relatively long wiping pressure against the containers during the continuous movement thereof past the wiping mechanism.

With these general objects in view and such others as may hereinafter appear, the invention consists in the labeling machine and in the various structures, arrangements and combinations of parts hereinafter described and particularly defined in the claims at the end of the specification.

In the drawings illustrating the preferred embodiment of the invention:

FIG. 7 is an enlarged detail view of a separable safety connection;

FIG. 8 is a detail view of a bottle top clamping unit;

FIG. 13 is a detail view of a bottle centering unit;

FIG. 14 is a diagrammatic view of pneumatic control mechanism for operating the bottle centering mechanism;

FIG. 15 is a diagrammatic view of pneumatic control mechanism for operating the lifting mechanism associated with the bottle top clamping units;

FIG. 16 is a plan view of the labeling mechanism;

FIG. 17 is a side elevation partly in cross section of the labeling mechanism as viewed from the line 17—17 of FIG. 16;

FIG. 31 is a diagrammatic view of pneumatic control mechanism for releasing the labels from the suction pads and substituting air under pressure in the vacuum line during application of the labels to release the same from the pads;

FIG. 32 is a front elevation of the label wiping mechanism;

FIG. 33 is a plan view of the same;

FIG. 34 is a plan view of the crank mechanism for operating the wiper supporting table, some of the parts being shown broken away and in cross section;

FIG. 35 is a side elevation of the wiping mechanism partly in cross section;

FIG. 41 is a plan view of the discharge conveyer; and

FIG. 42 is a diagrammatic view of a modified form of drive for the bottle intake mechanism.

In general the present invention contemplates a novel and improved labeling machine of the so-called "direct transfer" type exemplified by the labeling machine illustrated and described in the United States patent to Magnusson, No. 2,494,186, issued January 10, 1950, wherein a label withdrawn from a stack thereof by a suction labeling pad and provided with a coating of adhesive is transferred directly to the container, as distinguished from labeling machines wherein the label is handled by intervening elements to effect transfer to the container. The patented labeling machine is arranged to operate intermittently to apply a label to a container advanced into operative relation to the labeling mechanism and brought to rest each cycle of operation.

In accordance with the present invention provision is made for applying labels by the direct transfer method to containers, herein shown as bottles, being continuously moved through the machine, the illustrated machine being provided with a plurality of labeling pads, herein shown as three labeling pads comprising suction pads, arranged to engage and move along with a group of three bottles for a short distance to effect simultaneous application of labels to a group of continuously moving and equally spaced bottles each cycle of operation of the labeling mechanism.

Figure 1:
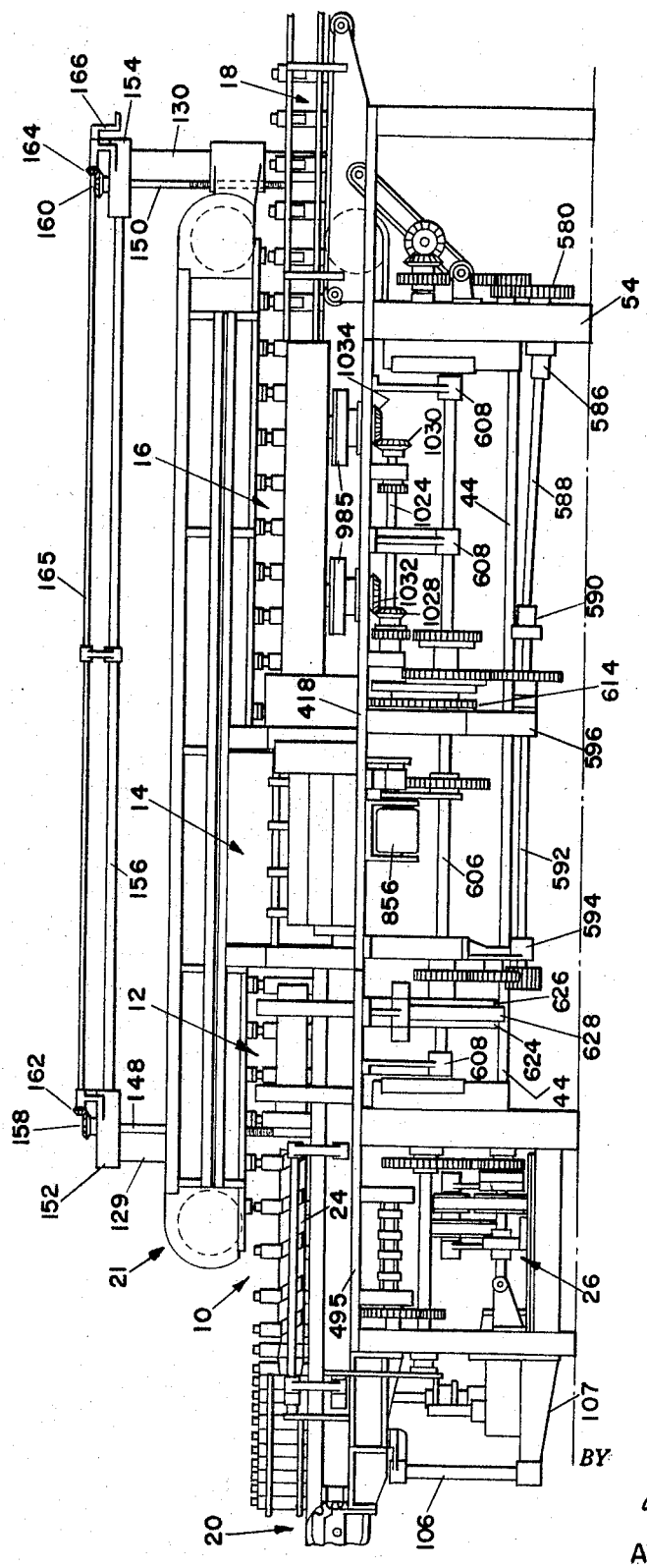
FIG. 1 is a front elevation outline view of a labeling machine embodying the present invention.

Referring now to the drawings, and particularly to FIG. 1, in general the illustrated labeling machine includes a bottle intake mechanism indicated generally at 10 wherein the intake of the bottles is controlled in timed relation to the operation of the labeling mechanism, and wherein the bottles are spaced a predetermined distance apart to conform to the spacing of the labeling pads. Thereafter, the continuously moving bottles are advanced into operative relation to centering and aligning mechanism indicated generally at 12 wherein the bottles are located on the conveyer in accurately centered and aligned position by longitudinally reciprocable bottle engaging elements to assure subsequent accurate registration with the labeling pads. The continuously moving bottles being advanced at a constant rate of speed are then gripped between lower and upper conveyers 20, 21 and advanced into operative relation to the labeling mechanism indicated generally at 14 wherein successive groups of a predetermined number of bottles, herein shown as three bottles, are simultaneously provided with labels by spaced longitudinally reciprocable labeling pads 25. The bottles with their labels are then brought into operative relation to label wiping or pressing mechanism indicated generally at 16 wherein successive groups of three bottles are engaged simultaneously by label wiping pads 17 arranged to firmly press the applied labels to their bottles during the continuous movement thereof. As herein illustrated, the label wiping mechanism includes six label wiping pads 17 so that in operation successive groups of three bottles receive two successive wiping operations whereupon the continuously moving bottles advance to a discharge conveyer 18 to be discharged from the machine.

In the operation of the machine the bottles are fed in an upright position and in contiguous engagement on a supply conveyer 19 leading from a preceding machine, such as a bottle capping machine, and onto the continuously moving lower conveyer 20 of the labeling machine which carries the bottles to a rotary spider or star wheel 22 arranged to control the intake of the bottles in timed relation to the operation of the machine and to present successive bottles to a rotating helical feed screw 24 arranged to space the bottles a predetermined distance apart, herein shown as six inches apart, to conform to the spacing of the labeling pads 25.

Figure 2:
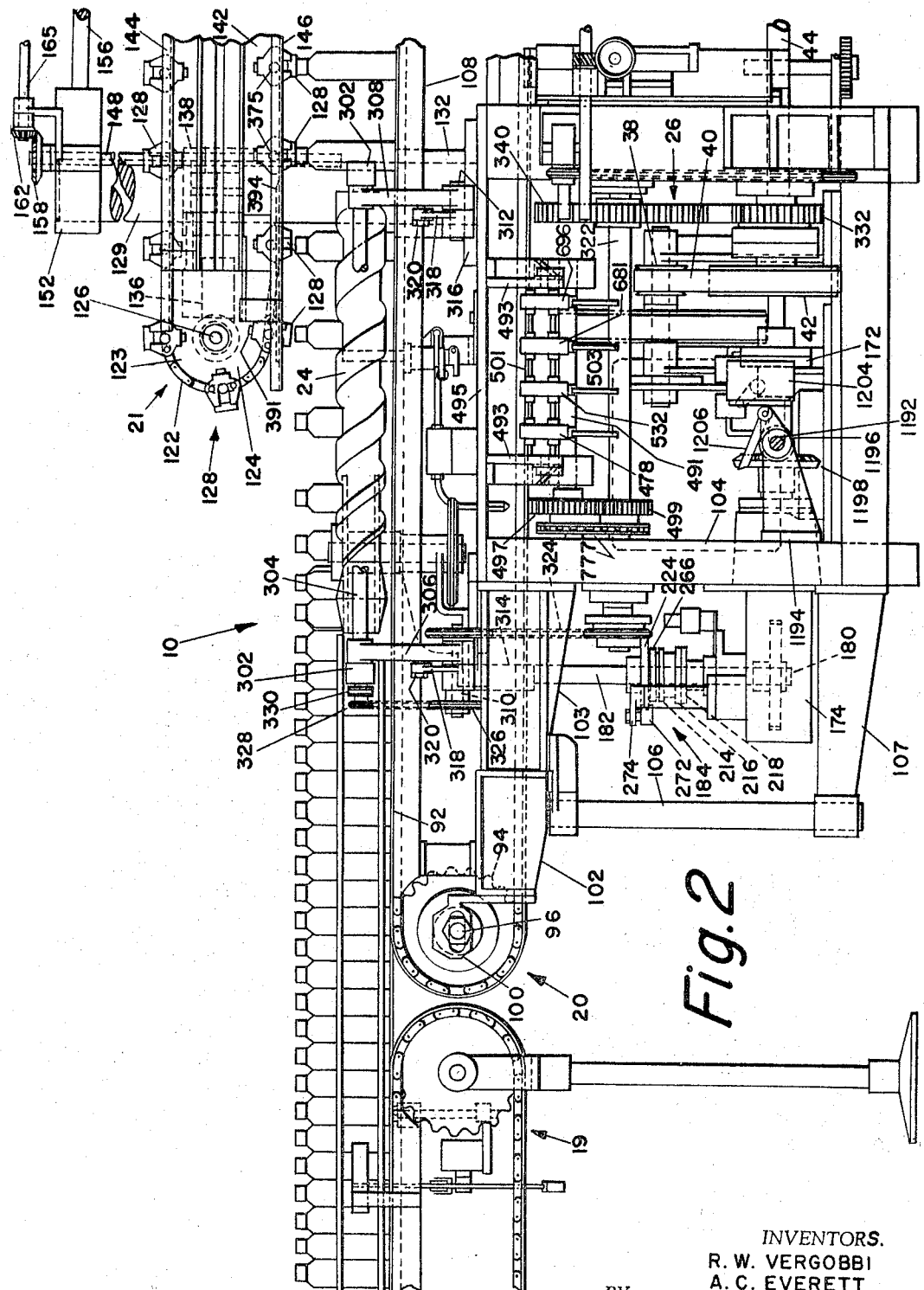
FIG. 2 is a front elevation of a bottle intake and spacing mechanism.
Figure 3:
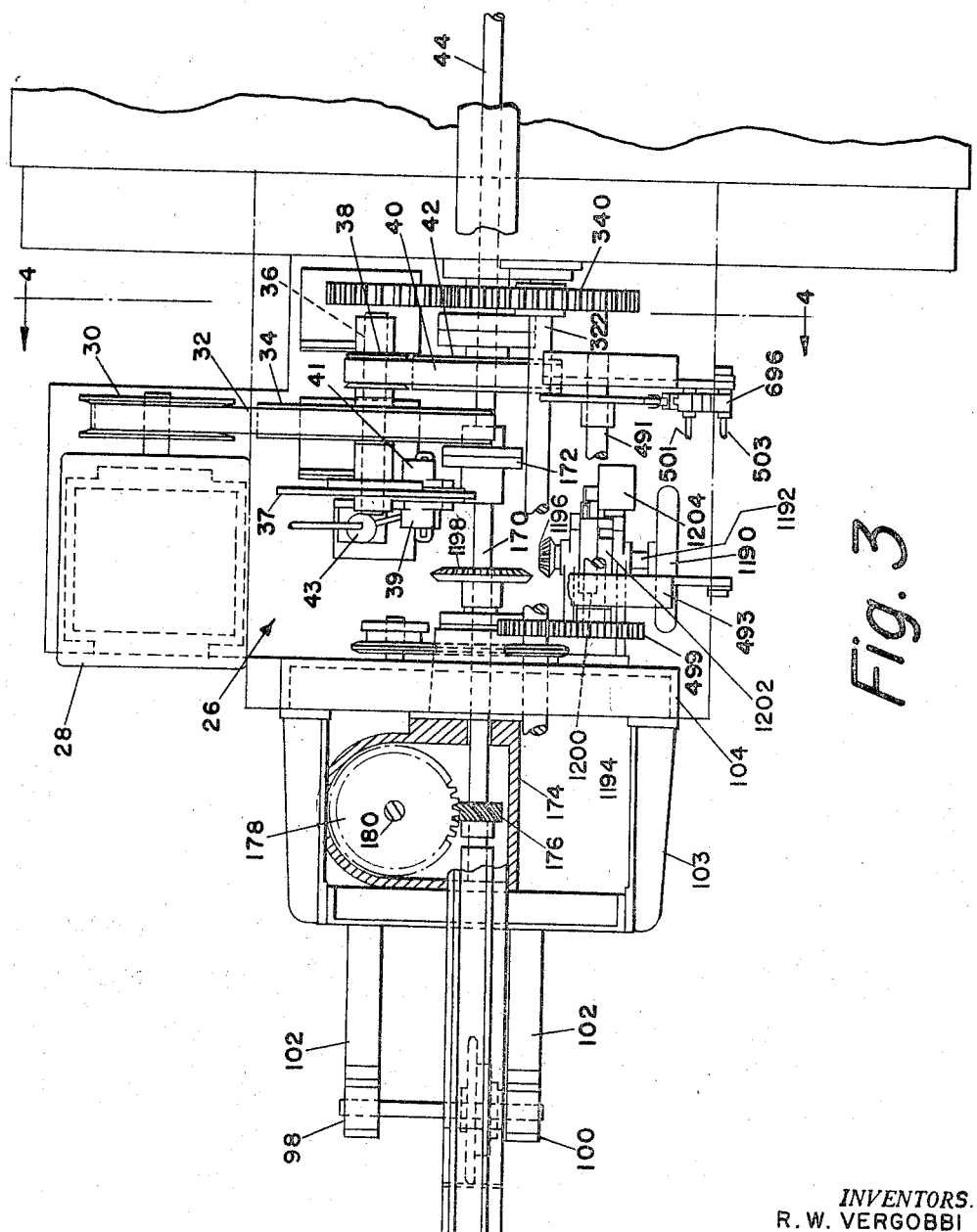
FIG. 3 is a plan view of the bottle intake portion of the machine partly in cross section showing the driving mechanism.

As illustrated in FIGS. 2 and 3, the lower conveyer 20 is arranged to be driven at a constant rate of speed through driving mechanism indicated generally at 26 and which includes an electric motor 28 having a manually adjustable variable drive pulley 30 connected by a belt 32 to a pulley 34 fast on a countershaft 36. A second pulley 38, fast on the countershaft, is connected by a belt 40 to a pulley 42 fast on a main driving shaft 44.

In order to brake the driving connections to a quick stop when the circuit to the motor 28 is opened, the countershaft 36 is provided at one end with a disk 37 fast thereon for cooperation with opposed pneumatically operated braking cylinders 39, 41 which are arranged to grip the disk 37 upon interruption of the motor circuit. The cylinders 39, 41 are connected in an air circuit which includes a solenoid operated valve 43 connected to a source of compressed air. In operation, when the motor circuit is interrupted, the solenoid operated valve 43 is actuated to release the air to the cylinders to effect the braking operation. Upon again starting the motor the braking elements are released.

Figure 39:
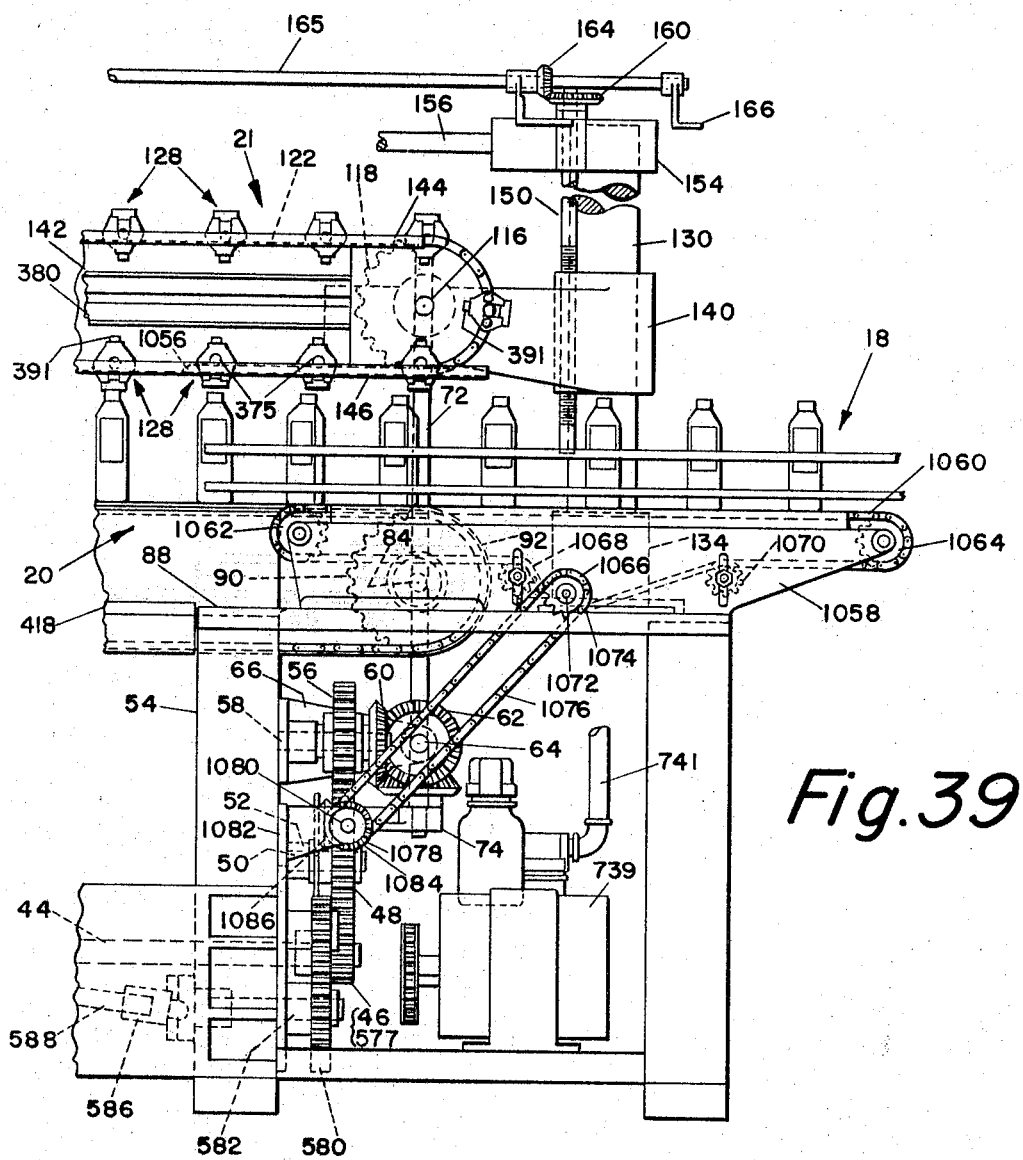
FIG. 39 is a front elevation of the discharge end of the machine.
Figure 40:
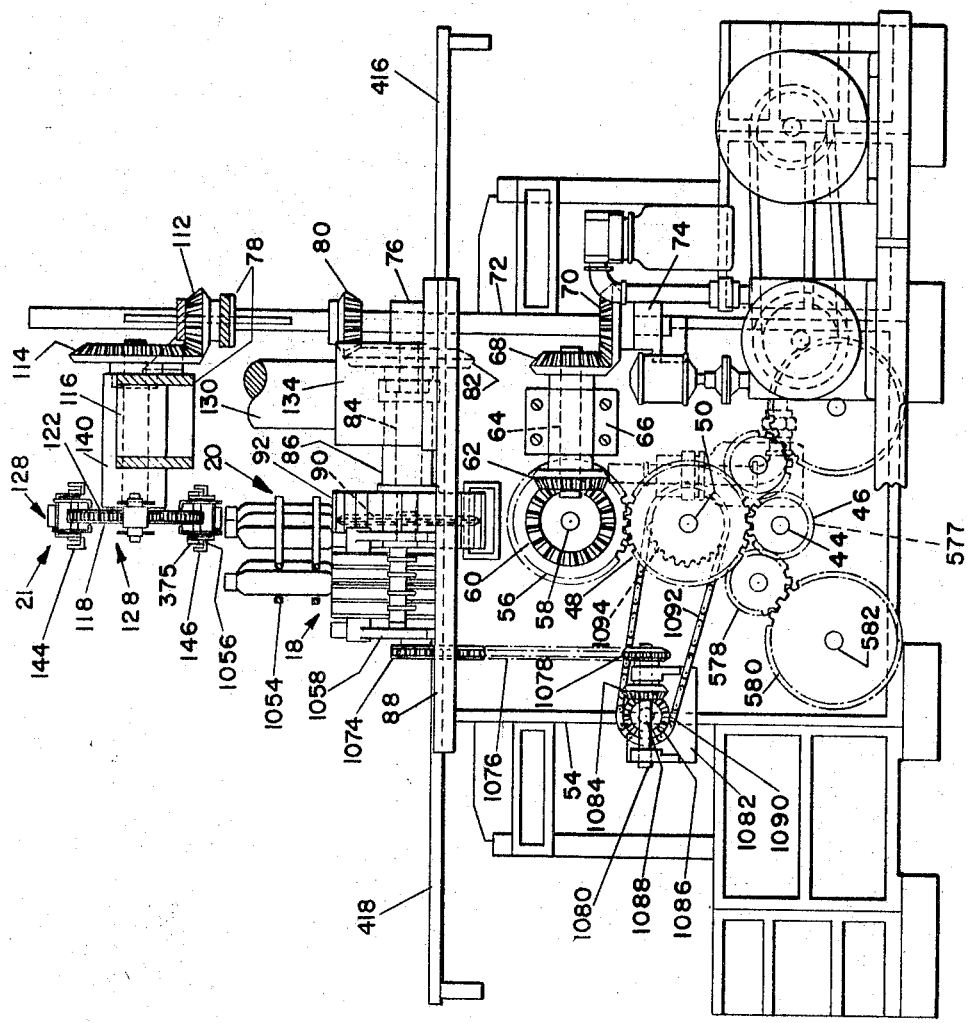
FIG. 40 is an end view of the same.

The motor 28 and the driving connections are located at the entrance end of the machine, and the main driving shaft 44 extends substantially the full length of the machine to the discharge end, at which end the shaft 44 is provided with a pinion 46 in mesh with a gear 48 mounted on a short shaft 50 journaled in a bracket 52 attached to a side frame 54 as shown in FIGS. 39 and 40. The gear 48 is in mesh with a gear 56 mounted on a short shaft 58 similarly supported from the side frame 54. A bevel gear 60 formed integrally with the gear 56 is arranged to mesh with a bevel gear 62 fast at one end of a short shaft 64 journaled in a bracket 66 extended from the side frame 54. The other end of the shaft 64 is provided with a bevel gear 68 fast thereon which meshes with a bevel gear 70 fast on the lower end of a vertical drive shaft 72. The vertical shaft 72 is supported for rotation in a lower bearing bracket 74, an intermediate bracket 76 and an upper bracket 78 and is provided with an intermediate bevel gear 80 fast thereon which is in mesh with a bevel gear 82 fast on one end of a lower conveyer drive shaft 84. The shaft 84 is journaled in a bracket 86 attached to the platen 88 of the machine frame and is provided at its other end with a sprocket 90 fast thereon around which the conveyer chain link belt 92 runs. As illustrated in FIG. 2, the entrance end of the lower conveyer belt 92 is supported on an idler sprocket 94 mounted to rotate on a shaft 96 supported for longitudinal adjustment in spaced slotted brackets 98 and 100. The brackets 98, 100 are connected to intermediate brackets 102 which are attached to a bracket 103 extended from the side frame 104 of the machine. The bracket 103 is further supported by a vertical post 106 between the bracket 103 and a lower bracket 107. In passing through the machine the upper run of the lower conveyer belt 92 is supported on spaced runners 108, and the lower run thereof is similarly supported on spaced runners 110.

As further illustrated in FIG. 40, the vertical drive shaft 72 at the discharge end of the machine is also provided with an upper bevel gear 112 which meshes with a gear 114 fast on a shaft 116 which carries the driving sprocket 118 of the upper conveyer 21 arranged to be driven at the same speed as the lower conveyer 20 and around which a chain 122 of the upper conveyer runs. At the entrance end of the machine, as shown in FIG. 2, the chain 122 runs over the semicircular face 123 of a guide plate 124 which may comprise an extension of a central chain guide plate 142 and through which a short stationary supporting shaft 126 extends. The upper conveyer chain 122 is provided with a series of equally spaced and resiliently mounted bottle top engaging or clamping units indicated generally at 128 which are arranged to engage the tops of successive correspondingly spaced containers to maintain the containers firmly gripped between the upper and lower conveyers during their continuous passage through the machine. It will be observed that the upper conveyer 21 is set forward from the leading end of the lower conveyor 20 and starts at a point adjacent the helical feed screw 24 to engage the tops of the bottles after they are spaced a predetermined distance apart to conform to the spacing of the labeling mechanism.

Figure 5:
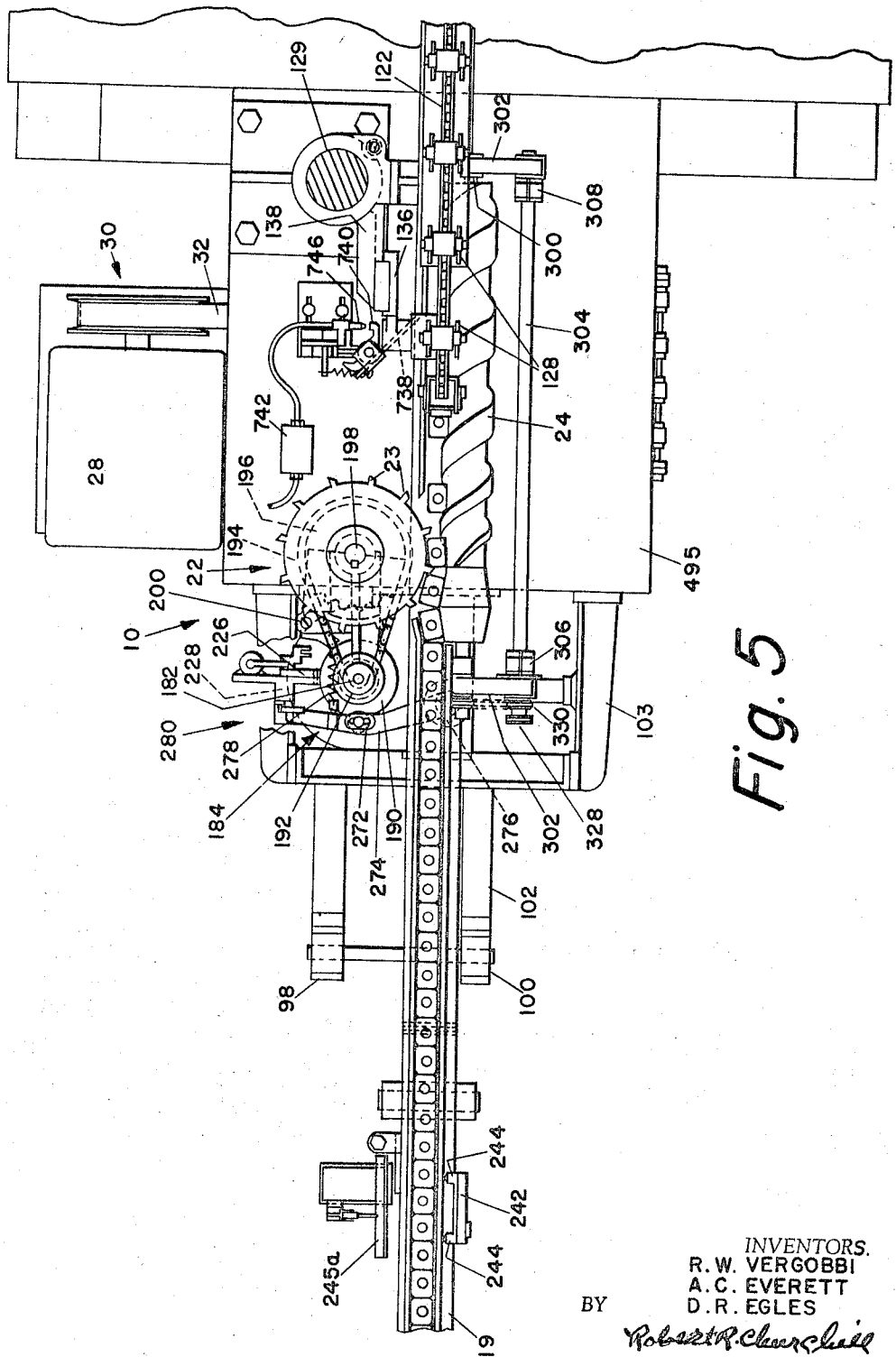
FIG. 5 is a plan view of the bottle intake and spacing mechanism.

As herein shown, the upper conveyer 21 is supported between spaced vertical posts 129, 130 and is mounted for vertical adjustment thereon so as to accommodate bottles of different heights. The lower ends of the posts are seated in pipe flange members 132, 134, respectively, which are attached to fixed platens at each end of the machine. At the entrance end of the machine the guide plate supporting shaft 126 is carried by a bracket 136 secured to and longitudinally adjustable relative to a bracket 138, which latter is mounted for vertical adjustment on the posts 129 as shown in FIG. 5. At the discharge end of the machine, see FIG. 39, the driving sprocket shaft 116 is mounted for rotation in a bracket 140, which latter is mounted for vertical adjustment on the post 130. The central elongated and vertically disposed guide plate 142 extends longitudinally between the guide plate 124 and the driving sprocket 118 and is supported by extensions from the brackets 138, 140. The upper and lower edges of the guide plate 142 serve as guides over which the rollers of the upper and lower runs of the chain 122 are guided. The plate 142 also serves as a support for upper and lower tracks 144, 146 for supporting the resiliently mounted bottle engaging units 128 carried by the chain as will be hereinafter more fully described.

In order to effect vertical adjustment of the upper conveyer 21 on the supporting posts 129, 130, each bracket 138, 140 is provided with a threaded opening arranged to receive threaded rods 148, 150 mounted for rotation in upper brackets 152, 154 secured to the upper ends of their respective posts 129, 130. The upper brackets 152, 154 are connected together by an elongated tie rod 156 extended therebetween. The upper ends of the threaded rods 148, 150 are provided with bevel gears 158, 160 which are in mesh with bevel gears 162, 164, respectively, fast on an enlongated shaft 165 mounted for rotation in bearings carried by the upper brackets 152, 154. A handle 166 may be provided on an extension of the shaft 165 to effect manual adjustment vertically of the upper conveyer 21 through the connections described. The brackets 138, 140 may then be clamped to their respective supporting posts in their adjusted position. As illustrated in FIG. 40, the upper bevel gear 112 is slidingly keyed to the upper end of the vertical drive shaft 72 at the discharge end of the machine so as to permit raising and lowering of the driving connections relative to the drive shaft 72 during the adjusting operation.

Figure 6:
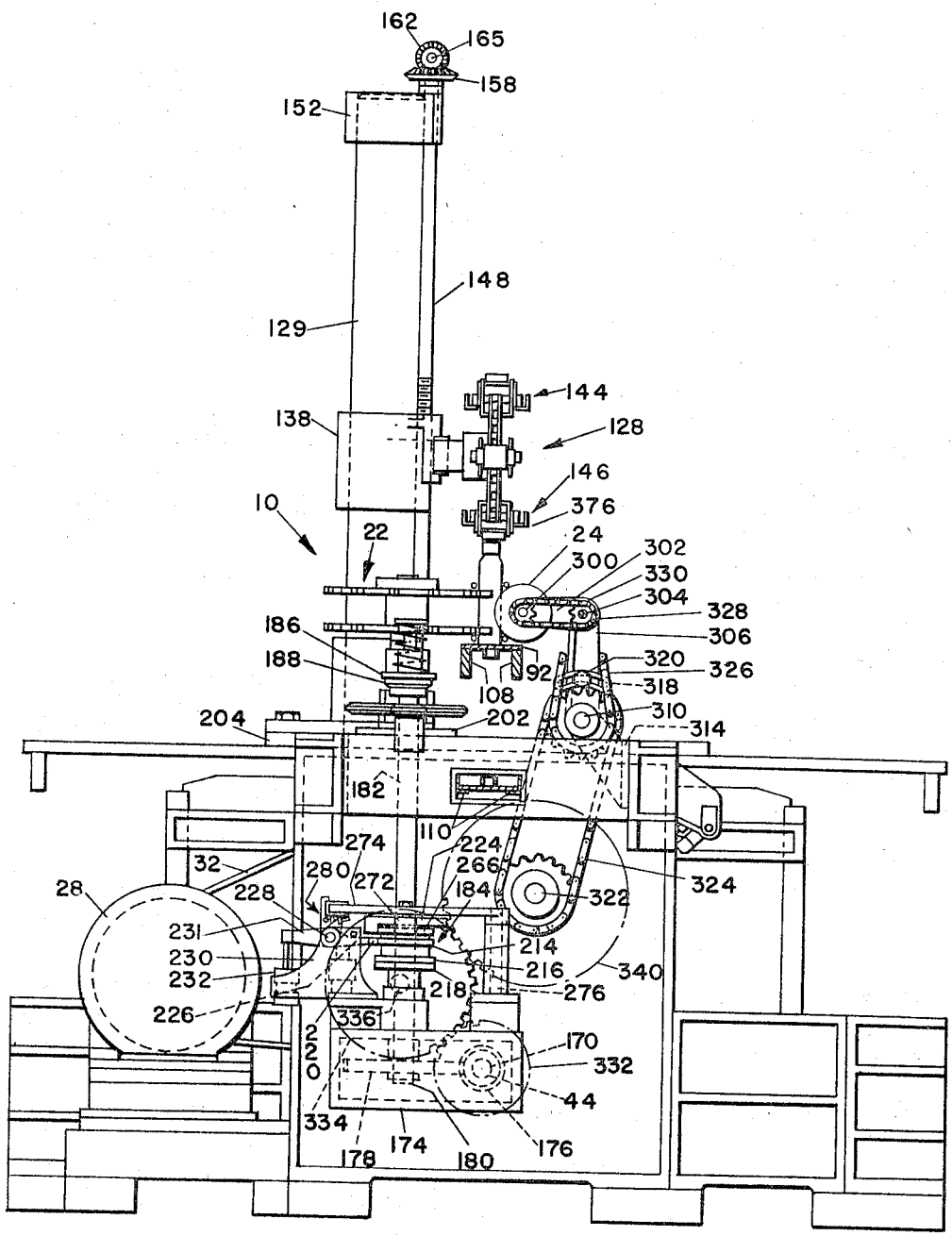
FIG. 6 is an end view of the bottle intake and spacing mechanism shown partly in cross section.

In operation the filled and closed bottles are delivered to the lower conveyer 20 in contiguous engagement by the supply conveyer 19 leading from a bottle closure applying machine or other source of supply. Successive bottles arranged in a solid line are engaged and separated by the teeth 23 of the rotary spider 22 to control the timed release of the bottles into the helical groove at the entrance end of the continuously rotated feed screw 24. As herein shown, the rotary spider 22 is provided with twelve teeth and is arranged to be rotated through connections from the main driving shaft 44. As illustrated in FIG. 3, a shaft 170 is connected to the end of the shaft 44 by a coupling 172. The shaft 170 extends into a gear box 174 and is provided with a worm 176 which meshes with a worm gear 178 fast on the lower end of a vertical shaft 180. A second shaft 182 arranged in axial alignment with the shaft 180, as seen in FIG. 2, is connected to rotate with the latter by a normally engaged one-revolution clutch, indicated at 184, to be hereinafter more fully described. As shown in FIGS. 6 and 7, the upper end of the shaft 182 is provided with a downwardly spring pressed disk 186 slidingly keyed thereto and which is provided with a conical projection arranged to fit into a correspondingly shaped recess formed in a disk 188 providing a normally engaged separable driving connection between the shaft 182 and the disk 188. The disk 188 is connected to a flanged hub 190 loosely mounted on the shaft 182 and has a sprocket 192 formed integrally therewith. The sprocket 192 is connected by a chain 194 to a sprocket 196 fast on a shaft 198 to which the rotary spider 22 is interchangeably keyed.

As herein shown, the spider shaft 198 is mounted for rotation in a bracket 200 which is pivotally mounted on the shaft 182 in a manner such as to permit arcuate adjustment of the bracket 200 and the spider carried thereby toward or from the feed screw 24 to accommodate bottles of different cross sectional shapes and dimensions. The base 202 of the bracket 200 rests on and is adjustably secured to a stationary support 204 extended between the shaft 182 and a portion of the frame of the machine.

It will be seen that in operation the spring pressed separable connection 186, 188 is normally engaged to effect continuous rotation of the spider 22 and comprises a safety connection adapted to be automatically disengaged in the event of a jam of a bottle between the spider and the helical feed screw. In operation, in the event of a jam, the conical projections in the disk 186 will ride up out of the recesses in the disk 188 so as to prevent possible breakage of the bottles or damage to the machine parts. Provision is also made for detecting such an occurrence and to discontinue operation of the machine when a jam occurs and, as herein illustrated, a microswitch 206, supported by a bracket 208 attached to the stationary member 204, is provided with a switch arm 210 carrying a roller 212 in engagement with the upper surface of the disk 186 so that when the latter moves upwardly, indicating that a jam has occurred, the arm 210 will be rocked to operate the switch 206 which may be included in the motor circuit to stop the driving motor 28.

The driving connections thus far described are arranged to rotate the twelve-tooth spider at a rate such as to release successive containers into the helical groove at the entrance end of the feed screw 24 in timed relation to the labeling operation. As hereinbefore stated, the present machine is adapted to apply labels to bottles in groups of a predetermined number, herein shown as in groups of three, and is driven through the variable speed drive so as to maintain a constant speed to provide a production capacity of from a minimum of about 100 bottles a minute to a maximum of about 300 bottles a minute, depending on the size of the bottles and other limiting factors. Such constant speed may be varied by manual adjustment of the variable speed driving connections 30. Assuming that in the illustrated machine a productive capacity of 300 bottles a minute is desired to be maintained, the main drive shaft 44 is rotated at 300 r.p.m. The driving connections from the shaft 44 to the twelve-tooth spider is first reduced 3 to 1 through the worm gear drive 176, 178 to rotate the drive sprocket 192 at 100 r.p.m. and is further reduced in the ratio of 4 to 1 through the chain and sprocket drive 194, 196. Thus, for each three revolutions of the main drive shaft 44, the drive sprocket 192 will be rotated one revolution, and each revolution of the drive sprocket 192 will rotate the twelve-tooth spider one quarter of a revolution to release three bottles.

In order to assure that the bottles are released in groups of three only, so as to conform to the number of labeling pads, provision is made for detecting the absence of bottles or a slowdown in the supply of bottles being delivered on the intake conveyer 19, as evidenced by any gap or separation between the solid line of bottles at a point remote from and preceding the intake spider 22, and when such a gap is detected provision is made for disconnecting the drive to the sprocket 192 through the one-revolution clutch 184. Since each one revolution of the sprocket 192 effects a one-quarter rotation of the spider to release three bottles, it will be seen that this expedient will prevent stopping of the spider in any position other than on a quadrant of 90° so as to release three bottles before it comes to rest. It will also be seen that the provision for maintaining a solid line of bottles to the spider at all times assures release of the bottles in groups of three for each cycle of operation of the labeling mechanism and thus completely eliminates any control problems which might otherwise be encountered if only one or two bottles were released by the spider during a cycle of operation.

The one-revolution clutch may be of a conventional type wherein the driving member includes a ratchet indicated at 214 formed integrally with a flanged hub 216 connected for rotary adjustment with a second flanged hub 218 keyed to the upper end of the shaft 180 as shown in FIG. 6. The driven member of the one-revolution clutch comprises a spring pressed pawl 220 pivotally mounted in a pawl carrier 224 keyed to the shaft 182. A pawl stop 226 arranged to engage the tail of the pawl 220 to disengage the same from its ratchet 214 is mounted fast on a shaft 228 journaled in a bracket 230 secured to the gear box 174. An arm 231, also fast on the shaft 228, is arranged to cooperate with the piston of an air cylinder 232 forming a part of an air circuit 229, see FIG. 9, arranged to be controlled by the detecting mechanism. The pawl 220 is normally in driving engagement with its ratchet, and the pawl stop 226, which is urged into the path of the pawl by a spring 234, is normally held out of the path of the pawl by the air cylinder 232.

Figure 9:
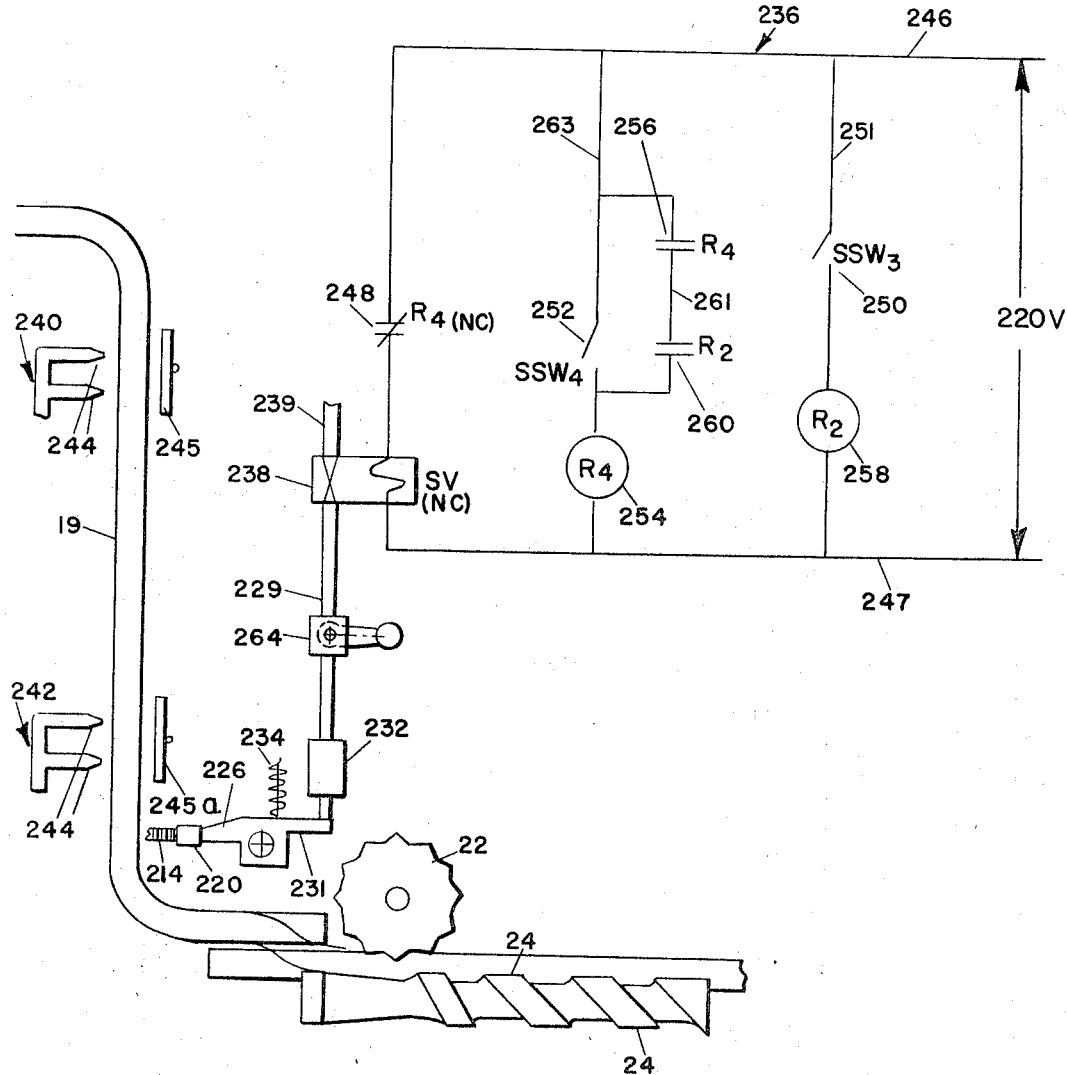
FIG. 9 is a diagrammatic view of control mechanism associated with the bottle intake mechanism.

As diagrammatically illustrated in FIG. 9, the control mechanism comprises an electrical circuit indicated generally at 236 which includes a normally closed solenoid valve 238 which is also included in the air circuit 229 for controlling the passage of air from a supply pipe 239 to the air cylinder 232. The detecting mechanism includes a pair of spaced sensing devices 240, 242 arranged along the supply conveyer 19 and which are operative to detect a gap in the line of bottles being delivered to the intake spider 22 and the helical feed screw 24. Each sensing device comprises a plurality of, herein shown as a pair, spaced air jets 244 arranged to project streams of air across the path of the bottles on the conveyer 19 and vanes 245, 245a, respectively, arranged to be moved by the air streams in the event that a gap is present in the line of bottles. The presence of a solid line of bottles on the conveyer will deflect the air so that the vanes will not be moved. Under normal operating conditions, when the conveyer 19 is provided with a solid line of bottles, the normally closed solenoid valve 238 is energized through leads 246, 247 and through a normally closed contact 248 to open the valve 238 and permit air to pass to the cylinder 232, thus holding the pawl stop 226 out of the path of the pawl 220 and permitting the same to remain in driving engagement with its ratchet 214.

In operation the labeling machine, including the spider 22 and the feed screw 24, is arranged to run slightly faster than the rate at which the bottles are delivered by the supply conveyer 19 so as to prevent a jam of the bottles between the preceding machine in the line and the labeling machine. Thus, in practice the intake spider 22 is arranged to be automatically stopped in response to the absence of bottles or a slowdown in the supply of bottles being delivered in the intake conveyer 19 as evidenced by a gap in the solid line at the sensing stations 240, 242 to wait for the line to become replenished. In order to prevent too frequent or excessive stopping and starting of the intake spider as the bottles are being consumed at a faster rate than they are supplied, the space between the two sensing stations 240, 242 provides a reservoir of bottles from which the labeling machine can draw for a short time before the spider is brought to rest to wait for the line of bottles to again close up in contiguous engagement. It will be understood that the bottles are usually delivered from a preceding machine in spaced relation and form a solid line when the foremost bottle in the line is arrested by engagement with the stationary intake spider.

The passage of a single bottle or successive spaced bottles past the spaced jets 244 at either of the sensing devices 240, 242 will not deflect the air from its vane 245, 245a, respectively, to effect starting of the intake spider because the spacing of the individual jets 244 of a pair at each sensing device is greater than the width of a bottle moving therepast so that one or the other of the pair of jets will act on its single vane until a solid line is built up to deflect the air from both jets at each station.

As diagrammatically illustrated in FIG. 9, when the vanes 245 and 245a are rocked by the air streams in the absence of bottles on the supply conveyer, vane 245 at station 240 will close a switch 250 in a parallel line 251 to energize relay 258. Relay 258 will effect closing of normally open contact 260 in holding line 261 of a second parallel line 263. Vane 245a at station 242 will close a switch 252 in line 263 to energize relay 254 to close normally open contact 256 in the holding line 261 and to open the normally closed contact 248, thus deenergizing the solenoid valve 238 to cut off the air to the cylinder 232 and permitting the pawl stop 226 to be rocked by its spring 234 into a position to maintain the spider at rest.

When the bottles are initially fed to the labeling machine in spaced relation as delivered from a bottle filling machine, for example, the foremost bottle will come to rest at the spider 22 while the latter is at rest. Thereafter, as the bottles fill up the line in back of the foremost bottle, the line will first close off the air at station 242, and as a result the vane 245a will return to its normal position. This movement of vane 245a will effect opening of switch 252. However, relay $R_2$ remains energized through closed switch 250, and relay 254 remains energized through the holding line 261 so that the normally closed contact 248 will remain open, and the spider will remain at rest. Thereupon, the incoming bottles will fill up the reservoir between the sensing devices 242, 240, and when the bottles accumulate to an extent such as to cut off the air from jets 244 at station 240 the vane 245 will return to its normal position to open switch 250. As a result relay 258 will be deenergized, opening the normally open contact 260 in the holding line which in turn deenergizes relay 254. This will open normally open contact 256 in the holding line and permit normally closed contact 248 to close to energize solenoid valve 238 and permit it to pass air to the cylinder 232 to effect removal of the pawl stop from the path of its pawl, and thus permit engagement of the one-revolution clutch to drive the spider. Conversely, if the incoming supply diminishes so that the solid line of bottles recedes from the sensing device 240 toward the sensing device 242, the movement of vane 245 by the air jets will effect closing of switch 250 in parallel line 251 energizing the relay 258 and closing the normally open contacts 260 in the holding line 261 of parallel line 263. At this time switch 252 is still open, and relay 254 in the parallel line 263 is not energized so that normally closed contacts 248 remain closed, and the solenoid 238 remains energized to maintain the continuous feed of containers into the machine. Thereafter, when the solid line recedes to the sensing device 242, the air jets will effect movement of the vane 245a to close switch 252, thus energizing relay 254 to effect closing of the normally open contacts 256 and opening the normally closed contacts 248. As a result the solenoid valve 238 is deenergized to cut off the air to cylinder 232 permitting the pawl stop 226 to be rocked into the path of the pawl to disengage the one-revolution clutch 184 and discontinue rotation of the intake spider 22.

Since the spider 22 is now at rest, any further feeding of bottles onto the conveyor 19 from a preceding machine or other source of supply will first fill up the gap to form a solid line to the sensing device 242 nearest the spider 22, and the interruption of the air stream projecting against its vane at point 242 causes the switch 252 to open. At this time relay 254 remains energized through the holding line 261, and relay 258 remains energized since switch 250 is still closed. Thus, the normally closed contact 248 remains open, solenoid 238 remains deenergized, and the intake spider 22 remains at rest. Thereafter, when the solid line of bottles accumulates to extend beyond the sensing device 240 furthest away from the spider 22, interruption of the streams of air onto the vase causes switch 250 to open. This deenergizes relay 258 opening the normally open contact 260. This in turn deenergizes relay 254 so that normally closed contact 248 is permitted to close. As a result, the solenoid valve 238 is again energized to permit air to pass to the cylinder 232 and effect withdrawal of the pawl stop 226 to again permit engagement of the one-revolution clutch 184 to drive the intake spider 22.

A manually operated valve 264 is also provided in the air circuit 229 for the purpose of cutting off the air supply to the cylinder 232 during normal operation when the supply conveyer 19 is provided with a solid line of bottles. Thus, the intake spider may be stopped at any time during normal operation to permit the labeling machine to be cleared of containers or for any other purpose. Manually reopening the valve 264 will again actuate the air cylinder to start operation of the intake spider.

As further illustrated in FIG. 6, a second ratchet 266, formed integrally with the ratchet 214, and having its teeth set in the opposite direction from the ratchet 214, is arranged to cooperate with a second spring pressed pawl carried by the pawl carrier 224 for the purpose of preventing overthrow of the driven unit when the one-revolution clutch is disengaged. Also, in order to bring the driven unit to rest in the same predetermined position in the cycle each time it is stopped, the pawl carrier 224 is provided with a peripheral cutout arranged to cooperate with a roller 272 carried by an arm 274. The arm 274 is pivotally mounted on a stud 276 upstanding from the gear box 174 and is urged in a direction to engage the roller in the cutout by a spring 278. When the one-revolution clutch is engaged the arm 274 is held out of operative engagement by a latch mechanism indicated generally at 280 arranged to cooperate with the free end of the arm 274. In operation, when the pawl stop 226 is actuated to permit engagement of the one-revolution clutch, the arm 274 is rocked outwardly when the roller 272 rides out of its cutout and is held in its outward position by the latch mechanism 280 during engagement of the clutch. In this position the secondary pawl and ratchet 266 are also engaged to follow around with the pawl carrier. Thereafter, when the main drive pawl 220 is disengaged from its ratchet 214 by the pawl stop 226 upon rocking of the shaft 228, the latch mechanism is also rocked to release the arm 274 and permit the roller 272 to engage the cutout and, simultaneously therewith, the roller 272 also engages the tail of the secondary pawl to disengage the same from its ratchet 266.

It will be understood that the air jets and the air cylinders forming a part of the pneumatic control mechanism above described, as well as the pneumatically operated controls to be hereinafter described, are supplied with compressed air from any usual or preferred source of supply and may be regulated to suit the requirements of the particular control or other device using compressed air.

Referring now to FIG. 5, the continuously rotated helical feed screw 24 is arranged to receive successive bottles released thereto by the rotary spider 22 and to effect spacing of the bottles as they are advanced to conform to the spacing of the bottle engaging units 128 carried by the upper conveyer 21 which, in the present machine, comprises a spacing of six inches. As herein shown, the feed screw 24 is mounted on a shaft 300 interchangeably journaled at its ends in bearings formed in spaced arms 302, which latter are adjustably clamped to the ends of a shaft 304 so as to permit arcuate adjustment of the feed screw relative to the height of the bottles on the conveyer to accommodate bottles of different heights. The shaft 304 is in turn carried by spaced arms 306, 308 which are pivotally adjustable on short shafts 310, 312 carried by brackets 314, 316, respectively, the arms being adjustably secured to the brackets in a manner such as to permit lateral adjustment of the feed screw relative to the bottles on the conveyer to accommodate bottles of different cross sectional dimensions. As herein shown, the brackets 314, 316 are attached to the machine frame and are provided with extended portions 318 having arcuate adjustment slots arranged to receive bolts 320 threadedly engaged with their respective arms 306, 308.

As herein illustrated, the feed screw 24 is arranged to be rotated through chain and sprocket connections from a shaft 322 in a manner such as to permit adjustment of the feed screw as described. The chain and sprocket connections include a chain and sprocket drive 324 from the shaft 322 to one end of the short shaft 310, the latter being connected by a second chain and sprocket drive 326 to one side of a double sprocket 328 mounted for rotation on the adjacent end of the shaft 304. A third chain and sprocket drive 330 extends from the other side of the double sprocket 328 to feed screw shaft 300. The shaft 322 is arranged to be driven from the main drive shaft 44 through gearing connections including a gear 332 fast on the shaft 44 and in mesh with an idler gear 334 mounted on a stud 336 supported in the machine frame. The idler gear 334 is in mesh with a large gear 340 fast on the shaft 322.

The gearing connections above described are arranged to rotate the shaft 322 at one half the speed of the main drive shaft 44 so that if it is assumed that the main drive shaft is rotated at 300 r.p.m., the shaft 322 will be rotated at 150 r.p.m. The sprocket and chain connections above described are arranged to drive the feed screw 24 at twice the speed of the shaft 322 or at the rate of 300 r.p.m. Thus, in operation the feed screw 24 effects advancement and spacing of successive bottles at the rate of 300 bottles per minute.

As illustrated in FIG. 5, the entrance portion of the helical feed screw 24 is barrel shaped so that in operation when the contiguous bottles are guided along the barrel shaped surface they are caused to separate to form a V-shaped opening on one side to permit entrance of a tooth 23 of the spider 22 as shown. As further shown in FIG. 5, the helical feed screw 24 is of progressively increasing pitch at its entrance end, the discharge end being of a constant pitch such as to maintain the bottles at a six-inch spacing in which position the bottle engaging units 128 carried by the upper chain 122 are arranged to be lowered. The bottles thus engaged are maintained in their spaced relation as they are advanced between the grip of the upper and lower conveyers. It will be understood that the barrel shaped entrance portion is particularly designed for bottles which are rectangular in cross section, a different entrance portion being provided for bottles which are round in cross section.

Referring now to FIG. 8, each resiliently mounted bottle engaging unit 128 carried by the chain 122 includes a rectangular block 372 having a rubber or like resilient facing 373 for engagement with the top of the bottle. The block 372 is connected to the underside of a U- shaped bracket 374, the upstanding legs of which carry rollers 375 which ride on the upper and lower tracks 144, 146. As herein shown, the lower tracks 146 comprise spaced elongated angle pieces 376 secured to the lower ends of depending inverted L-shaped brackets 378 which are bolted at their upper ends to angle members 380 attached to the central supporting plate 142. The U-shaped bracket 374 and the rubber-faced block 372 carried thereby are connected to the chain 122 in a manner such as to permit resilient raising and lowering of the bottle engaging block relative to the chain. As illustrated in FIG. 8, adjacent spaced link pins 382 are elongated to extend beyond their links 383, through spacing elements 384, and through a pair of spaced inverted L-shaped brackets 385 to which the pins are secured. The chain rollers 386 carried by the spaced pins 382 engage the underside of the central plate 142, as illustrated, to maintain the chain in a horizontal plane and to limit the upward movement of the chain. The brackets 385 are slotted, as shown at 388, to embrace the horizontal leg 390 of the U-shaped bracket 374 and to permit relative movement therebetweeen. A pair of elongated bolts 391 extend through openings in the horizontal legs of the L-shaped brackets 385 at a point intermediate the links 383 connected by the spaced pins 382, and the lower ends of the bolts are threadedly engaged with the block 372. The heads of the bolts 391 engage the upper face of the horizontal legs of the brackets 385, and the shanks of the bolts are provided with springs 392 coiled thereabout which bear against the undersides of the horizontal legs and the upper face of the U-shaped bracket 374.

From the above description of the structure of the resiliently mounted bottle engaging unit 128 it will be seen that in operation the chain 122 is maintained in a horizontal plane by engagement with the lower edge of the central plate 142 and that the L-shaped brackets 385 connected to the chain are also maintained in a horizontal plane. The coil springs 392 which bear against a relatively stationary surface at their upper ends tend to urge the U-shaped bracket 374 and the rubber-faced bottle engaging blocks 372 downwardly, as limited by the engagement of the rollers 375 with the lower tracks 146. Thus, in operation the blocks 372 may be raised or lowered relative to the tops of the bottles during the continuous movement thereof by raising or lowering the level of the lower tracks 146.

Accordingly, at the receiving end of the machine, as illustrated in FIG. 2, the tracks 146 are provided with stationary inserts or cam pieces 394 which operate to hold the bottle top engaging blocks 372 in a raised position relative to the bottle tops during the time that the bottles are being advanced and spaced by the helical feed screw 24, and when the bottles assumes their accurately spaced relation at the discharge end of the feed screw 24, the cam piece 394 is sloped downwardly to permit successive bottle engaging blocks to be resiliently lowered on top of successive bottles to grip the bottles between the upper and lower conveyers 20, 21. As also illustrated in FIG. 2, the upper tracks 144 are similarly supported from the center plate 142 for guiding the bottle engaging units 128 along with the upper run of the chain 122. As illustrated in FIG. 39, when the rollers 375 leave the tracks 146 to pass around the driving sprocket 118 the outward movement of the bottle engaging units 128 is limited by engagement of the heads of the bolts 391 with the horizontal legs of the brackets 385.

Figure 12:
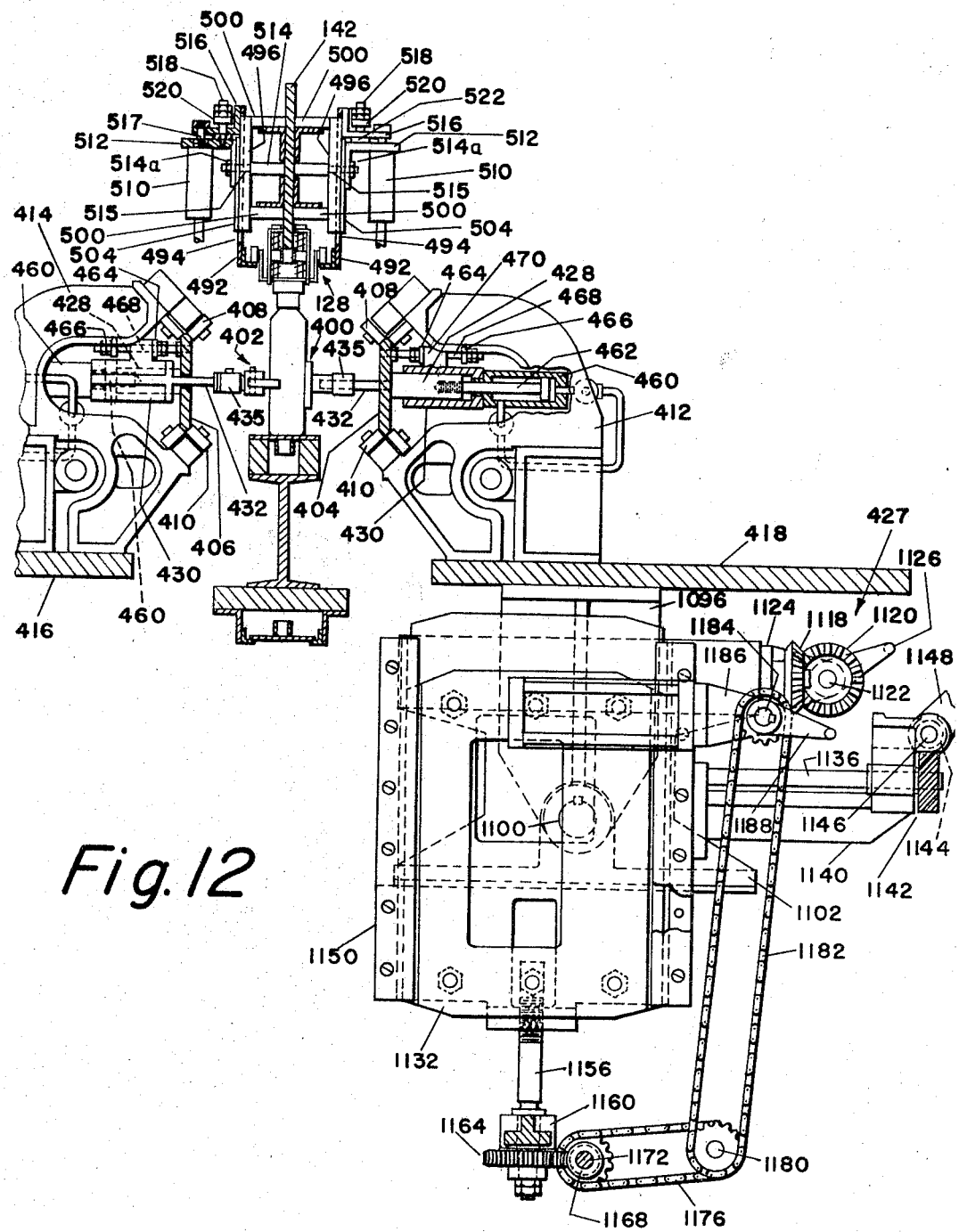
FIG. 12 is a side elevation of the centering mechanism, shown partly in cross section as seen from the line 12—12 of FIG. 11, and also showing a portion of the tiltable platen adjusting mechanism.

The bottles thus spaced and gripped between the upper and and lower chain conveyers 21, 20 are advanced to the bottle centering and aligning station 12. In practice the spaced bottles discharged from the feed screw 24 may be slightly off center or misaligned relative to the center line of the conveyers, or the sides of a rectangular bottle may be slightly awry or non-parallel relative to the direction of travel of the bottles. As illustrated in FIG. 12, the centering and aligning mechanism 12 includes a pair of opposed elongated and longitudinally reciprocal bottle aligning elements 400, 402 arranged to be moved inwardly into engagement with the bottles and to move along with the bottles during the continuous advance thereof for a short distance to effect centering and alignment thereof, and then are moved outwardly and returned to their initial position to engage succeeding bottles. In the illustrated embodiment of the invention provision is made for engaging and aligning successive groups of three bottles simultaneously, the centering and aligning elements being reciprocated in timed relation to the continuous advance of the bottles. The illustrated machine is designed to handle bottles of rectangular cross section so that the bottle engaging element 400 on one side of the conveyer may comprise an elongated flat plate for engaging one side of the bottles. There are three individual bottle engaging units 402 on the opposite side of the conveyer for engagement with the front and rear edges of the spaced bottles to effect centering and aligning of the bottles both laterally and longitudinally of the conveyer in cooperation with the opposing bottle engaging element 400.

The bottle centering and aligning elements 400, 402 are carried by and movable with opposed elongated reciprocable supporting slides 404, 406, respectively, each of which is supported and guided for reciprocable movement longitudinally of the conveyer by upper and lower pairs of rollers 408, 410 arranged at right angles for engagement with right angular faces formed in the upper and lower edges of the slides 404, 406. The rollers 408, 410 are carried by opposed brackets 412, 414 secured to opposed platens 416, 418 respectively. As herein illustrated, the elongated slides 404, 406 are connected at their forward ends by links 420, 422, which links are connected at their other ends to mechanism indicated generally at 425 for reciprocating slide bars 426 which carry the spaced label applying pads 25 to be hereinafter described. Each centering and aligning slide 404, 406 carries a cylindrical member 428 bolted thereto and extended laterally outwardly from a medial portion of its slide. A supporting bracket 430 is mounted to be slidingly reciprocated on each cylindrical member 428 and is provided with spaced arms 432 which extend through clearance openings in the supporting slides 404, 406. The ends of the arms 432 carry elongated supporting bars 435. The flat bottle engaging element 400 on one side of the conveyer is secured in spaced relation to its supporting bar 435 by bolts 436 and intervening spacing elements 437. The individual spaced bottle centering and aligning units 402 on the other side of the conveyer are resiliently secured to their supporting bar 435 and, as illustrated in detail in FIG. 13, each unit 402 includes a rectangular body portion 440 having hollow stem 442 slidingly fitted in its supporting bar 435. Each end unit 402 is provided with a longitudinal extension 444 arranged to slidingly embrace the end of its adjacent arm 432 to prevent rocking of the units. The central unit 402 is provided with a guide stem 446 fitted in an opening in its supporting bar 435 for the same purpose. A pair of spaced coil springs 448 fitted into openings in the bar 435 bear gainst the rear face of the body portion to normally maintain the body portion in a forward position as limited by a collar 447 secured to the end of the hollow stem 442 and arranged to engage the rear face of the bar 435. The body portion 440 is provided with a longitudinally extended groove 449 arranged to receive two bell crank members 450, 452 pivotally mounted on spaced pins 451, 453 carried by the body portion 440. The bell crank members 450, 452 are arranged to embrace the front and rear edges of the bottle and are normally rocked outwardly by a spring pressed pin 454 carried by the hollow stem 442. The pin 454 bears against the ends of the inwardly directed legs of the bell cranks 450, 452 and tends to rock the bell cranks outwardly. The front face of the body portion 440 carries a plate 456 recessed therein and secured thereto which slidingly supports a pin 458 having a head portion 459 retained between the inner face of the plate 456 and the other side of the ends of the inwardly directly legs of the bell cranks. In operation the end of the pin 458 extends forwardly to engage the adjacent side of a bottle when the centering unit 402 is moved inwardly. Engagement with the bottle will press the pin 458 down against the inwardly directed legs of the bell cranks 450, 452 against the pressure of the spring pressed pin 454 to rock the forwardly extended legs of the bell cranks into centering engagement with the front and rear edges of the bottle. Further inwardly movement of the unit 402 will resiliently press the bottle against the flat bottle engaging element 400 by virtue of the springs 448 to effect centering and aligning of the bottle on the conveyer in cooperation with said flat bottle aligning element 400.

As further illustrated in FIG. 12, in the preferred embodiment of the invention provision is made for pneumatically moving the bottle engaging elements into and out of engagement with the bottles during the reciprocable movement of the supporting slides 404, 406 to which the bottle engaging elements are secured. As herein shown, this is accomplished by double acting air cylinders 460 which are secured to and movable with their respective brackets 430. The stem 462 of each piston of the air cylinder 460 extends through an opening in its bracket and is threadedly secured to the end of its cylindrical member 428 carried by the supporting slide. Thus, in operation the piston 462 remains fixed relative to its supporting slide, and the air cylinder 460 is caused to move to effect reciprocation of its connected bracket 430 on the cylindrical member 428. Each bracket 430 carrying its respective bottle engaging elements is limited in its movement toward and from the bottles by spaced limiting stops 464, 466 adjustably mounted on a threaded rod 468 secured to its respective supporting slide 404, 406. Each bracket 430 is provided with an upstanding portion 470 having a clearance opening surrounding its rod 468 and which is arranged to engage the limiting stops carried by the rod.

Each air cylinder 460 is controlled by a cam operated air circuit as diagrammatically illustrated in FIG. 14. As therein shown, the double acting air cylinder 460, on one side of the conveyor 20 for operating the bottle centering elements 402, is connected at one end by pipe 472 which leads to a conventional normally open air piloted valve 474 adapted to be closed when air pressure is exerted from a pipe 475 connected to a normally closed cam operated valve 478. The valve 478 is connected to a source of compressed air by a pipe 480. The other end of the cylinder 460 is connected by a pipe 482 to a second air piloted valve 484 which is normally closed and which is adapted to be opened when air pressure is exerted through the pipe 476. The two valves 474 and 484 are connected by a pipe 486 which is connected to a second source of compressed air by a pipe 488. The valve 478 is operated by a cam 490 fast on a cam shaft 491 and, in operation, when the cam operated valve 478 is opened, the pilot line pressure will effect closing of the normally open valve 474 and opening of the normally closed valve 484 permitting air pressure from pipe line 486 to pass through the valve 484 and through pipe 482 to move the cylinder 460 in one direction. Conversely, when the cam 490 permits the valve 478 to close, to remove all pilot pressure, the valve 484 will return to its normally closed position, and the valve 474 will return to its normaly open position which permits air from the pipe line 486 to pass through valve 474 and pipe 472 to move the cylinder in the opposite direction relative to the stationary piston. A pipe line 476a connects the air pressure line 476 on one side of the conveyer with the air cylinder 460a on the other side of the conveyer which is provided with similar control mechanism for simultaneously operating the bottle centering element 400 and which is controlled by the same cam 490 and valve 478 as described. In operation the centering elements 400, 402 are mechanically moved in the direction of the bottles until they attain the speed of the moving bottles whereupon the cam 490, which rotates once for every three bottles, opens valve 478 to cause the centering elements to be pneumatically moved toward the bottles. Thereafter, when the valve 478 is closed, the centering elements move away from the bottles and the entire unit is bodily retracted rearwardly in readiness for a succeeding group of bottles.

Figure 4:
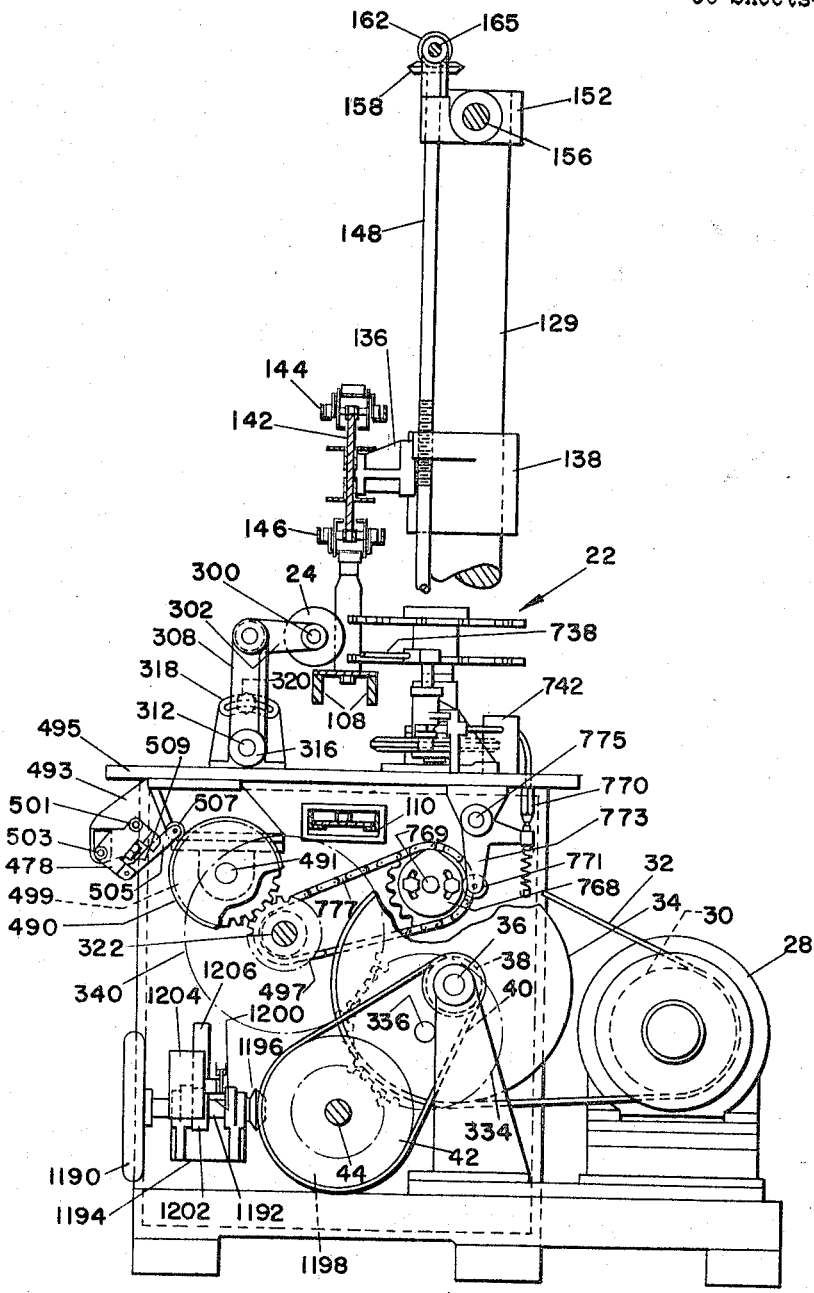
FIG. 4 is a vertical section taken on the line 4—4 of FIG. 3 showing the driving mechanism.

As illustrated in FIG. 4, the cam shaft 491 is journaled in spaced brackets 493 depending from the platen 495 and is arranged to be driven from the shaft 322 through gears 497, 499. The valve 478 is supported on rods 501, 503 extending between the brackets 493 and is provided with a pivotally mounted arm 505 carrying a roller 507 for cooperation with its cam 490. The arm 505 is arranged to cooperate with the spring pressed stem 509 of the valve to open and close the same each cycle of operation in timed relation to the movement of successive groups of three bottles.

Thus, in operation the bottle centering and aligning elements 400, 402 carried by the brackets 430 secured to and movable with the slides 404, 406 are moved inwardly into cooperating engagement with the bottles during a portion of the forward movement of the slides to effect centering and alignment of the bottles and are then retracted as they approach the end of the forward stroke whereupon the slides with the centering elements carried thereby are returned to their initial position in readiness for engagement with a succeeding group of three bottles being continuously advanced. It will be understood that the piping connections to the double acting air cylinders 460 may comprise flexible tubing to permit relative movement of the elements as described.

It will also be understood that the cooperating centering and aligning mechanisms on each side of the conveyer are similar in construction and operation and that the provision of a flat bottle engaging element 400 on one side and individual bottle engaging units 402 on the other side may be changed to suit different sizes and shapes of bottles. For example, when running round bottles through the machine a flat bottle engaging element, similar to the element 400, may be retained on one side of the conveyer, and separate engaging units, similar to the units 402, but shaped to engage a round bottle at spaced points in its periphery may be substituted. Also, for some shapes of bottles it may be preferred to provide shaped bottle centering and aligning units similar to 402 on both sides of the conveyer. It may also be stated at this time that with most bottles the spacing and placement of the bottles on the conveyer, as accomplished by the intake mechanism 10, including the intake spider 22 and the helical feed screw 24, is such as to not require correction by the centering and aligning mechanism 12, the latter being used as a precautionary measure to assure alignment with the subsequently engaged labeling pads 25. It may be further stated at this time that in order to accommodate bottles having tapering side walls provision is made for tilting the opposing supporting platens 416, 418 by adjustable supporting means indicated generally at 427 in FIG. 12 to cause the bottle centering elements 400, 402 to conform to the angle of the tapering side walls as will hereinafter be more fully described.

Figure 10:
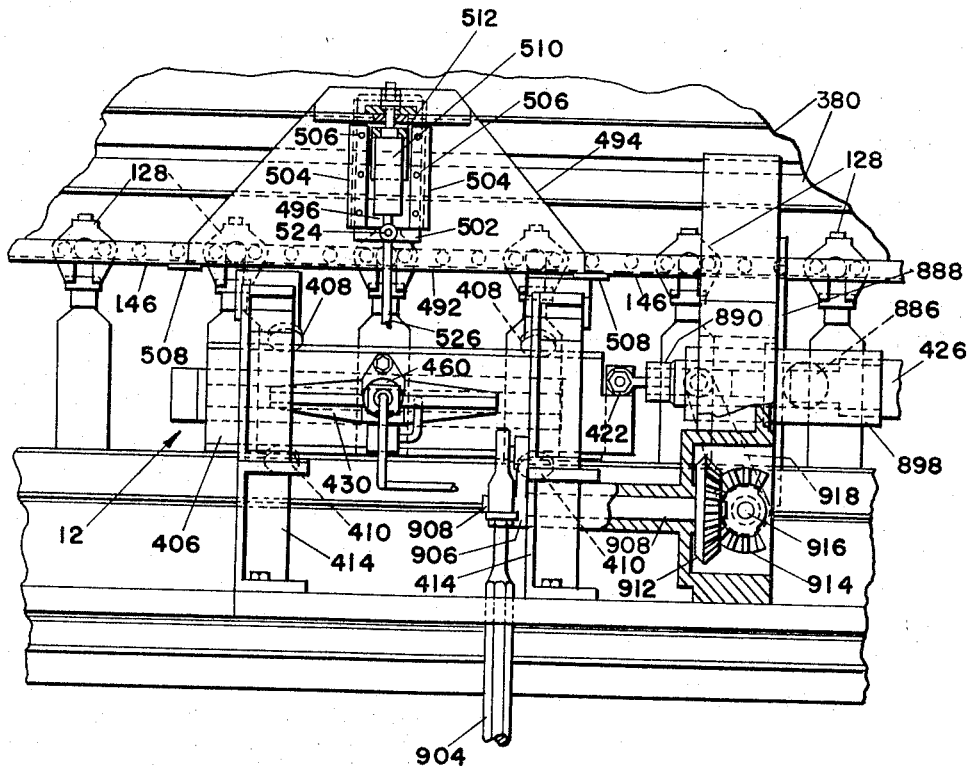
FIG. 10 is a front elevation of bottle centering mechanism and associated mechanism for lifting the bottle top clamping units.
Figure 11:
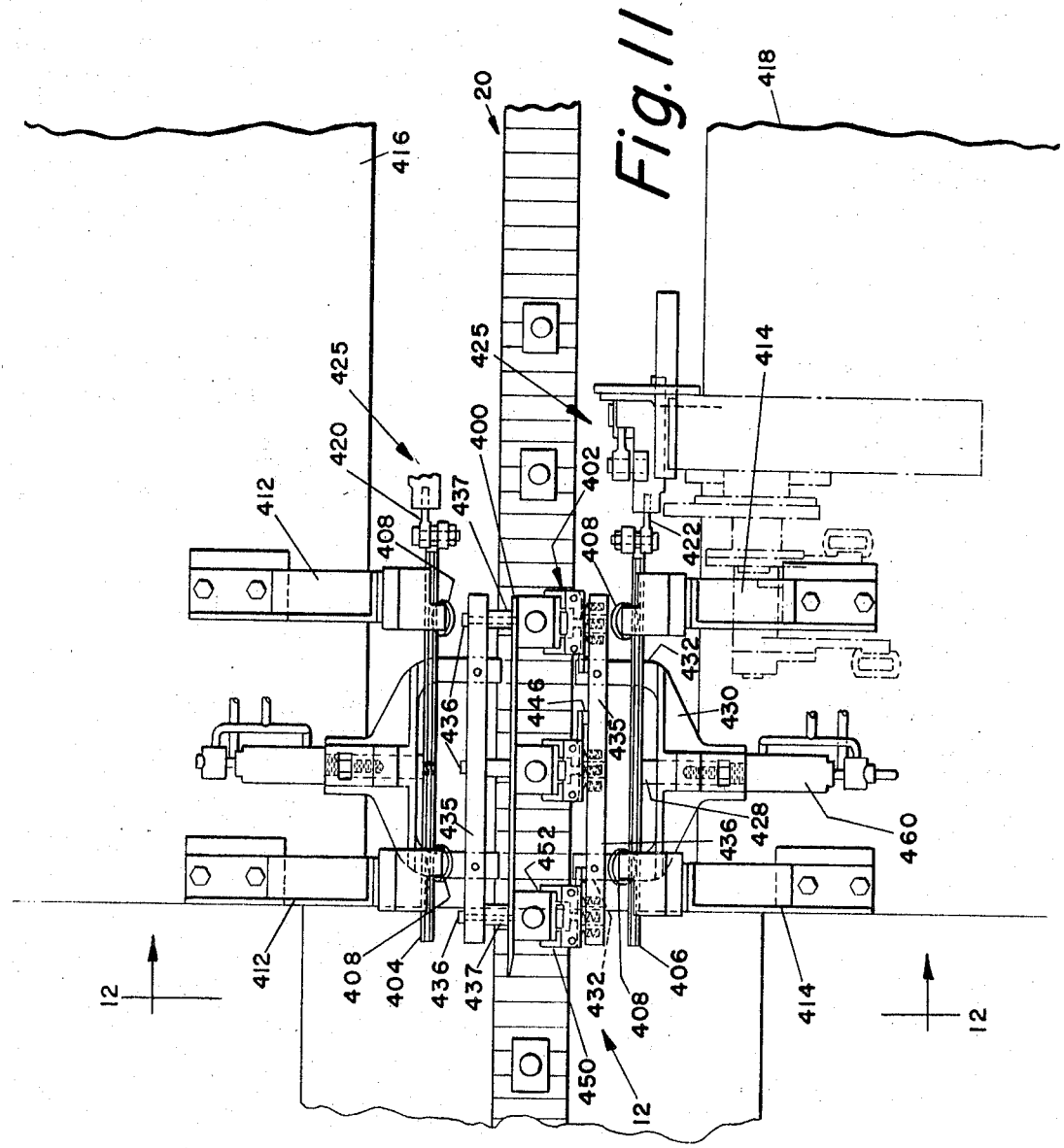
FIG. 11 is a plan view of the same.

As hereinbefore described, the bottle top engaging units 128 are brought down on top of the accurately spaced bottles at the discharge end of the helical feed screw 24 to grip the bottles firmly between the upper and lower conveyers. Accordingly, when the spaced bottles arrive at the centering and aligning station 12 provision is made for lifting the bottle top engaging units 128 for an instant during the relatively short time that the centering and aligning elements 400, 402 are in operative engagement with the continuously moving bottles. As herein shown, see FIGS. 10 and 12, this is accomplished by spaced vertically movable track sections 492 normally aligned with the stationary track 146. The movable track sections 492 are carried by spaced triangular shaped slide plates 494 mounted for vertical reciprocation in brackets 496 secured to the center plate 142 of the upper conveyer 21 by spacing members 500 disposed on each side of the center plate. The triangular shaped slide plates 494 which carry the track sections 492 are each provided with a realtively wide slot 502 medially thereof, the marginal edges of which are slidingly received in marginal grooves formed in the bracket 496. Gib plates 504 overlap the marginal edges of the slots and are secured to the brackets 496 by bolts 506. The track sections 492 are of a length such as to effect lifting of three bottle engaging units 128 simultaneously and are normally supported in alignment with the stationary track 146 by extensions 508 secured to the open ends of the stationary tracks and extended beyond the open ends, as shown, to support the ends of the movable tracks.

The slide members 494 are arranged to be pneumatically operated to raise and lower the same by air cylinders 510 which are secured to angle brackets 512, which latter are secured to the brackets 496 by a tie member 514 extended through the center plate 142. The tie member is provided with reduced diameter end portions 515 which form shoulders which bear against the inner faces of the brackets 496. The reduced diameter portions extend through the brackets and through the depending legs of the angle brackets 512, the outer ends of the tie piece being threaded to receive nuts 514a. The piston rods 517 of the air cylinders extend upwardly and are connected to the laterally extended legs of angle pieces 516 attached to the upper ends of the slide plates 494. Each angle bracket 512 is provided with an upstanding stud 518 which extends through the laterally extended legs of the angle pieces 516, and each stud is provided with vertically spaced resilient stop members 520, 522 for adjustably limiting the stroke of the piston rods 517.

As diagrammatically illustrated in FIG. 15, the air circuit to the cylinders 510 includes a pair of normally closed air operated pilot valves 524, one connected to each cylinder 510, and which are connected to a source of compressed air through supply pipes 525, 526. The normally closed pilot valves 524 are of the type arranged to be opened when air pressure is exerted through pipes 528, 530 connected to the valves and also connected to a normally closed valve 532. The valve 532 is connected to a source of compressed air through a supply pipe 533 and is arranged to be opened by a cam 534 fast on the cam shaft 491. In operation, when the cam operated valve 532 is opened, air is released to effect opening of the pilot valves 524 to permit the air from the pipes 526 to elevate the pistons in the cylinders 510, thus lifting the track sections 492 and the bottle top engaging units 128 during the centering and aligning operation. Thereafter, the cam operated valve 532 is again closed to effect closing of the pilot valves 524 and to permit return of the bottle engaging units 128 into clamping engagement with the tops of the bottles. In practice the timing of the lifting operation is such as to cause three of the bottle engaging units 128 to engage a group of three aligned bottles each cycle of operation. The cam operated valve unit 532 may be similar in construction and mode of operation as the valve unit 478 previously described.

Figure 20:
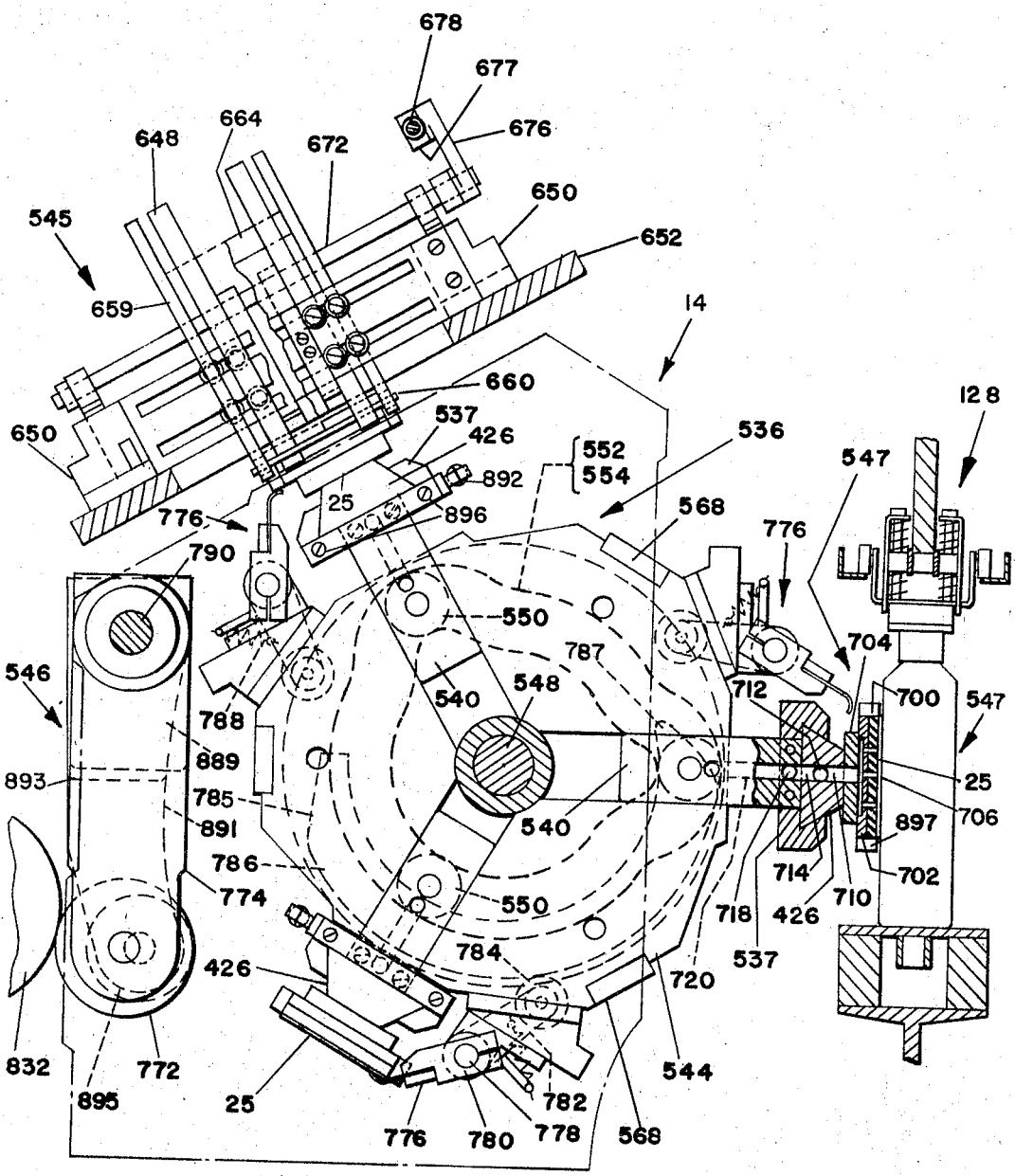
FIG. 20 is a view in vertical cross section of the labeling turret taken on the line 20—20 of FIG. 19.

From the description thus far it will be seen that the bottles are continuously advanced in accurately spaced relation while firmly gripped between the upper and lower conveyers 21, 20. In this condition the bottles arrive at the labeling station 14 wherein labels are applied to successive groups of three bottles each cycle of operation. As illustrated in FIG. 20, in general the labeling mechanism 14 includes a three-point turret or spider indicated generally at 536 mounted to be intermittently rotated through 120° each cycle of operation, each point of the turret carrying an elongated pad supporting bar 426 on which the spaced label suction pads 25 are mounted. The pad supporting bars 426 are slidingly mounted for longitudinal reciprocation in elongated grooved supporting members 537 secured to the ends of spaced radially extended arms 538, 540 carried by and mounted for radial reciprocation in spaced intermittently rotated radially grooved turret heads 542, 544. In general the operation of the labeling mechanism during one complete revolution of the intermittently rotated turret 536 is as follows: While the turret is at rest, the suction pads 25 are reciprocated radially to engage and withdraw the lowermost labels from a plurality of stacks thereof supported in label magazines indicated generally at 545. Simultaneously therewith, the suction pads at the label applying station are reciprocated to apply the previously withdrawn and adhesively coated labels to the bottles. The turret 536 in then rotated 120° to carry the suction pads 25 and their labels from the label withdrawing station 545 past adhesive applying mechanism, indicated generally at 546, and which is arranged to apply a film of adhesive on each label held by the suction pads. The turret is then again rotated 120° to present the suction pads and their adhesively coated labels into operative relation to apply the adhesively coated labels to the bottles as indicated at 547 whereupon the suction pads are again moved radially outwardly to apply the labels. During the label applying operation the suction pads 25 at station 547 are also moved longitudinally along with the continuously moving bottles to affix the labels to a group of three bottles. After application of the labels the suction pads 25 are radially retracted and returned to their initial position into operative position to again be reciprocated to withdraw labels from the magazines 545. It will be understood that when the bottles are to be provided with labels on both sides thereof, similar labeling mechanisms 14 may be provided on opposite sides of the conveyor, the opposing labeling mechanisms being supported on the opposed tiltable platens 416, 418. Hence, it is believed that a description of the labeling mechanism supported on the tiltable platen 418 on one side of the conveyer will suffice for both.

Figure 19:
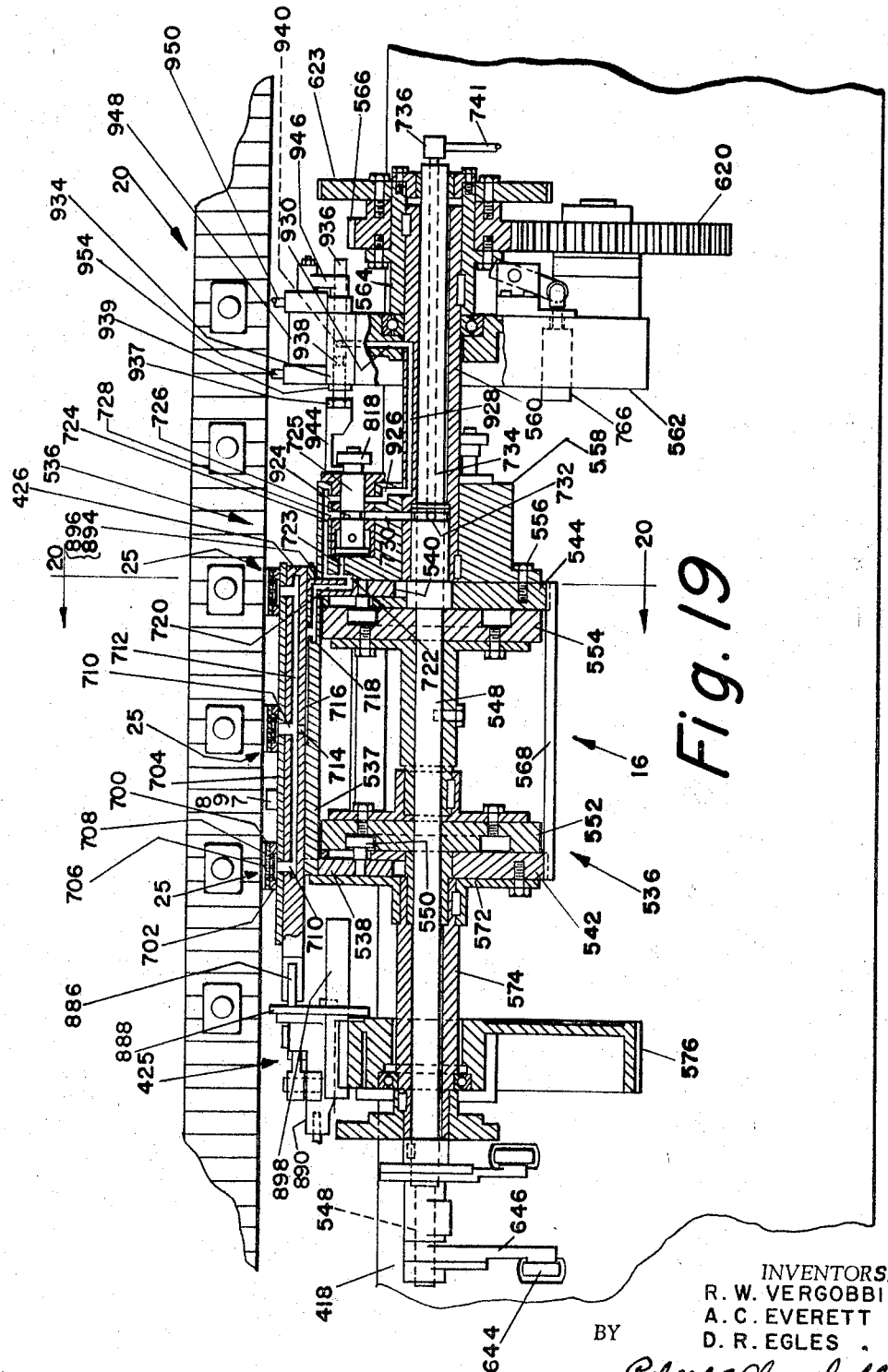
FIG. 19 is a horizontal section of the labeling turret.

As herein shown, the spaced turret heads 542, 544 are mounted for intermittent rotary movement on a central rocker shaft 548. The turret heads 542, 544 are grooved to receive the spaced radial arms 538, 540, respectively, and each radial arm is provided with a roller 550 for cooperation with spaced cams 552, 554 mounted fast on the rocker shaft 548 and which are arranged to effect reciprocation of the radial arms 538, 540 in the intermittently rotated turret heads 542, 544. As illustrated in FIG. 19, one of the turret heads 544 is connected by bolts 556 to a housing 558 keyed to an elongated sleeve shaft 560 which surrounds the central rocker shaft 548 and is journaled in ball bearings provided in a supporting bracket 562 attached to the tiltable platen 418. The outer end of the sleeve 560 is provided with a flanged hub 564 keyed thereto and to which a gear 566 is bolted as shown. The turret heads 542, 544 are connected to rotate together by tie bars 568, and the radial arms 538, 540 are also connected together at their outer ends by the elongated grooved bars 537 in which the label pad supporting bars 426 are slidingly mounted. It will be seen that the radial arm 540 is retained in its groove in the turret head 544 by the adjacent face of the housing 558, and the radial arm 538 is similarly retained in its groove in the turret head 542 by a flange member 572 keyed to a second hollow shaft 574 surrounding the rocker shaft 548 and mounted for rotation in ball bearings provided in a supporting bracket 576 attached to the platen 418.

Referring now to FIGS. 1 and 39, the turret 536 is arranged to be intermittently rotated through connections from the main drive shaft 44. A pinion 577 formed integrally with the pinion 46 on the end of the shaft 44 is in mesh with an idler gear 578 which in turn meshes with a gear 580 fast on the end of a short shaft 582 journaled in bearings secured to the side frame 54. The other end of the short shaft is connected by a universal joint 586 to one end of an elongated shaft 588. The other end of the elongated shaft 588 is connected by a universal joint 590 to a drive shaft 592 journaled in bearings formed in spaced depending brackets 594, 596 attached to the underside of the platen 418, as shown in FIG. 1. The shaft 592 is provided with a gear 598 in mesh with an idler gear 600 mounted for rotation on a stud 602 supported in the bracket 596. The idler gear 600 is in mesh with a large diameter gear 604 mounted for rotation on a stationary shaft 606 supported in the brackets 594, 596, extensions of the shaft 606 being further supported in spaced brackets 608 which also depend from and are secured to the underside of the tiltable platen 418. The large diameter gear 604 is provided with a pair of diametrically opposed spaced rollers 610, 612 and comprises the driving element of a Geneva driving mechanism which includes a six-point Geneva 614 fast on a short shaft 616 secured to the bracket 596. Secured to and rotatable with the six-point Geneva 614 is a gear 618 which is in mesh with an idler gear 620 mounted for rotation on a stud 622 secured to the turret supporting bracket 562. The idler gear 620 is in mesh with the gear 566 fast on the turret sleeve shaft 560. Thus, in operation, the turret 536 is intermittently rotated through 120° each cycle of operation.

Figure 21:
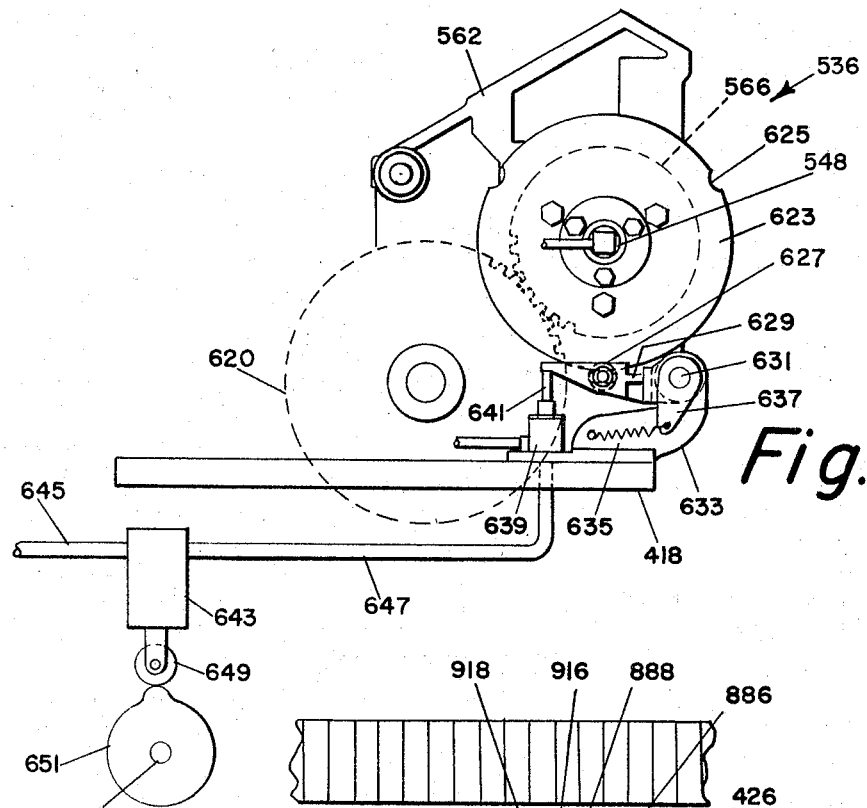
FIG. 21 is a side elevation detail view of the turret locking mechanism.

In order to bring the turret to rest in an accurately registered position and to relieve any undue strain on the Geneva mechanism provision is made for locking the turret in its moved position at the end of each intermittent movement. As illustrated in FIG. 21, this may be accomplished by mechanism including a disk 623 bolted to the turret drive gear 566 and which is provided with three peripheral cutouts 625 spaced 120° apart. A roller 627 carried by an arm 629 pivotally mounted at 631 in a bracket 633 attached to the platen 418 is arranged to cooperate with a cutout 625 when the turret comes to rest. A spring 635 connected to an arm 637 formed integrally with the arm 629 urges the roller 627 against the disk 623, and at a predetermined time in the cycle, corresponding to the end of the Geneva movement, provision is made for pneumatically holding or locking the roll in its cutout with substantial pressure whereby to counteract any overthrow or backlash. As herein shown, an air cylinder 639 mounted on the platen 418 is provided with a piston 641 arranged to cooperate with the pivoted arm 629. The air cylinder 639 is connected in an air circuit, as diagrammatically indicated in FIG. 21, which includes a cam operated valve 643 having an inlet connected to a source of compressed air through a pipe 645 and an outlet connected to the cylinder by a pipe 647. The valve 643 is provided with an operating stem having a roller 649 cooperating with a cam 651 fast on the cam shaft 491 which is rotated once for every three bottles. In practice the cam 651 is arranged to open the valve 643 for a relatively short time each cycle to forcibly urge the roller into its cutout at the end of the turret movement.

Provision is made for rocking the central shaft 548 to effect reciprocation of the radial arms 538, 540 and the suction pads while the turret 536 is at rest. As herein shown, see FIGS. 17 and 20, the cams 552, 554, fast on the rocker shaft 548, are each provided with two high points arranged to effect simultaneous reciprocation of the suction pads at the label withdrawing station 545 and at the label applying station 547. The turret is rotated in a counterclockwise direction, viewing FIGS. 17 and 20, and when the turret comes to rest the high points of the cams 522, 554 are disposed in front of or to the left of the rollers 550 carried by the radial arms. The cams are then rocked in a clockwise direction through about 64½° to effect reciprocation of the radial arms at said stations while the turret is at rest to dispose the high points of the cams to the right of the rollers 550 in the position illustrated in FIG. 17. Thereafter, when the turret is again rotated in a counterclockwise direction to present the suction pads to the next stations of operation, the cams 552, 554 are likewise rocked in a counterclockwise direction through about 64½° to maintain the suction pads retracted during the turret movement of 120° and to again present the high points of the cams in a position to effect radial reciprocation of the succeeding radial arms and their suction pads when the turret comes to rest.

Figure 18:
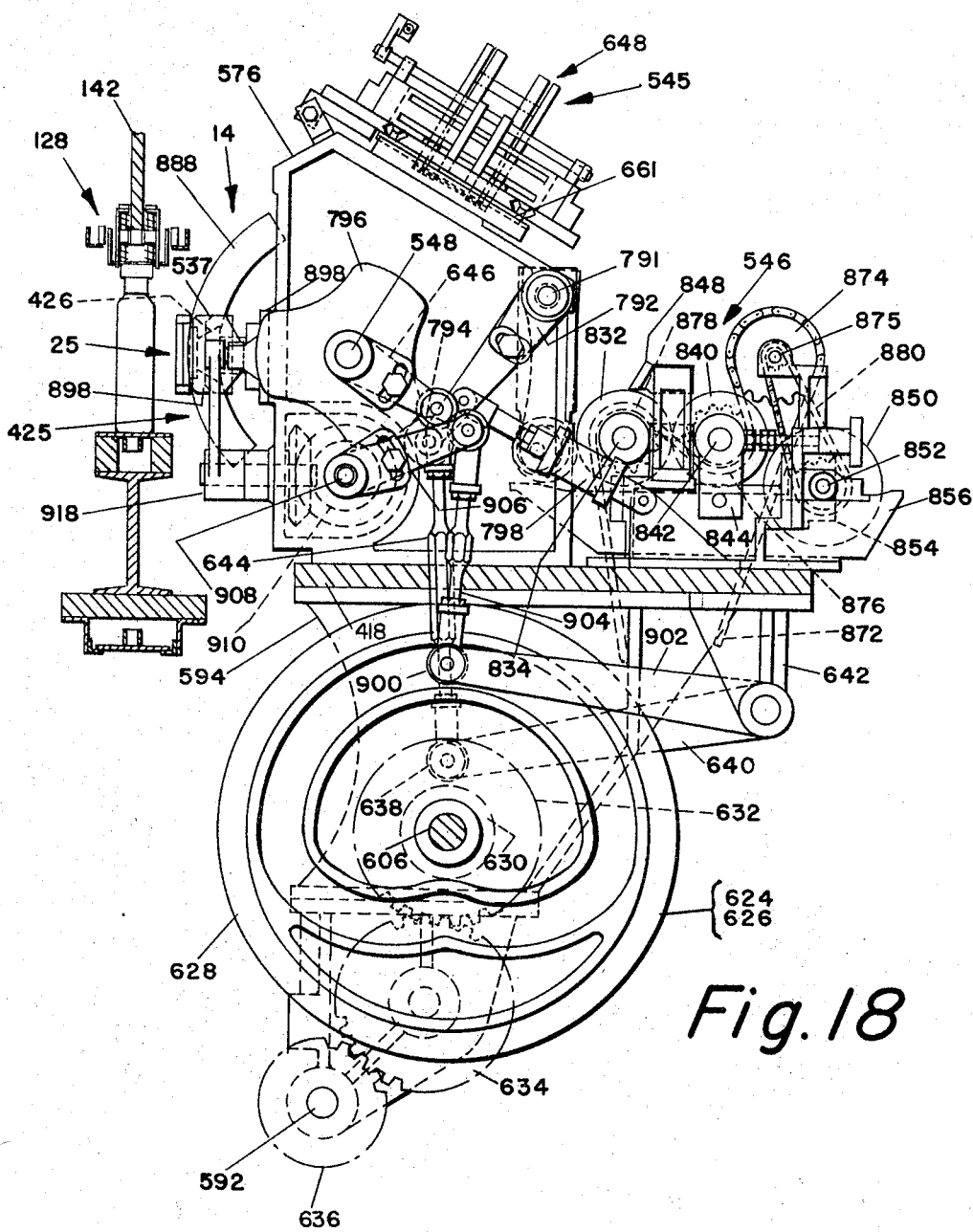
FIG. 18 is a side elevation partly in cross section of the labeling mechanism as viewed from the line 18—18 of FIG. 16.

As herein shown, see FIG. 18, the central shaft 548 is arranged to be rocked in the manner described by a cam 624 mounted for rotation on the stationary shaft 606, the cam 624 being rotated through connections from the drive shaft 592. The cam 624 forms part of an assembly which includes a second cam 626, the cams being connected to an intervening flange 628 formed integrally with the hub 630 of a gear 632. The gear 632 is in mesh with an idler gear 634 which in turn meshes with a gear 636 fast on the drive shaft 592. A cam roll 638 carried by a lever 640 pivotally mounted in a bracket 642 cooperates with the cam 624, and a link 644 connects the lever 640 to an arm 646 fast on the end of the rocker shaft 548.

Figure 23:
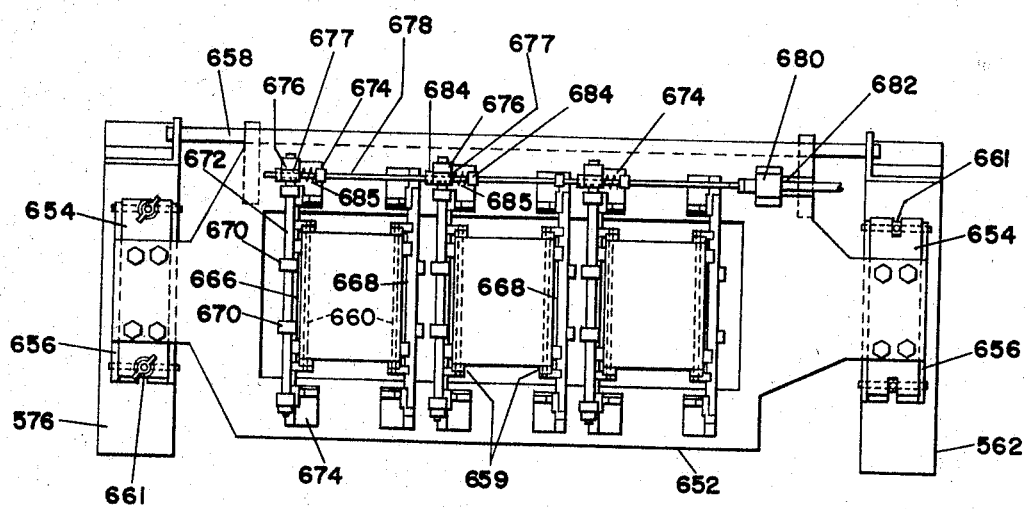
FIG. 23 is a plan view of the label magazine.
Figure 24:
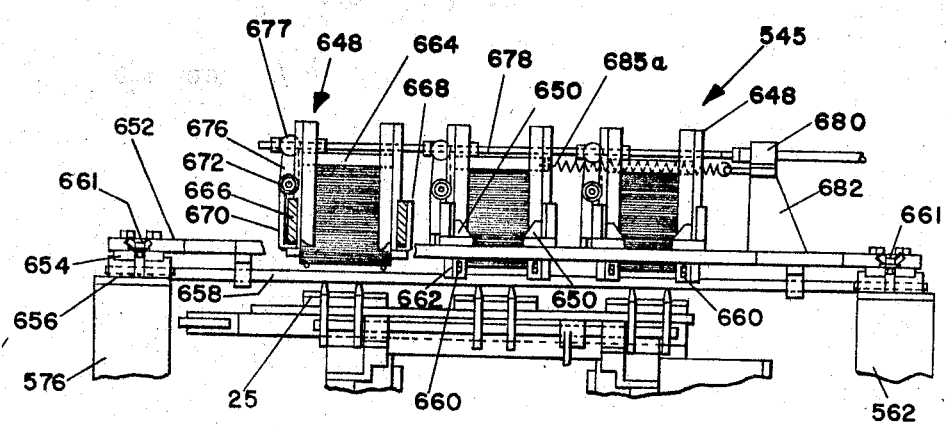
FIG. 24 is a front elevation of the same.

At the label withdrawing station the suction pads 25 mounted on the bar 426 engage and withdraw the lowermost labels in the magazines 545. The label magazines 545 may be of the same general type as illustrated and described in the patent to Magnusson, No. 2,494,186, and as herein illustrated, are spaced apart six inches to conform to the spacing of the labeling pads 25. The magazines are disposed at an angle to conform to the angular disposition of the reciprocable suction pads 25 at the label withdrawing station and, as illustrated in FIGS. 23 and 24, each magazine 545 comprises, in general, a rectangular open work frame structure 648 having a plurality of upright guide bars and mounted for lateral adjustment on slotted support bars 650 secured to a base 652. The base plate has a large opening therein through which the bottoms of the magazine extend, and the ends of the base plate are reduced in width and provided with tongues 654 fitted into grooved members 656 attached to the turret support frames 576, 562. The upper end of the base member is hingedly mounted on a rod 658 extended between the frame members 576, 562 to permit the entire magazine assembly to be conveniently rocked up out of the way to provide access to the turret mechanism when required. Any suitable means, not shown, may be provided to retain the magazine assembly in its upwardly rocked position. Suitable clamp means indicated at 661 may be used to retain the assembly in its downwardly rocked operative position.

The angular disposition of the magazine permits the stack to be aligned edgewise against the front side rails 659 of the magazine so that successive labels are registered in corresponding relationship upon successive suction pads for uniform disposition of the labels on the bottles. As herein shown, opposed marginal edges of the endmost labels in the stack bear against spaced parallel cross rods 660 supported for vertical movement in slots provided in depending guide bars 662. Weights 664 bear against the top of the stack to maintain the endmost labels against the cross rods. The weight of the stack causes the endmost labels to bow downwardly between the spaced cross rods 660, as diagrammatically illustrated in FIGS. 25, and in operation the marginal edges of the suction pad engage the rods to lift the stack and, simultaneously therewith, the central portion of the suction pad pneumatically engages the bowed central portion of the label. In order to permit the lowermost label to be freely withdrawn from the stack provision is made for relieving the weight of the stack during the withdrawing operation. In operation the suction pads 25 engage the cross rods and raise the entire stack a short distance in the magazine, and at this time gripper pads 666, 668 engage opposite sides of the stack to hold the major portion thereof in its raised position during the withdrawing operation permitting only a few labels at the lower end of the stack to be free. The gripper pads 668 engaging one side of the stack may be stationary and are arranged to cooperate with the movable gripper pads 666 engageable with the other side of the stack. The suction pads 25 are provided with a central row of suction openings 706 for engagement with the bowed out endmost label, and during the withdrawing operation the downward pull on the center of the free endmost label operates to pull the marginal edges of the label out from under the cross rods 660. The suction pad 25 is further provided with marginal suction openings 708 which then draw the marginal edges of the label flat against the suction pad.

The movable gripper pads 666 are mounted on arms 670 fast on rocker shafts 672 journaled in brackets 674 secured to the base plate 652. The rocker shafts 672 are also provided with arms 676 fast thereon, the upper ends of which carry pivotal studs 677 having lateral clearance openings therein through which an operating rod 678 is extended. The operating rod 678 is arranged to cooperate with the piston of an air cylinder 680 supported in a bracket 682. The pivotal studs 677 are confined between spaced collars 684 fast on the rod, and a coil spring 685 is interposed between one of the collars and the pivotal stud as shown. The air cylinder 680 may be actuated by a cam operated valve at a predetermined time in the cycle to move the operating rod 678 in a direction to effect rocking of the movable gripper pads 666 into resilient engagement with the stack by virtue of the coil springs 685, and after a label has been withdrawn the operating rod is moved in the opposite direction by an elongated spring 685a to effect positive disengagement of the movable gripper pads and to permit the labels to again assume a lowered position in the stack. As diagrammatically shown in FIG. 25, the air circuit to the cylinder 680 may include a valve 681 arranged to be opened by a cam 683 fast on the cam shaft 491 to cause the stack to be clamped in its upraised position immediately after the suction pad effects lifting of the stack as described.

Figure 25:
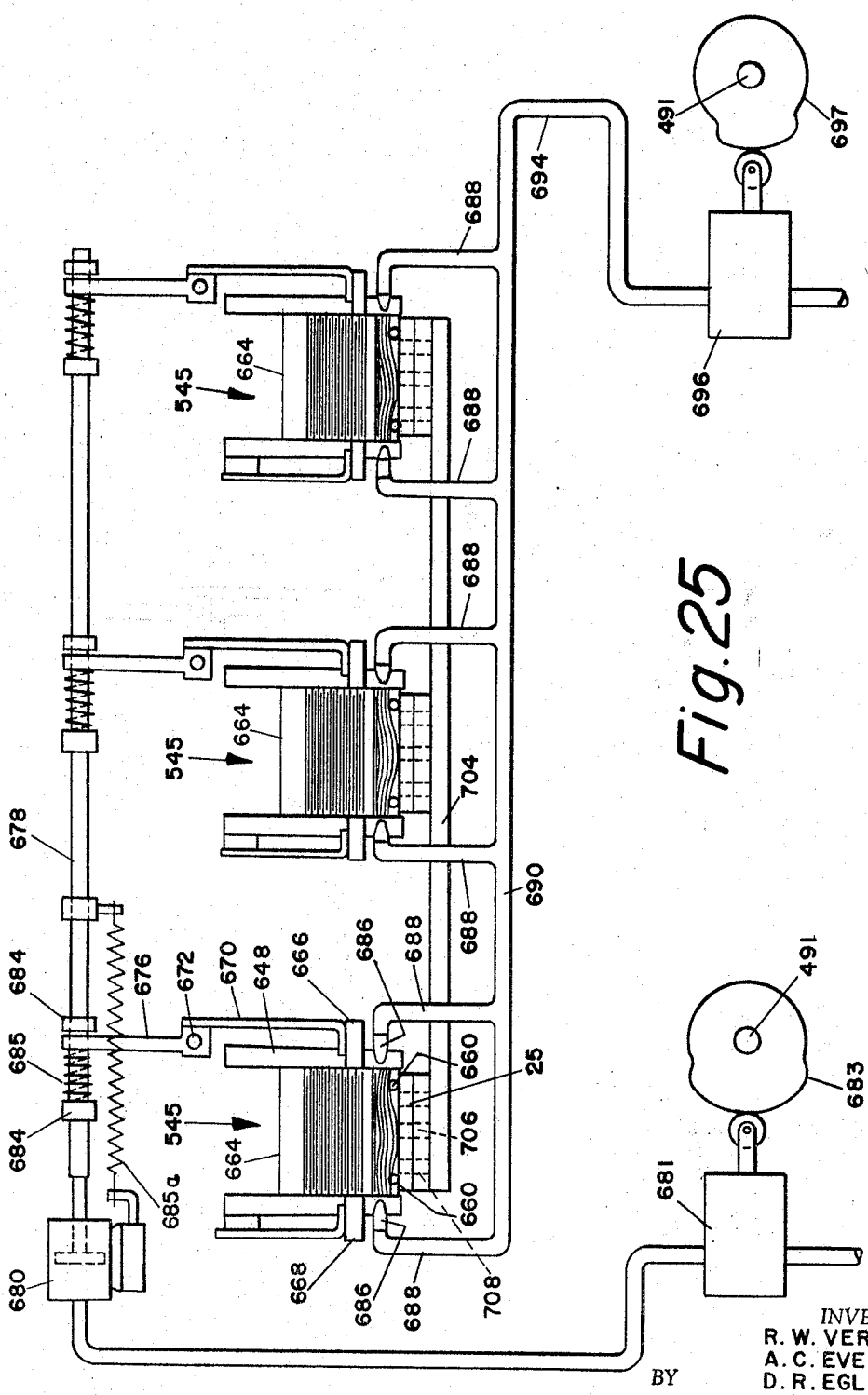
FIG. 25 is a diagrammatic view of penumatic control mechanism associated with the label magazine.

During the withdrawing operation streams of air are directed against the edges of the lowermost free labels for the purpose of separating any labels which may be lightly stuck together by the printing ink thereon and also to prevent the suction pad from being effective to withdraw more than one label at a time, particularly if the labels are somewhat porous. As also shown in FIG. 25, the air may be directed through nozzles 686 supported from the magazine frame. Flexible tubes 688 connect the nozzles to a manifold pipe 690 which may be supported on the underside of the base plate 652. The manifold pipe is connected by a flexible tube 694 to a source of compressed air. As diagrammatically illustrated in FIG. 25, the air circuit to the nozzles 686 may include a valve 696 arranged to be opened by a cam 697 fast on the shaft 491 to cause air to be directed against the edges of the lowermost labels in the magazine during the label withdrawing operation only.

Referring now to FIG. 19, each suction pad 25 includes a resilient facing member 700 of rubber or like material and a metal backing plate 702 secured to an elongated plate 704 attached to the longitudinally reciprocable supporting bar 426. The suction openings 706, 708 in the suction pad 25 communicate with openings 710 leading to an elongated passageway 712 formed in the member 426. A central opening 714 from the passageway 712 communicates with passageways 716, 718 in the bar 537 which in turn communicates with a passageway 720 formed in the radial arm 540. The passageway 720 communicates with a port 722 formed in the housing 558. The housing 558 is provided with passageways 723, 724 leading from the port 722 to an air chamber formed in the housing and in which a valve member 725 is mounted for movement in and out. When the valve member 725 is moved in, a grooved portion 726 thereof permits communication between aligned passageways 728, 730, the latter communicating with an annular passageway formed by a reduced diameter portion of the rocker shaft 548. The reduced diameter portion is provided with an opening 732 which communicates with a central passageway 734 extended longitudinally of the shaft 548 and which may be connected at its open end with an adpter fitting 736 connected to a source of vacuum. As illustrated in FIG. 39, the source of vacuum for the suction pads 25 comprises a motor driven vacuum pump 739 having a suction pipe 741 which leads to the adaptor fitting 736 in the end of the rocker shaft 548 of the turret.

Figure 26:
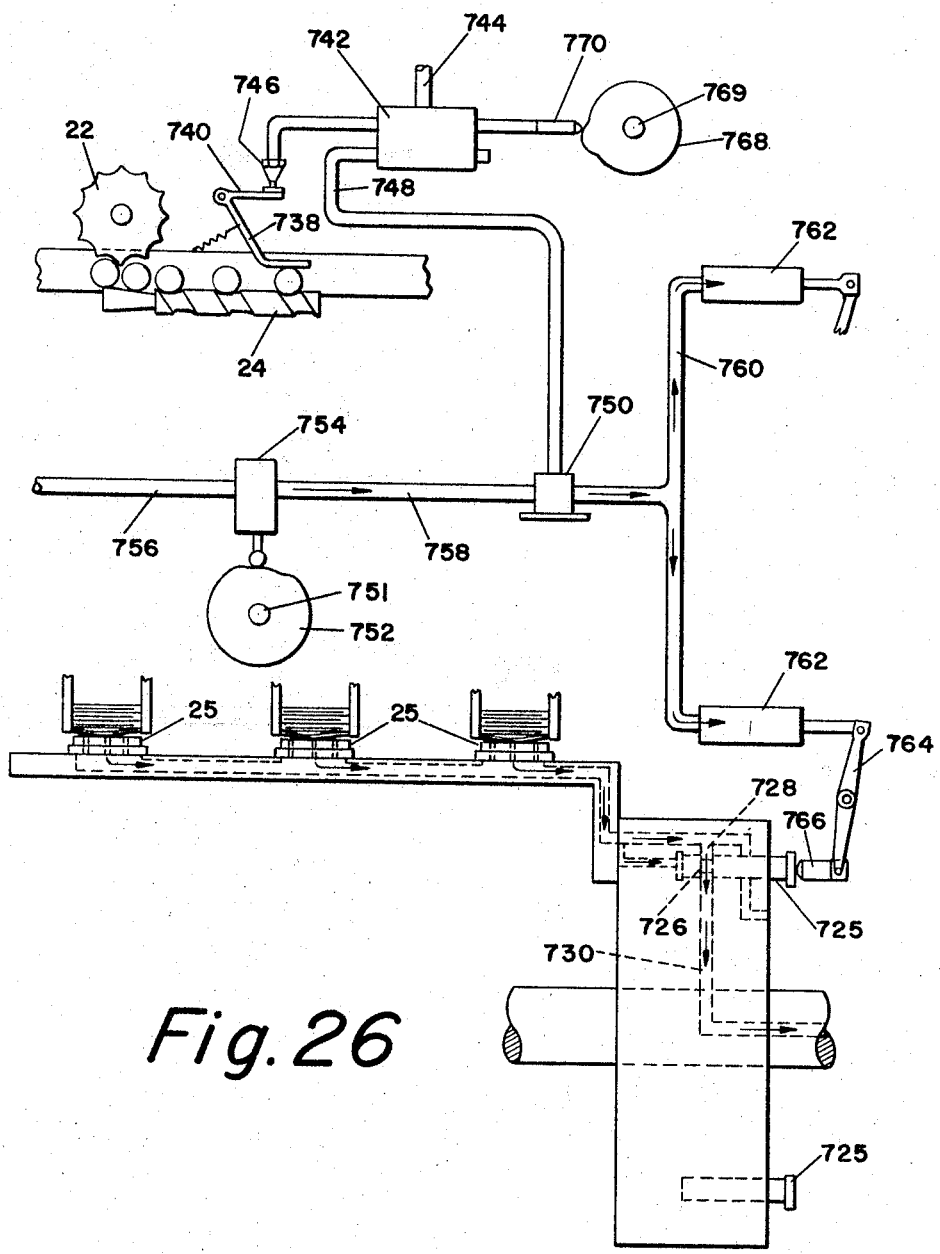
FIG. 26 is a diagrammatic view of pneumatically operated control mechanism for preventing withdrawal of labels in the event that a group of bottles to be labeled are absent.

From the description thus far it will be seen that during the normal operation of the machine, with the valve member 725 in its "in" position, each suction pad 25 withdraws a label from its magazine to be subsequently provided with a coating of adhesive and then applied to the containers. Referring now to FIG. 26, provision is made for controlling the suction to the labeling pads to prevent the withdrawal of labels from the magazines in the event that a group of three spaced containers is not present on the continuously moving conveyer 20 in a position preceding the label applying station, which group of containers would normally arrive at the label applying station at the same time as its respective labeling pads are rotated into label applying position. First, it will be understood that the valve member 725 is normally in its "out" position when it first arrives at the label withdrawing station, in which position the vacuum passageways 728, 730 are cut off, and provision is made for pushing the valve member "in" to its operative position only when incoming bottles are detected on the conveyer. As diagrammatically illustrated in FIG. 26, a pivotally mounted feeler arm 738 is urged into the path of the oncoming bottles at a point adjacent the feed screw 24. The feeler arm is provided with a valve operating arm 740 formed integrally therewith and which is arranged to actuate an air circuit to cause the valve member to be pushed inwardly when the first of a group of three bottles is detected by the feeler arm. Since the intake spider 22 is arranged to deliver the bottles in groups of three only the presence of the first bottle of the group is assurance that a group of three is present on the conveyer. The air circuit includes a four-way shuttle valve 742 connected to a source of air pressure through an inlet pipe 744. When the feeler arm 738 is rocked by engagement with a bottle the valve operating arm 740 acts to close a jet 746 leading from one side of the shuttle valve which effects shifting of the valve to permit air to enter outlet pipe 748 leading to a normally closed valve 750 effecting opening of the same. A cam 752 fast on a shaft 751 is arranged to operate a valve 754 each cycle of operation to permit a pulse of air from a supply pipe 756 to pass through line 758, valve 750 and pipe line 760 leading to similar air cylinders 762 associated with the front and rear turrets, respectively. Each cylinder is provided with a piston connected to one arm of a pivotally mounted two-arm lever 764, the second arm being provided with a plunger 766 arranged to push the valve member 725 to its "in" position, as shown, to align the groove 726 with passageways 728, 730 and thus supply vacuum to the suction pads 25. The cam 752 is arranged to supply a pulse of air for each cycle of operation which conforms to the passage of a group of three bottles, and a second cam 768 fast on a shaft 769 is arranged to bleed air from a valve 770 carried by a pipe leading from the other side of the shuttle valve each cycle of operation to effect shifting and resetting of the shuttle valve 742 to its initial position in readiness for a succeeding detecting operation. As illustrated in FIG. 4, in practice the cam 768 cooperates with a roller 771 fast on one arm of a bell crank 773 pivotally mounted at 775. The second arm of the bell crank, which cooperates with the bleed valve 770, is provided with a spring to hold the roll against its cam. The cam shaft 769 is arranged to be driven through a chain and sprocket drive 777 from the shaft 322. Conversely, if no bottles are present on the conveyer the feeler arm 738 will not be rocked, and the valve 750 will not be opened. As a result, the valve 725 will remain in its "out" position, and no labels will be withdrawn from the magazines during such cycle.

In the normal operation of the machine when the suction pads 25 are withdrawn from the magazines with a full complement of labels, the turret is again indexed through 120° during which time the labels are provided with a coating of adhesive by applying rolls 772 carried by arms 774 arranged to be rocked to present the rolls into engagement with the labels on the suction pads as they are moved past the adhesive applying mechanism. In order to prevent displacement of the labels on their pads when engaged by the rolls 772, the forward edges of the labels are arranged to be held against their pads by leaf spring grippers or clamping members 776 which are mounted fast on a shaft 778 journaled in bearings 780 attached to and movable with the turret heads 542, 544. An arm 782 also fast on the shaft 778 carries a cam roll 784 arranged to cooperate with a cam piece 786 secured to the rocker cam 554. A spring 788 is arranged to urge the arm 782 in a direction to rock the spring clamping members away from engagement with their labels, and the cam 786 is arranged to cause the clamping members to engage their labels.

Figure 17:
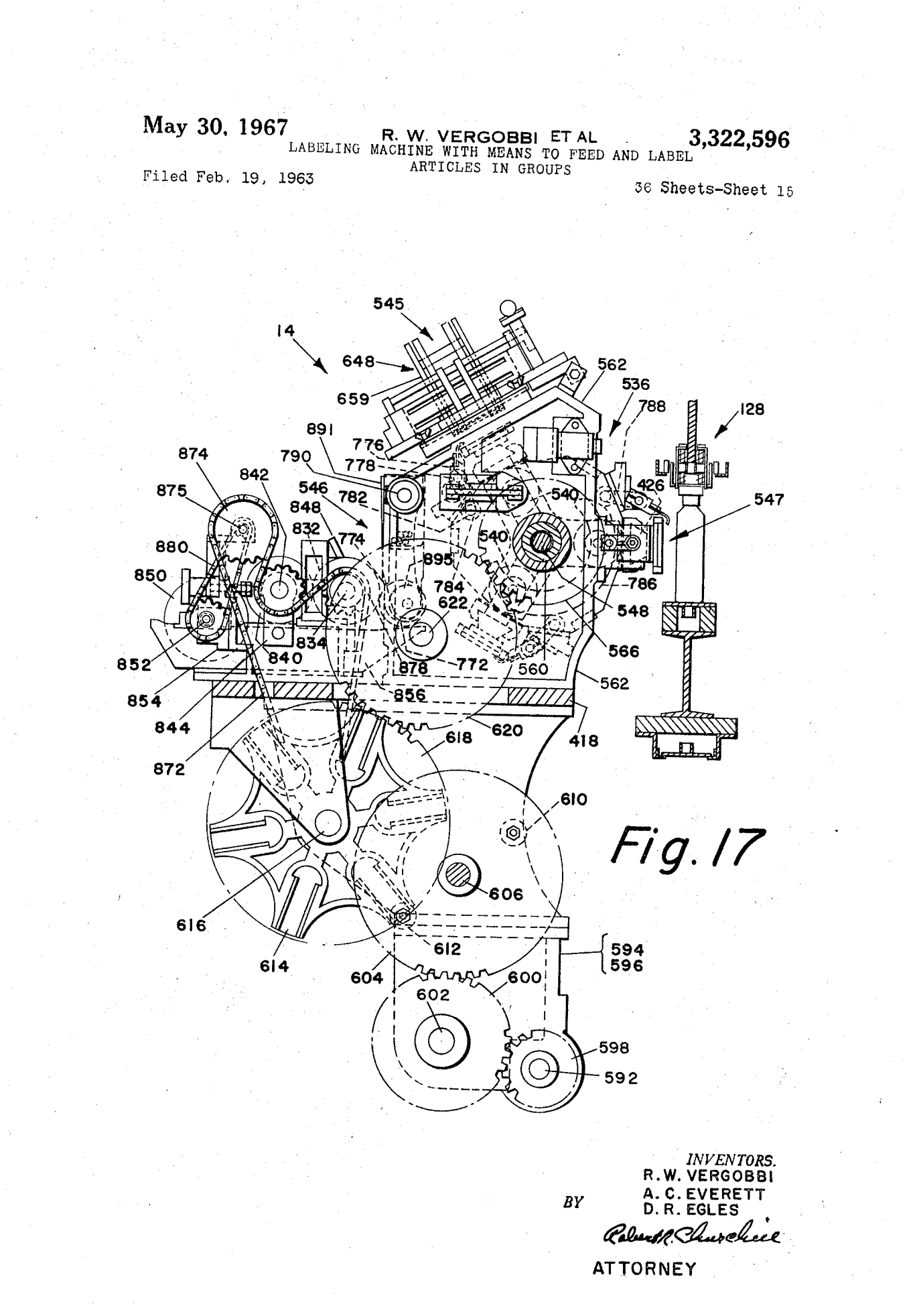

Referring to FIGS. 17 and 20, in operation, when the turret comes to rest the high points of the rocker cam 554 are arranged in front of or to the left of the rollers 550 carried by the radial arms, and at this time the cam piece 786 carried by the rocker cam 554 is in its counter-clockwise rotated position. The rocker cams are now rotated in a clockwise direction to effect radial reciprocation of the suction pads to effect withdrawal of the labels at one station of operation and to effect application of the adhesively coated labels at another station of operation. As the rocker cams 552, 554 approach the end of their clockwise movement, the end 785 of the cam piece 786 engages the roll 784 of the adjacent label gripper unit to cause the clamping members 776 to be rocked into engagement with the forward ends of the labels which have just been withdrawn from the magazines. Concurrently therewith, at the start of the clockwise movement of the rocker cams the other end 787 of the cam piece 786 is moved away from the roll 784 of the gripper unit adjacent the label applying station to effect removal of the clamping members 776 from the labels about to be applied to the bottles. During a succeeding cycle of operation when the rocker cams 552, 554 are rocked in a counterclockwise direction for a portion of the 120° counterclockwise movement of the turret, during which time the withdrawn labels on the suction pads are provided with a coating of adhesive, the roll 784 remains in engagement with the intermediate portion of the cam piece 786 to retain the clamping members 776 in gripping engagement with the labels during the adhesive applying operation. Thus, in operation the leading ends of the labels are clamped to their respective suction pads at the end of the withdrawing operation and remain in clamped condition until just before the start of the label applying operation.

As illustrated in FIG. 16, the arms 774 which carry the adhesive applying rolls 772 are secured to a shaft 790 which is detachably connected at its ends to shafts 791, 793 journaled in the turret side frames 576 and 562, respectively, and a cam lever 792 fast on the shaft 791 is provided with a roll 794 arranged to cooperate with a three-point cam 796, see FIG. 18, secured to and movable with the turret. The shaft 790 is detachably secured to the inner ends of shafts 791, 793 for convenience in removing the adhesive applying rolls as a unit for cleaning or adjusting purposes and, as herein shown, the detachable connections may comprise enlarged portions 795, 797 formed on the inner ends of the shafts 791, 793 which are provided with semicircular recesses adapted to receive the ends of the shaft 790 and similarly recessed cap members 799, 801 secured to the portions 795, 797 in clamping engagement with the ends of the shaft 790 by bolts 803. One end of the shaft 790 may be keyed to its portion 795 as shown.

In operation, as the turret revolves through 120° from the label withdrawing station, the roll 794 is permitted to fall into a low spot in the cam 796 to present the adhesive applying rolls against the labels as they are moved past the adhesive applying station. The cam lever 792 is normally urged to follow its cam 796 by an air cylinder 798 forming a part of an air circuit, indicated generally at 800 in FIG. 27, which forms a part of a safety device to prevent inward movement of the adhesive applying rolls 772 and to thus prevent application of adhesive to the suction pads in the event that no labels are withdrawn from the magazines, or in the event that only one or two of the suction pads are provided with labels at the label withdrawing station instead of a full complement of three labels. As diagrammatically illustrated in FIGS. 27 and 28, the air circuit 800 includes a four-way shuttle valve 802 connected to a source of air pressure by a pipe 804 connected to the inlet of the valve. Normally, when a full complement of three labels is withdrawn by the suction pads to cover the openings therein, the shuttle valve is in a position to permit air to enter outlet line 806 which leads to the air cylinder 798. The piston of the air cylinder 798 is connected to the cam lever 792, as shown, so that the adhesive applying rolls 772 are rocked into operative position to apply adhesive to the labels as permitted by the low point of the cam 796 during movement of the turret, the cam lever 792 being again moved out against the pressure of the air in cylinder 798 by the high point of the cam before the turret comes to rest.

Figure 27:
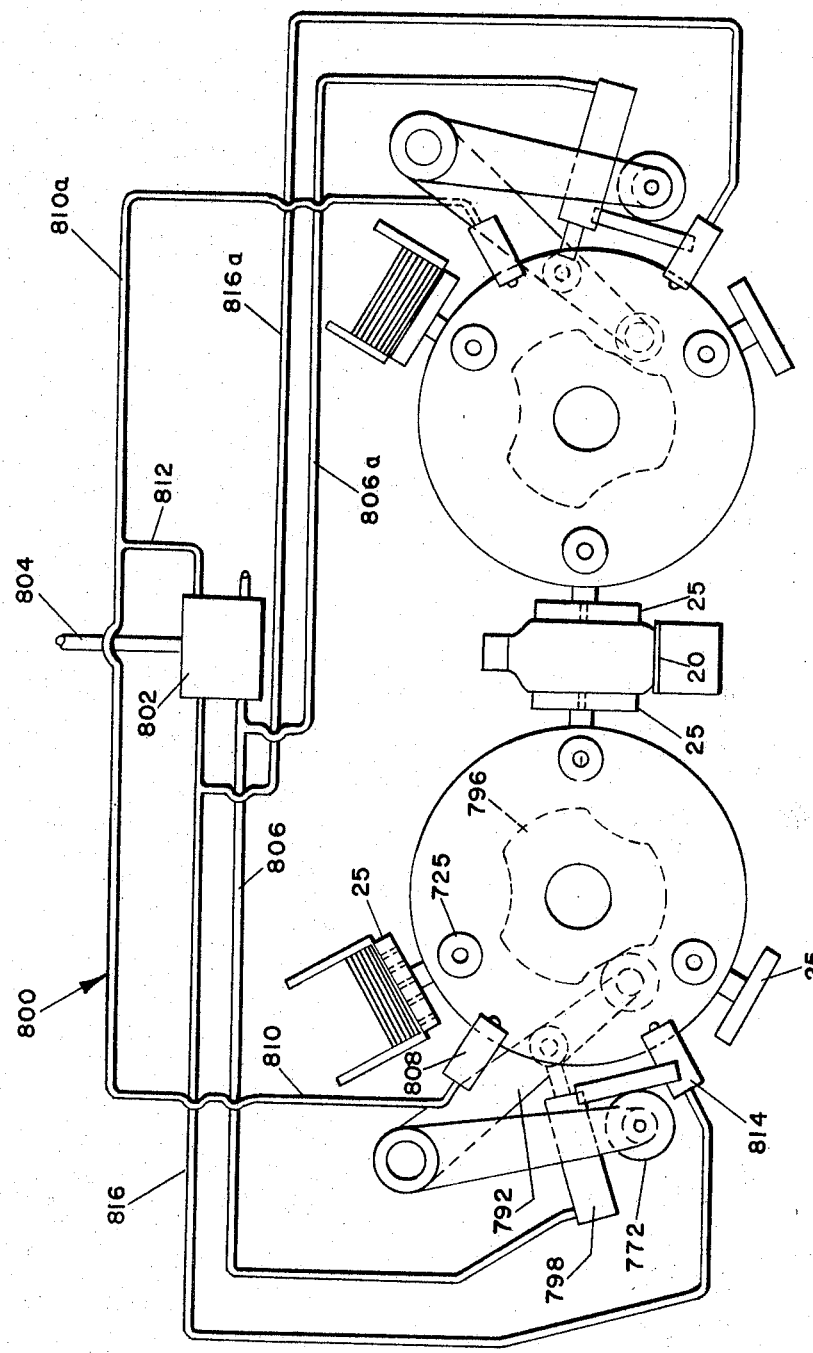
FIG. 27 is a diagrammatic view of pneumatically operated control mechanism for rendering the adhesive applying mechanism inoperative in the event that the suction pads failed to withdraw a full set of labels.
Figure 28:
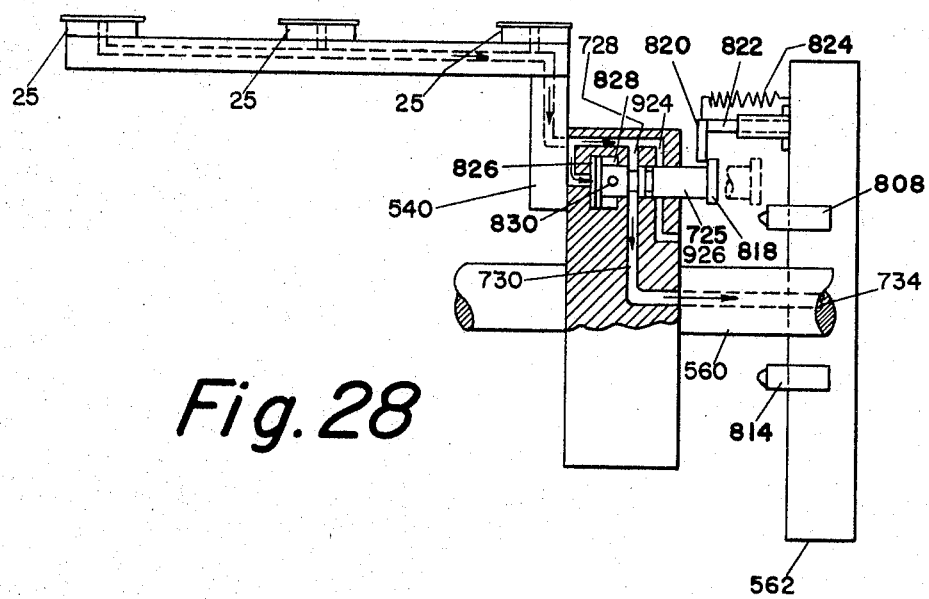
FIG. 28 is a side elevation of portions of the same shown partly in cross section.

As diagrammatically illustrated in FIGS. 27, 28, under one condition of operation, when no labels are withdrawn because of the failure to detect an incoming group of bottles on the conveyer, the control valve 725 remains in its "out" position, and when so positioned the outer end of the valve 725 will engage a bleed valve 808 during the initial portion of the movement of the turret. The bleed valve 808 is connected by pipes 810 and 812 to one side of the shuttle valve 802 which is arranged to shift the shuttle valve to cut off the air through outlet pipe 806 and to the cylinder 798, and as a result the piston is caused to pull the cam lever 792 and the adhesive applying rolls 772 to their outward or inoperative position, thus preventing adhesive from being applied to the labelless suction pads 25.

After the suction pads pass the adhesive applying area, a high point of the cam 796 acts to positively hold the adhesive applying unit in its outer or inoperative position and, at this time, before the turret comes to rest, the control valve 725 in its "out" position engages a second bleed valve 814 which is connected by a pipe 816 to the other side of the shuttle valve which resets the same to again permit air to pass to the cylinder 798 to urge the adhesive applying roll inwardly in readiness for a succeeding cycle of operation. However, since the roll is positively held out by the high point of cam 796 at this time it will remain out until the following cycle of operation to effect application of adhesive to the succeeding group of three labels during the normal operation of the machine.

Under another condition of operation, when a group of bottles is detected on the conveyor and the control valve 725 is pushed "in" to provide suction to the pads 25 it may be that only one or two labels are withdrawn leaving one or two suction pads free of labels. Under such conditions provision is made for pulling the control valve 725 to its "out" position at the label withdrawing station so as to prevent subsequent application of adhesive to the bare suction pads during the succeeding indexing operation. As herein shown, the outer end of the control valve 725 is provided with a flanged head 818. A retracting plate 820 disposed to engage the underside of the head 818 when it arrives at the label withdrawing station is mounted on a slide rod 822 supported from the turret side frame 562. A spring 824 connected to the retracting plate 820 is normally arranged to urge the valve 725 to its "out" position. However, as illustrated in FIG. 28, the inner end of the control valve is provided with a flange disk 826 operating in a chamber 828 which is open to the atmosphere through a passageway 830. In operation, when the valve is moved to its "in" position by the plunger 766 in response to the presence of a group of bottles on the conveyor, vacuum is ported to the suction pads through the grooved portion of the valve, as described, and also to the front of the chamber 828 which operates on the flange disk 826 to hold the control valve "in." It will be understood that the retracting plate 820 remains in engagement with the head 818 of the valve at this time effecting tensioning of the spring 824. When all of the suction pads openings are covered by their respective labels, the force of the suction being less than the force on the atmospheric side of the disk in the chamber 828 causes the disk to remain "in" despite the influence of the spring 824. However, in the event that one or more of the suction pads failed to withdraw a label when the control valve 725 was reset to its "in" position by the plunger 766 at a time in the cycle when the suction pads initially engaged the labels, the openings in the bare pads will cause a loss of suction so that the pressure differential holding the valve "in" will be insufficient to overcome the tension of the spring 824, and as a result the control valve will be moved to its "out" position. With the valve in its out position it will be seen that upon initial movement of the turret during succeeding indexing cycle, the bleed valve 808 will be engaged to render the adhesive applying mechanism inoperative as above described. The control circuit 800 thus far described has been related to preventing operation of the adhesive applying mechanism forming a part of the labeling mechanism disposed on one side of the conveyor 20 for applying labels to one side of the bottles. However, as diagrammatically illustrated in FIG. 27, the four-way shuttle valve 802 is connected to similar control elements for preventing operation of the adhesive applying mechanism forming a part of the labeling mechanism disposed on the other side of the conveyor 20 for applying labels to the other side of the bottles. In other words, a single shuttle valve 802 is provided for controlling the operation of both adhesive applying mechanisms so that in operation if the suction pads on either one side or the other fail to retain a full complement of three labels, both adhesive applying mechanisms will be rendered inoperative. Thus, in pratice, when both sides of the bottles are to be provided with labels, the bottles will either be provided with labels on both sides under normal conditions, or no labels will be provided on either side if an abnormal condition occurs on one side or the other.

Referring now to FIGS. 16 and 18, it will be seen that each time the adhesive applying rolls 772 are rocked outwardly they engage a glue supply roll 832 fast on a shaft 834 mounted for rotation in bearing brackets 836, 838 attached to the platen 418. A rotating spreader roll 840 cooperating with the supply roll is fast on a shaft 842 journaled in bearing brackets 844, 846 mounted to be resiliently and adjustably urged to press the spreader roll against the supply roll to spread the glue into a thin film. A scraper 848 is arranged to cooperate with the supply roll as shown. A glue feed disk 850 fast on a shaft 852 journaled in bearings 854 is arranged with its lower portion extended into a supply of glue contained in a glue pot 856 which is supported on the platen 418 beneath the glue rolls. In operation the feed disk 850 deposits a supply of glue onto the spreader roll 840 to be carried between the rolls 840 and 832.

Figure 29:
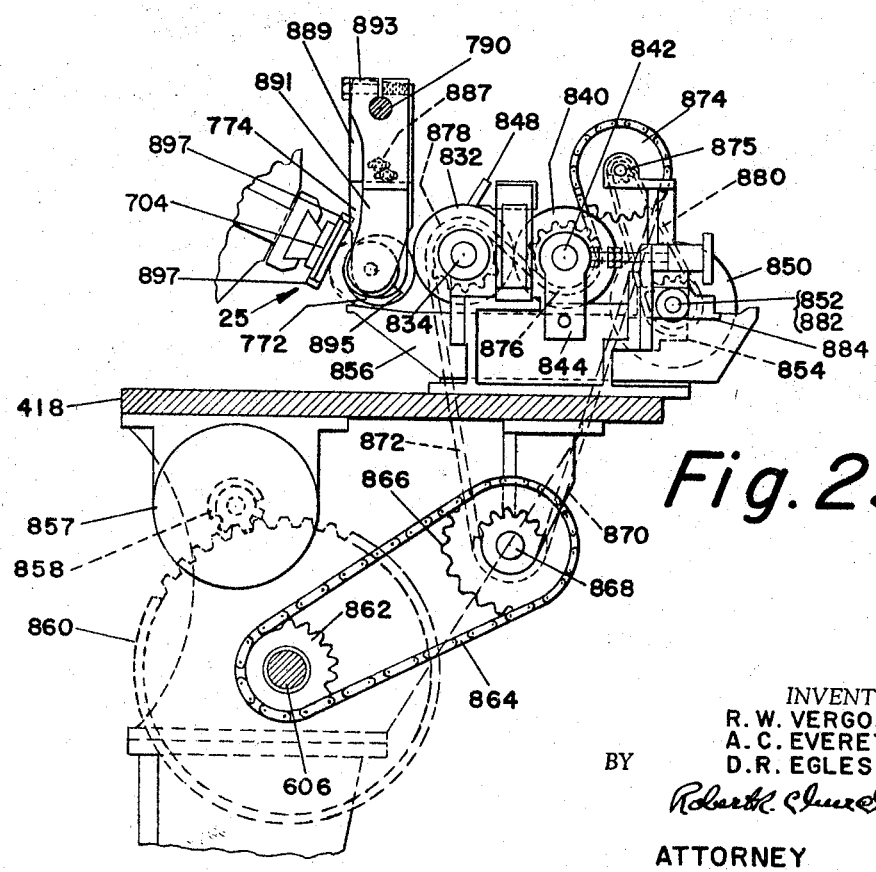
FIG. 29 is a side elevation of the adhesive supply rolls and the drive therefor.

Provision is made for driving the glue rolls continuously and independently of the operation of the labeling mechanism so as to maintain continuous circulation of the supply even though the labeling mechanism is temporarily stopped whereby to prevent hardening of the adhesive onto the rolls. As shown in FIG. 29, a driving motor 857 supported on the underside of the platen 418 is provided with a gear 858 which meshes with a gear 860 mounted for rotation on the stationary shaft 606. A sprocket 862 attached to and rotatable with the gear 860 is connected by a chain 864 to a sprocket 866 fast on a short shaft 868 supported for rotation in a bracket 870 attached to the underside of the platen. The shaft 868 is connected by a second chain and sprocket drive 872 which passes around an idler sprocket 874 and sprockets 876, 878 connected to the spreader roll shaft 842 and supply roll shaft 834, respectively, as shown. A chain and sprocket drive 880 connects the idler sprocket shaft 875 to a short shaft 882 mounted for rotation in a bearing 884 and which has a separable connection, indicated at 885, with the glue feed disk shaft 852, so as to facilitate removal of the glue pot 856 for cleaning purposes.

As herein illustrate, each arm 774 carrying an adhesive applying roll 772, is independently mounted on the shaft 790 and is adjustably secured by a bolt 887 to a slotted arm 889 keyed to the shaft. Thus, in operation each roll may be adjusted to cooperate with its respective label carrying pad 25. Provision is also made for limiting the inward movement of the arms 774 to guide the same across the flat label applying pads and to cause the rolls to bear with equal pressure along all portions of their respective labels during the adhesive applying operation. As herein shown, an arm 891, also adjustably secured to a slotted arm 893 keyed to the shaft 790, carries a roller 895 which is arranged to engage a metal bar 897 secured to the pad carrying plate 704. Thus, in operation, when the applying rolls 772 are rocked into operative relation to the pads 25, the roller 895 engages the metal bar 897 to guide the rolls 772 along the flat label carrying surface with equal pressure to effect application of a thin film of adhesive to the labels.

Figure 30:
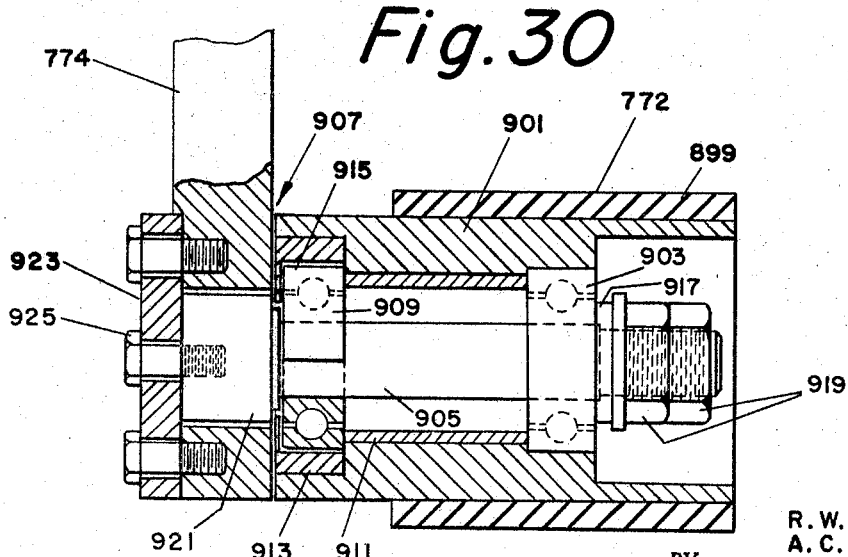
FIG. 30 is a detail view in cross section of an adhesive applying roll.

Provision is also made for mounting each adhesive applying roll 772 in a manner such as to permit self-alignment of the roll with the surface of its label carrying pad 25. As shown in FIG. 30, each roll 772 comprises a cylindrical band 899 of rubber or like resilient material which is carried by a hollow sleeve 901 mounted for rotation on a ball bearing 903 carried by a stud 905 secured to its arm 774. The ball bearing 903 is of a type which permits the roll mounting to rock axially to align itself with the surface of the label pad 25 when it is pressed thereagainst. It will be observed that there is a clearance space 907 between the inner end of the hollow sleeve 901 and the adjacent surface of the arm 774 to permit such axial rocking movement. In order to limit the rocking movement a second ball bearing 909 is provided at the inner end of the stud 905 and which is separated from the ball bearing 903 by a sleeve 911. The outer race of the ball bearing 909 extends into a recessed collar 913 which is pressed into the inner end of the sleeve 901. A clearance space 915 is provided between the outer race of the ball bearing 909 and the recessed portion of the collar 913 so that when the hollow sleeve 901 is rocked the collar 913 will engage the outer race of the ball bearing 909 to limit such rocking movement. The assembly is retained on the stud 905 by washers 917 and lock nuts 919.

Provision is also made for permitting adjustment of the stud 905 and roller mounting radially with respect to its supporting arm 774. As herein illustrated, the stud 905 is provided with a shoulder portion 921 which extends through an enlarged clearance opening in the arm 774 and is also provided with a head or flange 923 connected to the arm 774 by bolts 925 which extend through enlarged clearance openings in the flange. Thus, by loosening the bolts 925 the entire roll mounting may be adjusted radially and then bolted in its adjusted position.

Figure 22:
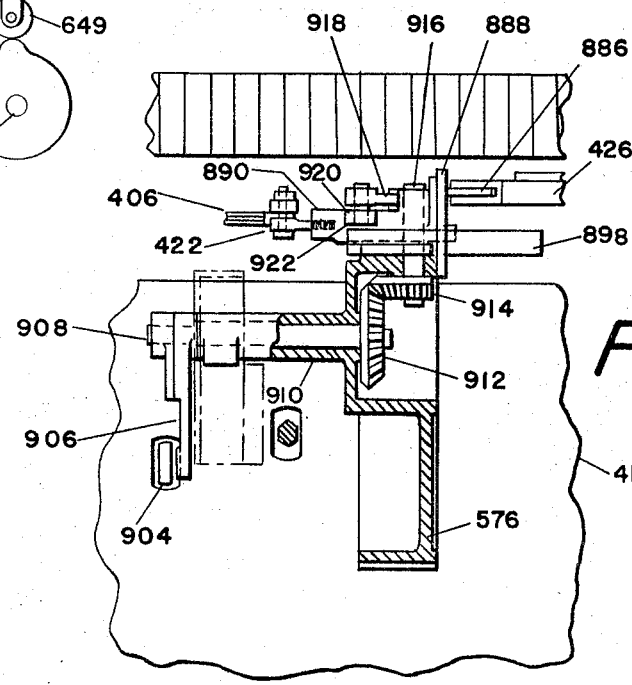
FIG. 22 is a plan view detail partly in cross section of a drive connection common to the centering mechanism and the labeling mechanism.

From the description thus far it will be seen that the labels withdrawn from the magazines at one station of operation are supplied with a coating of adhesive during the indexing of the turret to the next station of operation, which comprises an idle station. The next succeeding indexing cycle presents the suction pads and their adhesively coated labels to the label applying station where the suction pads are extended in the manner described to apply the labels to a group of bottles arriving into operative relation thereto. At this time, provision is also made for moving the suction pads longitudinally along with the continuously moving bottles and at the same rate of speed as the bottles. As illustrated in FIGS. 19 and 22, the longitudinally reciprocable pad supporting bar 426 on which the suction pads 25 are mounted is provided with a roller 886 at the trailing end thereof for cooperation with a curved plate 888 attached to a slide member 890 disposed at the label applying station. The pad supporting bar 426 is normally maintained in a retracted position by an elongated spring 892 connected at one end to the forward end of the bar 426 and at its other end to the grooved supporting member 537 and is adjustably limited in its retracted position by a stop bar 894 secured to the forward end of the bar 426 and which carries stop screws 896 engageable with the forward end of the grooved supporting member 537. In operation, when the pad supporting bar 426 approaches the label applying station as it is being indexed into label applying position, the roller 886 engages the curved plate 888, and the plate then starts to move the pad carrying bar forwardly so that when the pads 25 are radially extended after the turret comes to rest they will be aligned with and traveling at the same rate of speed as the bottles to be labeled. The labels are applied to the bottles when the pads reach their maximum limit of radial extension, and during the radial retracting movement of the pads, the curved plate 888 starts its return movement and continues its return movement during the initial portion of the next succeeding indexing movement so as to return the pads 25 to their initial position in alignment with the label magazines when the turret again comes to rest.

As illustrated in FIGS. 18 and 22, the slide member 890 which carries the curved bar 888 is mounted for reciprocation in a grooved bracket 898 secured to the turret side frame 576 and is arranged to be reciprocated in timed relation to the movement of successive groups of three bottles by mechanism including a cam 626 mounted on the stationary shaft 606. As previously described, the cam 626 is connected to rotate with the cams 624 which effects radial reciprocation of the suction pads. A cam roll 900 carried by a pivotally mounted lever 902 cooperates with the cam 626, and the lever is connected by a link 904 to an arm 906 fast on one end of a shaft 908 journaled in a bearing 910 extending from and formed integrally with the turret side frame 576. The other end of the shaft 908 is provided with a bevel gear 912 which meshes with a segmental bevel gear 914 fast on one end of a shaft 916 journaled in the side frame 576. The other end of the shaft 916 is provided with an arm 918 fast thereon which carries a roller 920 received in a slotted portion 922 of the slide member 890. Thus, in operation, when the arm 918 is rocked through the connections described, the slide member 890 is reciprocated to effect longitudinal movement of the suction pads along with the continuously moving group of bottles to apply the labels thereto and thereafter permits return of the suction pads to their initial position.

As also illustrated in FIG. 22, the link 422 connected to the slide 406 of the centering and aligning mechanism 12 is threadedly connected to the slide member 890 to effect reciprocation of the slide 406 simultaneously with the reciprocating movement of the pad supporting slide bar 426. It will be understood that a similar connection is provided between the corresponding slide member of the opposing labeling mechanism and the adjacent slide bar 404.

Referring now to FIG. 19, it will be seen that the air passageway 716 is elongated so that the opening 714 is maintained in communication therewith during the longitudinal extension and retraction of the pad supporting bar 426. In operation, when the suction held and adhesively coated labels engage the bottles, provision is made for cutting off the suction to the pads 25 and for substituting air under pressure to release the labels from the suction pads and to permit the labels to be adhesively retained by the bottles. As shown in FIG. 19, the suction pads 25 are connected to a source of vacuum when the control valves 725 are in their "in" position, through aligned passageways 728, 730 and the grooved portion 726 of the control valve, as previously described. When the valve 725 is moved to its "out" position, the grooved portion 726 is moved out of alignment with the suction passageways 728, 730 to cut off the suction to the pads, and the grooved portion is moved into alignment with different passageways 924, 926 to permit compressed air to flow to the pads 25. The compressed air passageways include an elongated passageway 928 formed in the sleeve shaft 560 which connects passageway 926 with a vertical passageway 930 formed in the turret side frame 562. The passageway 930 leads to a bored opening 932 formed in a bracket 934 secured to the side frame 562 as illustrated. The bore 932 slidingly receives a spindle 936 which is provided with a grooved portion 938. When the spindle is moved to the right, viewing FIG. 19, the grooved portion 938 is aligned with the passageway 930 and is also aligned with a passageway 940 formed in the bracket 934 which also communicates with the bored opening 932. The passageway 940 is provided with an inlet pipe 942 which may be connected to a source of compressed air.

One end of the spindle 936 is provided with a hook member 944 arranged to engage behind the head 818 of the control valve 725 when the latter is in its "in" position. The spindle 936 is normally extended to the left so that when the turret is indexed to its labeling position the head 818 of the control valve 725 will be moved into operative position behind the hood member 944 as shown in FIG. 19. The other end of the spindle 936 is connected by an arm 946 to the stem of a piston operating in a double acting air cylinder 948 forming part of a cam operated control mechanism diagrammatically illustrated in FIG. 31. As therein shown, the air cylinder 948 is connected at one end by an air pipe 950 to one outlet of a four-way air piloted valve 952 and is connected at its other end by an air pipe 954 to a second outlet of the air piloted valve. The air piloted valve 952 is connected by a pipe 956 to a source of compressed air and is also connected by an air pipe 958 to a normally closed three-way cam operated valve 960. The valve 960 is provided with a stem having a roller 962 which cooperates with a cam 964 fast on a shaft 966 and which makes one revolution each cycle of operation of the turret.

In operation the cam 964 is arranged to open the three-way valve 960 at a time in the cycle when the suction pads 25 engage the bottles to cause the valve 960 to pass a pulse of compressed air to the pilot valve 952. This causes power to shift from line 950 to line 954 to move the piston in air cylinder 948 to the right causing it to pull the air control valve 725 to its "out" position. This terminates the vacuum to the suction pads and allows the pressure from supply pipe 942 to be ported through the grooved portion 938 and passageways 940, 930 to aligned passageways 926, 924 through the grooved portion 726 to the pads 25 to release the labels as described. Conversely, when the cam 964 rotates to permit the valve 960 to close, the power is again shifted to line 950 to effect return of the hook member 944 to the left, and the control valve 725 remains in its "out" position until subsequently pushed "in" in response to detection of a new group of bottles on the conveyor as previously described. It will be understood that the single passageway 930 in the side frame 562 is in a position such that successive passageways 928 in the sleeve shaft, one for each control valve respectively, come into alignment with the passageway 930 each time the turret comes to rest. It will be observed that the spindle 936 is limited in its movement to the right by engagement of the shoulder 937 of the hook member 944 with a resilient stop collar 939 secured to the bracket 934 and which is arranged to align the grooved portion 938 of the spindle with the passageway 940 and the air inlet pipe 942.

The continuously moving bottles with their labels adhesively applied have their labels merely "tacked" on at the label applying station, and during their continued movement successive groups of three bottles are moved into operative relation to the wiping mechanism 16. As illustrated in FIGS. 32 and 33, the wiping mechanism includes a series of six label wiping pads 17 or two sets of three wiping pads arranged to effect two successive pressing operations on successive groups of three bottles to press the tacked labels into firm adhesive engagement with the bottles. Each pad 17 may comprise a resilient rubberlike material and may conform to the shape of the bottle against which it is pressed. Each rubber pad 17 is secured to a block 968 which in turn is attached to the end of an elongated bar 970 by a bolt 972. The bar 970 is square in cross section and is slidingly mounted in a bracket 974 secured to and movable with a supporting table 976. One or more elongated springs 978 are connected at one end to an angle bracket 980 secured to the inner end of the bracket 974 and which also serves as a gib for the square bar 970. The other ends of the springs 978 are connected to an angle bracket 982 which is attached to the outer end of the bar 970. A second gib 984 is also secured to the bracket 974 at a point intermediate the inner and outer edges of the table 976 as shown. The springs 978 are arranged to urge the slide bar 970 and its wiping pad 17 inwardly as limited by a resilient stop 987 attached to the gib 984 and which is engaged by a portion 983 of the angle bracket 982, leaving the bar free to yield when the wiping pad is pressed against its bottle as shown in FIG. 35. It will be observed that there are three brackets 974 secured to the supporting table 976, each bracket carrying two pad carrying slide bars 970 as illustrated.

As shown in FIGS. 34 and 35, the supporting table 976 is arranged to be moved through an orbital path which includes a movement inwardly to present the pads 17 into and out of engagement with the continuously moving bottles and a simultaneous movement longitudinally along with the bottles during the wiping operation, and to return the table to its initial position after the wiping operation. This compound movement is effected by a pair of crank mechanisms indicated generally at 985 which include crank pins 986 extended into openings in and bolted to spaced brackets 988 secured to the underside of the table 976. The brackets 988 are slidably mounted on spaced elongated rods 990 which are supported at their ends in roll carrying members 992. Each member 992 is provided with a pair of rolls 994 arranged at right angles to each other for engagement with angular surfaces 995, 996 provided in opposed guide brackets 998, 1000 attached to the platen 418. Thus, in operation, when the crank mechanisms are rotated the table 976 is moved laterally toward and away from the bottles and, simultaneously therewith, the table 976 is moved longitudinally on the rods 990 along with the bottles during the forward stroke, and is moved in the opposite direction during the return stroke.

The crank mechanisms 985 include a pair of cranks 1002 keyed to the upper ends of vertical crank shafts 1004 arranged to be rotated at a constant and uniform angular velocity, and provision is made for modifying the crank motion in a manner such as to retard the inward movement component whereby the wiper pad 17 remains in engagement with its bottle through a substantially longer time than it would otherwise. As herein shown, each crank 1002 is provided with a slotted portion 1006 arranged to receive a rectangular bushing 1008 through which its crank pin 986 extends. The upper end of the crank pin is non-rotatably secured to its bracket 988 by a nut 989, and the lower end of each crank pin carries a roller 1010 which rides in the path 1012 of a stationary cam 1014. The cam 1014 is bolted to a bearing bracket 1016 secured to the platen 418. As herein illustrated, the cam path 1012 is shaped to guide the wiper table and the wiper pads through a substantially rectilinear longitudinal movement when the wiper pads engage their bottles. Thus, in operation, while the cranks are rotated at a uniform angular velocity, the movement of the crank pins is modified by the stationary cams to provide a movement substantially parallel to the direction of movement of the bottles and at the same speed as the bottles through about 120° of the rotation of the cranks which corresponds to about four inches of the longitudinal travel of the bottles. In practice each crank pin 986 is moved radially inwardly toward its crank shaft during its travel through the first 60° of its modified movement by the stationary cam to produce uniform longitudinal components equal to the speed of and parallel to the bottle movement. Thereafter, during the next 60° of its modified movement, the crank pin is moved radially outwardly from the crank shaft to continue the uniform longitudinal components equal to the speed of and parallel to the bottle movement. It will be understood that the wiper pads 17 are in resilient engagement with their bottles during a substantial portion of this travel by virtue of the resiliency of the rubber pads and by virtue of the elongated springs 978 to assure firm pressing engagement of the pads with the labels on the bottles during the wiping operation. It will also be observed that each group of three bottles receives two wiping operations by virtue of the six wiping pads so that while one group of three bottles is being wiped during one cycle of operation, the preceding group of three bottles is receiving its second wiping operation during the same cycle.

As illustrated in FIG. 32, the crank shafts 1004 are arranged to be rotated at a uniform rate one revolution each cycle of operation through connections from a gear 1018 which is formed integrally with the gear 604 mounted for rotation on the stationary shaft 606, the gear 604 being one of a train gears which drives the Geneva mechanism 614 as previously described. The gear 1018 is in mesh with an idler gear 1020 which in turn meshes with a gear 1022 fast on a shaft 1024 journaled in bearings 1026 attached to the underside of the platen 418. The shaft 1024 is also provided with bevel gears 1028, 1030 which mesh with bevel gears 1032, 1034 respectively, the latter being fast on the lower ends of the crank shafts 1004. Thus, in operation the crank shafts are rotated at a uniform angular velocity in timed relation to the travel of the bottles.

Figure 36:
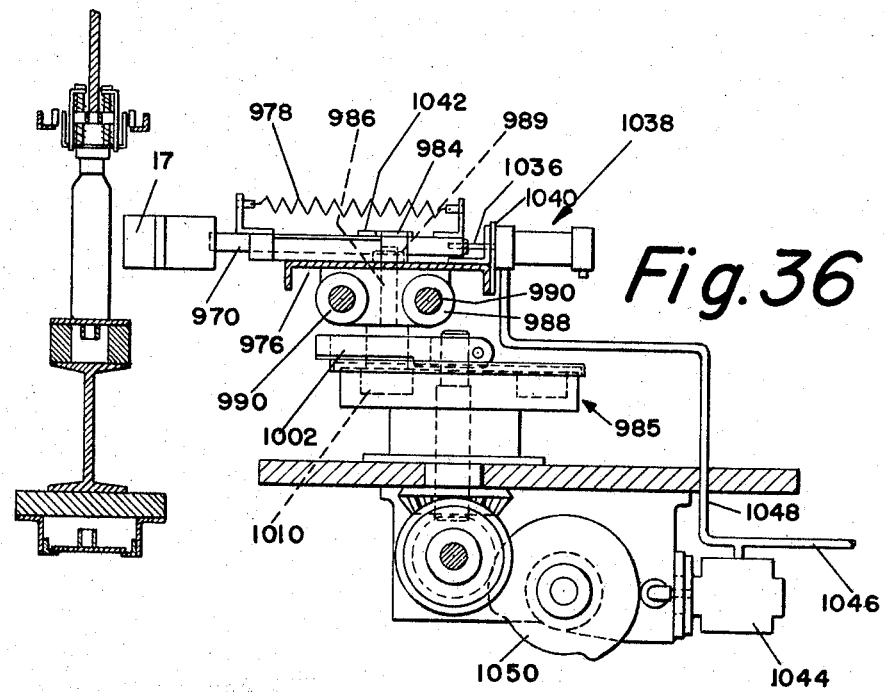
FIG. 36 is a side elevation of a modified form of the wiping mechanism shown partly in cross section.

In the above-described embodiment of the wiping mechanism it will be observed that the elongated springs 978 serve to yieldingly urge the wiping pads 17 into engagement with the bottles to provide sufficient pressure to press the labels into firm adhesive engagement with their bottles, and during the return stroke of the cranks 1002 the wiping pads are retracted with the slide bars 970 which are limited in their forward movement by the stops comprising rubber facings 987. In a modified form of the invention, as illustrated in FIG. 36, the outer end of each pad carrying slide bar 970 is connected to the stem 1036 of a piston operating in an air cylinder 1038 mounted on an angle bracket 1040 carried by the wiper table 976. In the modified embodiment of the invention the springs 978 are similarly arranged to urge the slide bars 970 and their wiping pads inwardly toward the bottles, but the air cylinders 1038 are arranged to normally hold the slide bars opposed side frames. The short shafts are connected by chain and sprocket drives 1176, 1178 to an elongated shaft 1180 which in turn is connected by a chain and sprocket drive 1182 to a short shaft 1184 journaled in a bracket 1186 attached to the laterally adjustable bracket 1102 as shown. An extension of the shaft 1184 is provided with a handle 1188. In operation rotation of the handle will effect rotation of the vertical adjusting screws 1156, 1158 through the connections described to bodily adjust the entire platen supporting unit vertically with relation to the bottles on the conveyor.

As illustrated in FIGS. 3 and 4, a hand wheel 1190 is provided for rotating the driving elements manually for testing and adjusting purposes. The hand wheel is fast on the outer end of an axially movable shaft 1192 journaled in a bracket 1194 attached to the machine frame. The inner end of the shaft 1192 is provided with a bevel pinion 1196 arranged when the shaft 1192 is pushed inwardly to engage a bevel gear 1198 fast on the shaft 170 which is coupled to the main driving shaft 44. A pivotally mounted locking bar 1200, when in its down position, is confined between a collar 1202 fast on the shaft 1192 and the adjacent arm of the bracket 1194 which prevents inward movement of the shaft 1192 until the bar is lifted. The bar 1200 in its lifted position is arranged to actuate a microswitch 1204 forming a part of the motor circuit, as illustrated in FIG. 3, and which is arranged to assure that operation of the motor is discontinued before the bevel gears 1196, 1198 are engaged for manual operation. A second pivotally mounted locking bar 1206 which normally rests on top of the collar 1202 is arranged to rock down in back of the collar when the shaft 1192 is moved inwardly into manual driving engagement so as to prevent disengagement of the gears during manual operation.

In the preferred form of bottle intake mechanism, as herein described, the intake spider is arranged to be brought to rest in response to a slowdown in the bottle supply as evidenced by a gap in the incoming solid line of bottles. The driving mechanism to the intake spider 22 includes a one revolution clutch 184 arranged to bring the spider to rest on a quadrant so as to assure release of three bottles into the machine before the spider comes to rest. As also herein disclosed, a reservoir of a solid line of bottles is maintained on the supply conveyor to permit the intake spider to remain in operation during the initial portion of the slowdown in the bottle supply and until the reservoir is substantially depleted. Thereafter, when the supply agains fills up the reservoir the one revolution clutch 184 is automatically engaged to continue the feed of bottles into the machine. It will be understood that only the spider 22 comes to rest while the remainder of the machine continues to operate on the bottles already fed into the machine.

In a modified form of bottle intake control mechanism, as diagrammatically illustrated in FIG. 42, provision is made for permitting the entire machine to coast for a predetermined time upon the occurrence of a slowdown in the bottle feed for the purpose of allowing the line of bottles in the supply to catch up and fill up any gaps in the line whereupon the machine will resume its normal speed.

As diagrammatically illustrated in FIG. 42, the modified control mechanism includes an electrical circuit indicated generally at 1236 which includes the normally closed solenoid valve 238 forming a part of the air circuit 229 for controlling the passage of air from the supply pipe 239 to the air cylinder 232, as previously described in connection with the control mechanism shown in FIG. 9. The detecting mechanism shown in FIG. 42 includes a sensing device 1240 having a plurality of spaced air jets 1244 arranged to project streams of air across the path of the bottles on the supply conveyor 19 and a vane 1245 arranged to be moved by the air streams in the event that there are no bottles present on the conveyer or in the event that a gap is present in the line of bottles. The sensing device 1240 is disposed at a remote distance from the intake spider 22 and a second sensing device 1242 disposed adjacent the intake spider 22 comprises pivotal feeler arm 1243 which may be spring urged into the path of the bottles on the conveyer 19. Under normal operating ocnditions with the conveyer 19. Under normal operating conditions when the conveyer 19 is provided with a solid line of bottles, the normally closed solenoid valve 238 is energized through leads 1246, 1247 and through a normally closed contact 1248 to open the normally closed valve 238 and permit air to pass to the cylinder 232, thus holding the pawl stop 226 out of the path of its pawl and permitting the one revolution clutch 184 to remain in driving engagement.

In operation, when there are no bottles on the intake conveyer, the air from jets 1244 rocks the vane 1245 to close a switch 1250 in parallel line 1251, and the feeler arm 1243 is spring loaded to close a switch 1252 in parallel line 1263. When switch 1252 is closed, relay 1254 will be energized and normally closed contact 1248 will be opened to deenergize the normally closed solenoid 238, thus cutting off the air to cylinder 232 to disengage the one revolution clutch so that the intake spider 22 remains at rest in an indexed position.

The labeling machine motor 28 is started by pressing pushbutton 1255 to energize relay 1257 which closes normally open contacts 1259 and 1265 as diagrammatically shown in FIG. 42. The incoming containers are usually delivered from a preceding machine in spaced relation, and when the leading bottle comes to rest in engagement with the stationary spider 22, the trailing bottles are advanced into contiguous engagement with the leading bottle to form a solid line. During the initial feed of the incoming bottles, when the spaced bottles approach and pass jets 1244 and vane 1245, the switch 1250 remains closed because the individual bottles are of less width than the space between the individual jets so that the air from at least one jet will maintain the vane in its rocked position. Likewise, when the spaced bottles pass feeler arm 1243, switch 1252 is repeatedly operated, but relay 1254 remains energized through contacts 1256, 1260 in holding line 1261, thus preventing closing of normally closed contact 1248 and preventing rotation of the spider 22. Subsequently, when the spaced incoming containers come together to form a solid line and such line extends to the sensing device 1240 to cut off the air from both jets 1244, the vane 1245 is spring returned to effect opening of switch 1250. Relay 1258 is thus deenergized to permit opening of normally open contact 1256 in the holding circuit 1261 and deenergizing relay 1254. As a result, normally closed contact 1248 is permitted to close, thus energizing solenoid valve 238 to effect opening thereof and to permit air to pass to cylinder 232 which permits engagement of the one revolution clutch to start the intake spider and to feed the bottles into the continuously operating labeling machine.

Because the speed of the labeling machine, including the conveyer 20, is slightly greater than the rate of supply of the bottles on the incoming line, the solid line of bottles on the supply conveyor will eventually start to recede from the trailing end of the line toward the intake spider. When the solid line of bottles recedes to a point forwardly of the sensing device 1240, air from jets 1244 will rock vane 1245 to close switch 1250. This will energize relay 1258 to close normally open contacts 1260, 1267 and 1266. Closing of contact 1266 will energize timing relay 1268 which will effect opening of normally closed contact 1270 only after a predetermined time and will hold the contact 1270 open as long as relay 1268 is energized.

However, in the time interval before normally closed contact 1270 opens, a relay 1272 is energized through contacts 1267 and 1270. This will close normally open contacts 1269, 1276 and will open normally closed contact 1274 to open the circuit to the motor 28 which remains open until the end of the time delay interval when normally closed contact 1270 is opened.

Opening of the motor circuit will cause the entire labeling machine to coast and slow down with the result that in their outward position against the tension of the springs. A stop member 1042 secured to the slide bar is arranged to engage a stop comprising rubber facing secured to the gib 984, as shown, in order to limit the rearward movement of the slide bars. The purpose of the modified structure is twofold. First, in the operation of the wiping mechanism the cylinder 1038 holds the wipers back until the bottles come into alignment with the wipers, and the latter are traveling at the same speed as the bottles whereupon the air pressure holding the slide bar back is released to permit the springs 978 to bring the pads forward with a sudden impact against the bottle to provide a firm pressure against the label. A second purpose of the modified structure is to accommodate bottles having relatively wide labels. In such instances the relative movement of the pads and the bottles into aligned and same speed position might be such that the forward movement of the pads could engage the label on the bottle in a manner such as to effect displacement thereof during relative movement prior to coming into aligned and same speed position. Thus, in order to avoid such premature engagement, the air cylinder 1038 is controlled to hold the wiper pad back to prevent interference with the label until the pad is aligned with the bottle whereupon the air is released from the cylinder to permit engagement of the pad with the bottle. As herein illustrated, see FIG. 36, the air cylinder may be controlled by a cam operated valve 1044 connected to a source of compressed air by a pipe 1046, and connected by a pipe 1048 to the air cylinder 1038. The cam 1050 is mounted on a shaft which rotates once each cycle of operation. The valve is normally open, and the cam is arranged to close the valve to cut off the supply of air to the cylinder 1038 at a time in the cycle when the pad and the bottle come into alignment as described.

After passing through the wiping mechanism 16 where successive groups of bottles receive two pressing operations, as described, the bottles are guided from the lower conveyer 20 onto the discharge conveyer 18. As illustrated in FIG. 41, the discharge conveyer 18 is parallel to but offset from the lower conveyer, and the bottles are guided from the conveyer 20 to the discharge conveyer 18 by guide rails 1054. Immediately prior to being transferred to the discharge conveyer the resiliently mounted bottle engaging units 128 are lifted out of engagement with the tops of the bottles to release the same. This is accomplished by stationary inserts or cam pieces 1056 placed in the ends of the tracks 146 and over which the rollers 375 of the bottle engaging units ride to hold the latter in a raised position.

The discharge conveyer 18 is supported by a bracket 1058 extended from the machine frame, and as herein shown, the conveyer 18 includes a chain link belt 1060 arranged to run over idler sprockets 1062, 1064 at each end of the conveyer, and over a drive sprocket 1066 arranged to engage the lower run of the belt, the latter being held in driving engagement with the drive sprocket by idler sprockets 1068, 1070 as illustrated. The drive sprocket 1066 is fast on a shaft 1072 which is provided with a sprocket 1074 connected by a chain 1076 to a sprocket 1078 fast on a shaft 1080 journaled in a bracket 1082 attached to the side frame 54 of the machine. The shaft 1080 is also provided with a bevel gear 1084 in mesh with a bevel gear 1086 mounted for rotation on a stud 1088 secured in the bracket 1082. The bevel gear 1086 is formed integrally with a sprocket 1090 connected by a chain 1092 to a drive sprocket 1094. The drive sprocket 1094 is formed integrally with the gear 48 mounted for rotation on the shaft 50 and which forms one of the train of gears for driving the upper and lower conveyers 21, 20 as described. In practice the discharge conveyer 18 may be arranged to transfer the bottles onto a packing conveyer, not shown, to be packed into shipping cartons in the usual manner.

Figure 37:
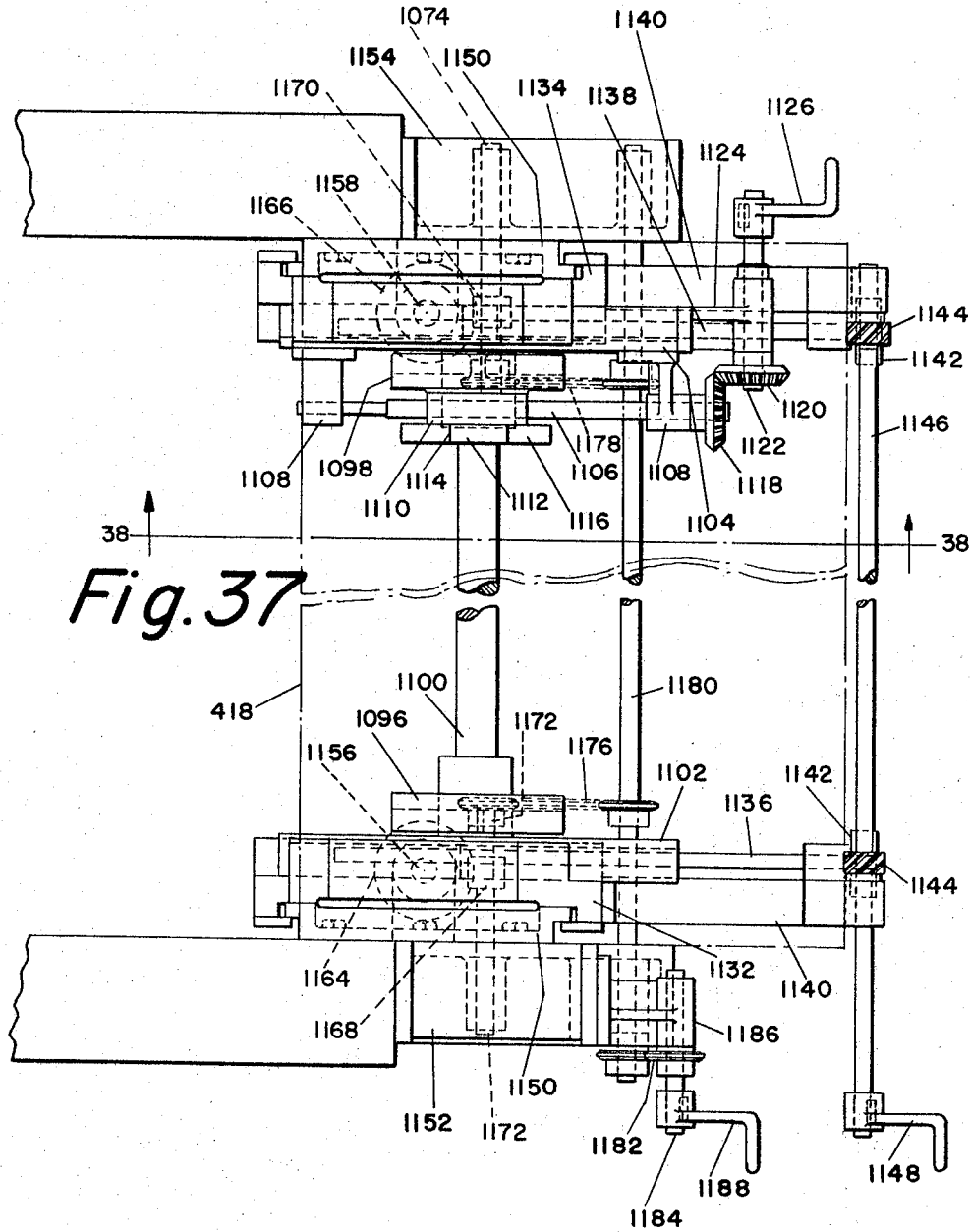
FIG. 37 is a plan view of the tiltable platen adjusting mechanism.
Figure 38:
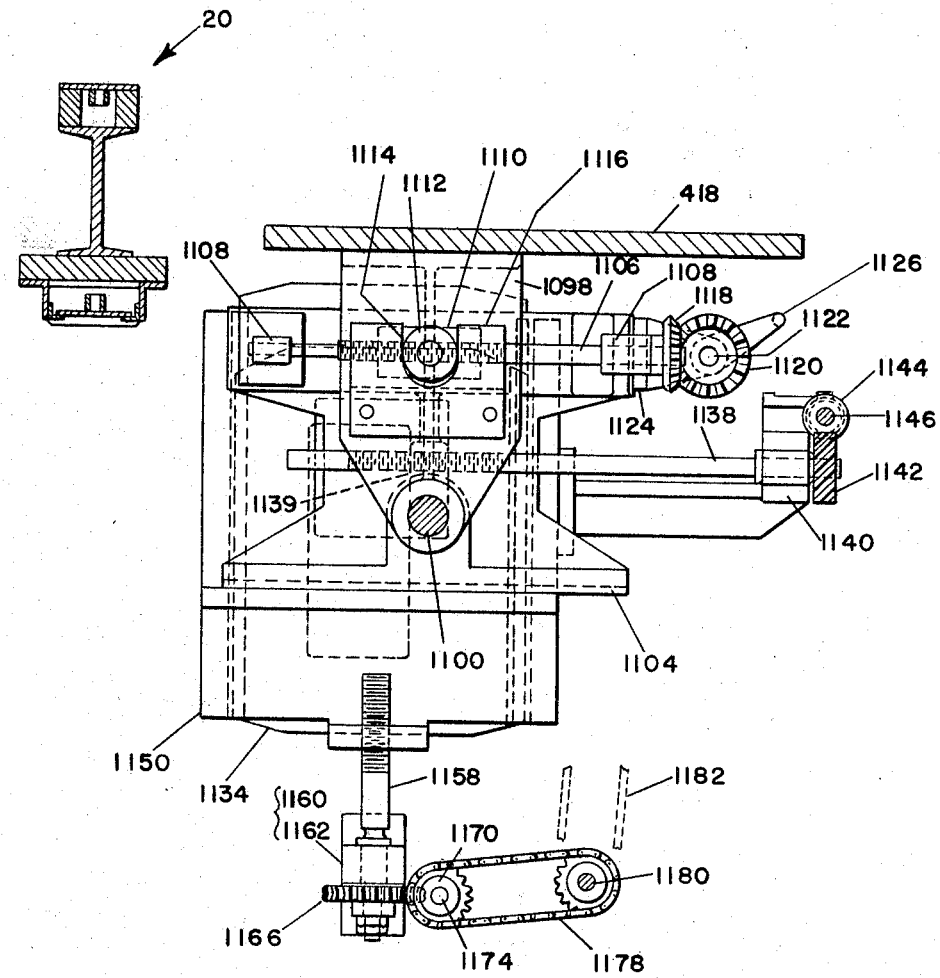
FIG. 38 is a side elevation of the same shown partly in cross section.

In the illustrated embodiment of the invention the platens 416, 418 which support the duplicate operating mechanisms on both sides of the conveyer 20 are horizontally disposed to present the operating mechanisms, which include the centering mechanism 12; the labeling mechanism 14; and the wiping mechanism 16, in a position at right angles to the vertical sides of the illustrated bottle being run. However, when the bottles to be labeled are provided with angular or tapered side walls provision is made for tilting the platens 416, 418 to present the operating mechanisms in a position to cooperate with such tapered or angular faces of the bottles. Provision is also made for adjusting the supporting platens 416, 418 vertically to accommodate bottles of different heights, and for adjusting the platens laterally to accommodate bottles of different widths. FIGS. 37 and 38 illustrate the tilting and adjusting mechanism supporting the platen 418 on one side of the conveyer 20, it being understood that similar mechanism is provided for supporting and adjusting the platen 416 on the other side of the conveyer when both sides of the bottles are to be labeled simultaneously. As herein shown, the platen 418 is supported on spaced tilting brackets 1096, 1098 which are secured at their lower ends to a shaft 1100 pivotally mounted at its ends in spaced laterally adjustable brackets 1102, 1104. In order to rock the tilting brackets 1096, 1098 to present the platen 418 in an angular position the bracket 1098 is provided with adjusting mechanism which includes a threaded rod 1106 supported for rotation in bearing brackets 1108 attached to the laterally adjustable bracket 1104. The rod 1106 extends through and is threadedly engaged with a rectangular nut 1110 having a lateral cylindrical extension on which a roller 1112 is mounted. The roller is engaged in a vertical slot 1114 formed in a bracket 1116 secured to the tilting bracket 1098. The nut 1110 is confined between adjacent faces of the brackets 1116 and 1098 to prevent rotation thereof when the rod 1106 is rotated. The outer end of the threaded rod is provided with a bevel gear 1118 which is in mesh with a bevel gear 1120 fast on one end of a shaft 1122 journaled in a bracket 1124 secured to the laterally adjustable bracket 1104. The other end of the shaft 1122 is provided with a handle 1126 by which the threaded adjusting rod 1106 may be manually rotated through the connections described. The opposed tilting bracket 1096 is keyed to the shaft 1100 and is rocked when the bracket 1098 is adjusted as described. In practice, after an adjustment is made, the bracket 1096 may be adjustably secured to the bracket 1102 in any usual or preferred manner, not shown.

The brackets 1102, 1104 are supported for lateral adjustment in spaced vertically adjustable brackets 1132, 1134. As herein shown, adjustment is accomplished by mechanism including threaded rods 1136, 1138 which are supported for rotation in similar extension brackets 1140 secured to the vertically adjustable brackets 1132, 1134 respectively. The threaded rods 1136, 1138 extend through threaded openings 1139 formed in the brackets 1102, 1104 to be adjusted, and the outer ends of the rods are provided with helical gears 1142 which mesh with helical gears 1144 fast on an elongated shaft 1146 journaled in the brackets 1140. The shaft 1146 is provided with a handle 1148 for manual rotation of the rods 1136, 1138 through the connections described to bodily move the platen 418 toward or away from the bottles on the conveyer 20.

The brackets 1132, 1134 are supported for vertical adjustment in frame members 1150 secured to fixed side frames 1152, 1154, respectively, as shown in FIG. 37. The members 1150 are provided with marginal tongues which are received in marginal grooves formed in the brackets. The lower ends of the brackets 1132, 1134 are provided with threaded openings arranged to receive vertical threaded adjusting screws 1156, 1158 which are supported for rotation in bearing brackets 1160, 1162, respectively, attached to the side frames. The lower ends of the adjusting screws 1156, 1158 are provided with worm gears 1164, 1166 in mesh with worms 1168, 1170, respectively, fast on short shafts 1172, 1174 mounted for rotation in the line of bottles on the conveyer 19 again forms a solid line past jets 1244 and vane 1245 to again open switch 1250 which will denergize relay 1258 and permit opening of normally open contacts 1260, 1267, 1266. However, relay 1268 is still energized through contact 1276 and contact 1270 remains closed until the end of the time interval. At the end of the time interval contact 1270 will open denergizing relay 1272 permitting the normally open contacts 1269, 1276 to open, and permitting normally closed contact 1274 to close, thus completing the circuit to the motor to continue operation of the labeling machine at its normal rate of speed. Opening of contact 1276 will deenergize timing relay 1268. In other words, when the bottles on the conveyer recede to a point forwardly of the sensing device 1240 to effect closing of switch 1250 and energization of relay 1258, relay 1272 is also energized to immediately open the normally closed contact 1274 in the motor circuit, and the circuit to the motor remains open until the time delay relay 1268 operates to open the normally closed contact 1270 to again permit closing of the normally closed contact 1274 in the motor circuit. The purpose of the time delay is to prevent too frequent opening and closing of the motor circuit by the sensing device 1240 so as to permit accumulation of a sufficient number of bottles in a solid line beyond the sensing device 1240 so that the machine will continue its normal operation for a relatively longer period of time. It will be observed that when the bottles accumulate to a point in front of the sensing device 1240 to effect closing of switch 1250, the circuit to the relay 1272 is maintained through contact 1269 until the end of the time delay period when the circuit to the relay 1272 is opened at normally closed contact 1270 to deenergize relay 1272 which will also cause time delay relay 1268 to become deenergized. It will be understood that the circuit to the motor is opened and the machine is allowed to coast for only a relatively short time, about 3 seconds, which is sufficient for the bottles to form a solid line in front of and beyond the sensing device 1240 and that, during normal operation, the machine never comes completely to rest since the circuit to the motor is closed before this occurs.

When the line is running out, as at the end of a day's run, and the solid line recedes toward the intake spider 22 to an extent such as to permit feeler arm 1243 to be spring rocked inwardly, switch 1252 will also be closed, relay 1254 will be energized, and normally closed contact 1248 will be opened to permit closing of the normally closed solenoid valve 238. As a result, air to the cylinder 232 will be cut off, and spring 234 will rock the pawl stop into position to effect disengagement of the one revolution clutch and stopping of the intake spider 22. It will be understood that prior to the line receding to a point to actuate sensing device 1242, the remote sensing device 1240 was actuated to effect closing of switch 1250 and opening of the motor circuit at normally closed contact 1274 to permit the machine to coast as described. Then, at the end of the time interval, the circuit to the motor will be again closed at 1274 to permit the machine to resume its normal speed. Now, since the line is running out, and no more bottles will cause actuation of sensing device 1240, switch 1250 will remain closed and timing relay will remain energized. However, since timing relay 1268 has completed its cycle at this time and is still energized, it will not repeat its cycle unless and until sensing device 1240 is again actuated. Therefore, the motor circuit will remain closed to keep the machine running and complete labeling of the bottles which were permitted to enter the machine prior to stopping of the intake spider 22. Thus, in the operation of modified form of bottle intake it will be seen that under normal operating conditions, the circuit to the motor is opened when the supply begins to lag relative to the demand to permit the machine to coast for a short interval during which time the supply is replenished, and when the supply is replenished, the circuit to the motor is automatically closed to drive the machine at its normal constant rate of speed.

It will be understood that during the continuous operation of the machine, successive cycles of operation, unless otherwise indicated, are related to the passage of groups of three bottles. Thus, during each cycle of operation, a group of three bottles is released into the machine; a group of three bottles is centered and aligned; a group of three bottles have their labels applied; and a group of three bottles have their labels pressed.

Throughout the foregoing specification, and in the claims, it will be understood that whenever the term "bottle" is used, it is intended to include any type of container adapted to be labeled. It will also be noted that the present labeling machine is shown as operating on bottles of rectangular cross section, while some of the diagrammatic views indicate structure for running bottles of circular cross section. It will be understood that when bottles of different cross sections are to be labeled, the various bottle engaging elements throughout the machine may be interchangeably replaced to suit the bottles being run.

From the above description it will be seen that the present invention provides a continuously operated labeling machine capable of applying labels to one or both sides of successive group of bottles each cycle of operation by the direct transfer method during the continuous movement of the bottles through the machine. It will also be seen that the present machine provides novel bottle intake mechanism arranged to assure that successive groups of a predetermined number of bottles are fed into the machine each cycle of operation in accordance with the number of bottles to be labeled whereby to eliminate any control problems resulting from the feeding of a lesser number of bottles each cycle. The present labeling machine also provides novel control mechanism for coordinating the operation of the machine, being driven at a constant rate of speed, with the incoming supply of bottles, being supplied at a slightly slower rate of speed.

The present labeling machine further provides novel structures of bottle spacing, clamping and centering mechanisms to assure proper alignment of successive groups of bottles as they are moved into operative position to the labeling mechanism and further provides novel pneumatically operated control means for preventing withdrawal of labels in the event that a group of bottles to be labeled is absent from the conveyer, and for preventing operation of the adhesive applying mechanism in the event that no labels are provided on the labeling pads. Pneumatically operated controls are also provided for rendering the adhesive applying mechanism inoperative in the event that less than a full complement of labels is withdrawn from the magazines during a cycle of operation. Finally, the present labeling machine provides novel crank operated wiping mechanism modified to maintain pressure against the labels throughout a relatively long distance during the continuous passage of successive groups of bottles therepast.

While the preferred embodiment of the invention has been herein illustrated and described, it will be understood that the invention may be embodied in other forms within the scope of the following claims.

Having thus described the invention, what is claimed is:

1. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for supplying containers in a line, means for releasing successive foremost containers in the line onto said first conveyer, and means for driving said releasing means arranged to assure release of a predetermined number of containers each cycle of operation equal to the number in the group to be labeled.

2. In a cyclically operated labeling machine, in combination, means for supporting and continuously advancing containers in predetermined spaced relation, means for applying labels to a group of a predetermined number of continuously moving spaced containers each cycle of operation, a container supply conveyer for advancing containers in a solid line, means for releasing successive foremost containers in the supply line in timed relation to the label applying means, means for driving said releasing means arranged to assure release a predetermined number of containers equal to a group to be labeled each cycle, said container advancing means traveling at a slightly faster rate of speed than said supply conveyer, and control means including means for automatically disengaging said driving means to stop the releasing means when the supply is diminished and for again engaging said driving means to start the releasing means when the supply is replenished.

3. In a cyclically operated labeling machine, in combination, means for supporting and continuously advancing containers in predetermined spaced relation, labeling mechanism for applying labels to a group of a predetermined number of continuously moving spaced containers each cycle of operation, a container supply conveyer for supporting and advancing containers in a contiguous line, a rotary toothed intake spider for releasing successive foremost containers in said line in timed relation to the operation of the labeling mechanism, means for driving said intake spider including a one revolution clutch and driving connections between the clutch and the spider arranged to rotate the same through a predetermined distance each cycle to release a group of a predetermined number of containers each cycle of operation, and control means responsive to a gap in the contiguous supply line for disengaging said one revolution clutch to discontinue the release of containers into the machine only at the end of a cycle whereby to assure release of a predetermined group of containers each cycle equivalent to a group to be labeled each cycle of operation.

4. The combination as defined in claim 3 wherein the rotary spider is provided with a number of teeth comprising a multiple of the number of containers in a group released each cycle of operation.

5. In a cyclically operated labeling machine, in combination, means for supporting and continuously advancing containers in predetermined spaced relation, means for applying labels to a group of a predetermined number of continuously moving spaced containers each cycle of operation, a container supply conveyer for advancing containers in a solid line, means for releasing successive foremost containers in the supply line in timed relation to the label applying means, means for driving said releasing means arranged to assure release a predetermined number of containers equal to a group to be labeled each cycle, said container advancing means traveling at a slightly faster rate of speed than said supply conveyer, and control means including means for automatically disengaging said driving means to stop the releasing means when the supply is diminished and for again engaging said driving means to start the releasing means when the supply is replenished, said control means including means for detecting a gap in the solid line on said supply conveyer at a point remote from the releasing means for controlling said driving means.

6. In a cyclically operated labeling machine, in combination, means for supporting and continuously advancing containers in predetermined spaced relation, means for applying labels to a group of a predetermined number of continuously moving spaced containers each cycle of operation, a container supply conveyer for advancing containers in a solid line, means for releasing successive foremost containers in the supply line in timed relation to the label applying means, means for driving said releasing means arranged to assure release a predetermined number of containers equal to a group to be labeled each cycle, said container advancing means traveling at a slightly faster rate of speed than said supply conveyer, and control means including means for automatically disengaging said driving means to stop the releasing means when the supply is diminished and for again engaging said driving means to start the releasing means when the supply is replenished, said control means including a detecting element disposed along the supply conveyer at a point remote from said releasing means, and a second detecting element disposed at a point adjacent said releasing means, the space between said detecting elements providing a reservoir of containers, actuation of said remote detecting element upon diminution of the line being ineffective to stop the releasing means until the line is further diminished to also actuate the adjacent detecting element whereby the machine may continue in operation until the reservoir is depleted.

7. The combination as defined in claim 6 wherein the detecting elements are ineffective to start the releasing means upon passage of the incoming containers in spaced relation, actuation of the adjacent detecting element by the partially accumulated solid line being likewise ineffective to start the releasing means until the solid line is extended to also activate the remote detecting element whereby to accumulate a solid line of bottles in the reservoir before initiating operation of the releasing means.

8. The combination as defined in claim 7 wherein the means for engaging and disengaging said driving means includes an air circuit having a solenoid operated air valve, and an electrical circuit actuated by said detecting elements for controlling said solenoid operated valve.

9. The combination as defined in claim 8 wherein the air circuit includes a manually operated valve for controlling said driving means.

10. In a cyclically operated labeling machine, in combination, means for supporting and continuously advancing containers in predetermined spaced relation, labeling mechanism for applying labels to a group of a predetermined number of continuously moving spaced containers each cycle of operation, a container supply conveyer for supporting and advancing containers in a contiguous line, an intake spider for releasing successive foremost containers in said line, means for driving said intake spider including a one revolution clutch arranged to rotate the spider through a predetermined distance each cycle to release a group of a predetermined number of containers each cycle of operation, and control means responsive to a gap in the contiguous supply line for automatically disengaging said one revolution clutch to discontinue release of containers into the machine only at the end of a cycle whereby to assure release of a group to be labeled each cycle and for again engaging said clutch to resume release of successive containers upon closing of the gap in the line.

11. The combination as defined in claim 10 wherein the drive to said spider includes a separable driving connection arranged to be separated in the event of a jam such as to discontinue rotation of the spider, said separable driving connection being again engaged in its initial relationship to the drive when the cause of the jam is removed.

12. The combination as defined in claim 10 wherein the drive to said spider includes a separable driving connection arranged to be separated in the event of a jam such as to discontinue rotation of the spider, and means responsive to separation of said driving connection for terminating operation of the machine.

13. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for feeding containers in a line, a toothed spider for releasing successive foremost containers in the line onto said first conveyor, and means for driving said spider arranged to assure release of a predetermined number of containers each cycle of operation equal to the number in the group to be labeled.

14. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for feeding containers in a line, a toothed spider for releasing successive foremost containers in the line onto said first conveyor, the number of teeth in said spider comprising a multiple of the number of containers released each cycle, and means including a one revolution clutch for driving said spider arranged to effect rotation of the spider through a predetermined distance each cycle to assure release of a predetermined number of containers each cycle equal to the number in the group to be labeled.

15. In a machine of the character described, in combination, a first conveyer for supporting and continuously advancing containers in predetermined spaced relation, a supply conveyer for advancing containers in a solid line to said first conveyer, means for releasing successive foremost containers in the supply line on said first conveyer, disengageable means for driving said releasing means, said first conveyer traveling at a slightly faster rate of speed than said supply conveyer, and control means for automatically disengaging said driving means to stop the releasing means when the supply is diminished and for engaging said driving means to start the releasing means when the supply is again replenished, said control means including two detecting elements, one detecting element being disposed remote from the releasing means, the other detecting element being disposed adjacent the releasing means, the space between said detecting elements comprising a reservoir, said remote detecting element being ineffective to stop the releasing means upon initial diminution of the supply until the adjacent detecting element is actuated by a further diminution of the supply, whereby the releasing means operates to deplete the containers in said reservoir before coming to rest.

16. In a cyclically operated labeling machine, in combination, a first conveyer for supporting and continuously advancing containers in predetermined spaced relation at a constant and uniform speed, labeling mechanism for applying labels to a group of a predetermined number of spaced containers each cycle of operation, a supply conveyer for feeding containers in a continuous line, means for releasing successive foremost containers in the line in timed relation to the labeling machine, means for driving said releasing means arranged to assure release a predetermined number of containers each cycle equal to the number of containers to be labeled, said first conveyer traveling at a slightly faster rate of speed than said supply conveyer, and control means for coordinating the operation of the labeling machine with said supply including an electrical circuit and a motor in said circuit for driving the labeling machine including said first conveyer, means for detecting a diminution in the supply on said supply conveyer, and means responsive to said detecting means when a diminution in the supply is detected for temporarily opening the motor circuit to permit the labeling machine to decelerate for a predetermined time sufficient to allow replenishment of containers on the supply conveyer whereupon the circuit to the motor is again closed and the machine accelerated to a constant and uniform speed, said circuit including a time delay relay for maintaining the motor circuit open for said predetermined time.

17. The combination as defined in claim 16 wherein the detecting means includes two spaced detecting elements preceding said releasing means, one remote from said releasing means, the other adjacent said releasing means, said remote detecting element effecting opening of said motor circuit when a diminution in the supply is detected at said remote point, said time delay effecting closing of the motor circuit after a predetermined time interval, said adjacent detecting element effecting disengagement of the drive to said releasing means when the line recedes from said adjacent point.

18. In a machine of the character described, in combination, a first conveyer for supporting and continuously advancing containers in predetermined spaced relation, a supply conveyer for advancing containers in a solid line to said first conveyer, means for releasing successive foremost containers in said supply line on said first conveyer, means for driving said first conveyer at a slightly faster rate of speed than said supply conveyer, and control means for coordinating the speed of said first conveyer with the supply including an electrical circuit and a motor in said circuit for driving said first conveyer, means for detecting a diminution in the supply on said supply conveyer, and means responsive to said detecting means when a diminution in the supply is detected for temporarily opening the motor circuit to permit the first conveyer to decelerate for a predetermined time sufficient to allow replenishment of containers on the supply conveyer whereupon the circuit to the motor is again closed and the conveyer accelerated to a constant and uniform speed.

19. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, and a helical feed screw cooperating with said spider for spacing the containers in said predetermined spaced relation, said feed screw having an increasing pitch at its entrance end and having a constant pitch at its discharge end.

20. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, a helical feed screw cooperating with said spider for spacing the containers in said predetermined spaced relation, an upper conveyer driven in timed relation to said first conveyer and provided with spaced clamping elements engageable with the tops of successive spaced containers during the continuous movement thereof, means for centering the continuously moving spaced containers on said first conveyer for subsequent alignment with said labeling mechanism, and means for temporarily lifting the spaced clamping elements from clamping engagement with the tops of the containers during the centering operation.

21. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, a helical feed screw cooperating with said spider for spacing the containers in said predetermined spaced relation, an upper conveyer driven in timed relation to said first conveyer and provided with spaced clamping elements engageable with the tops of successive spaced containers during the continuous movement thereof, and means preceding the labeling mechanism and engageable with opposed sides of said continuously moving containers for centering the spaced containers on said conveyer to assure subsequent alignment with said labeling mechanism.

22. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, a helical feed screw cooperating with said spider for spacing the containers in said predetermined spaced relation, means preceding the labeling mechanism and engageable with opposed sides of said continuously moving containers for centering the spaced containers on said conveyer to assure subsequent alignment with said labeling mechanism, said centering means including longitudinally reciprocable supporting members, and laterally reciprocable container engaging elements carried by said longitudinally reciprocable supporting members.

23. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, a helical feed screw cooperating with said spider for spacing the containers in said predetermined spaced relation, an upper conveyer driven in timed relation to said first conveyer and provided with spaced clamping elements engageable with the tops of successive spaced containers during the continuous movement thereof, said upper conveyer comprising a chain, and said spaced clamping elements being individually and resiliently mounted on said chain for resilient engagement with successive individual spaced containers.

24. The combination as defined in claim 23 which includes means for guiding the lower run of the chain in a fixed horizontal plane, said clamping elements being mounted for vertical movement relative to the lower run of the chain.

25. The combination as defined in claim 24 which includes means for centering the spaced bottles on the conveyer, and means for elevating said clamping elements during the centering operation while the chain remains in its fixed horizontal plane.

26. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, a helical feed screw cooperating with said spider for spacing the containers in said predetermined spaced relation, an upper conveyer driven in timed relation to said first conveyer and provided with spaced clamping elements engageable with the tops of successive spaced containers during the continuous movement thereof, said conveyer comprising a chain having a plurality of spaced resilient clamping elements engageable with the tops of successive spaced containers, guide means for supporting the chain, and elongated tracks for guiding the resilient clamping elements arranged to effect lowering of successive clamping elements onto successive spaced containers, and to effect raising of the clamping elements at the discharge end of the machine.

27. In a cyclically operated labeling machine, in combination, a conveyer for continuously advancing containers in predetermined spaced relation, labeling mechanism for applying labels to successive groups of a predetermined number of continuously moving spaced containers each cycle of operation, a container supply conveyer for advancing containers in a line to said first conveyer, a rotary spider for releasing successive foremost containers in the line on said first conveyer, a helical feed screw cooperating with said spider for spacing the containers in said predetermined spaced relation, an upper conveyer driven in timed relation to said first conveyer and provided with spaced clamping elements engageable with the tops of successive spaced containers during the continuous movement thereof, said conveyer comprising a chain having a plurality of spaced resilient clamping elements engageable with the tops of successive spaced containers, guide means for supporting the chain, elongated tracks for guiding the resilient clamping elements arranged to effect lowering of successive clamping elements onto successive spaced containers, and to effect raising of the clamping elements at the discharge end of the machine, means for centering the spaced containers on said first conveyer, and means for lifting said resilient clamping elements during the centering operation comprising vertically movable portions of said tracks.

28. In a cyclically operated labeling machine, in combination, a conveyer for supporting and continuously advancing containers in a predetermined spaced relation, labeling mechanism for applying labels to a group of a predetermined number of continuously moving spaced containers each cycle of operation, a container supply conveyer for supporting and advancing containers in a contiguous line, means for releasing successive foremost containers in the supply line in timed relation to the operation of the labeling mechanism, means for driving said releasing means to release a predetermined number of containers each cycle of operation equal to a group to be labeled, a helical feed screw cooperating with said releasing means for spacing the containers on said continuously moving first conveyer in said predetermined spaced relation, said labeling mechanism having a plurality of labeling pads spaced to correspond to the spacing of the containers, and means for centering the continuously moving spaced containers on said first conveyer prior to the labeling operation to assure subsequent alignment of the containers with said spaced labeling pads.

29. In a cyclically operated labeling machine, means for supporting and continuously advancing containers in uniformly spaced relation and in groups of a predetermined number of containers each cycle, and means for applying labels to successive continuously moving groups of containers each cycle comprising an intermittently operated rotary turret, a radially extensible support at each point in the turret, and a longitudinally reciprocable bar having a plurality of suction pads carried by each of said radially extensible supports, said pads being adapted for direct transfer of the labels to the containers.

30. In a cyclically operated labeling machine, means for supporting and continuously advancing containers in uniformly spaced relation and in groups of a predetermined number of containers each cycle, means for applying labels to successive continuously moving groups of containers each cycle comprising an intermittently operated rotary turret, a radially extensible support at each point in the turret, and a longitudinally reciprocable bar having a plurality of suction pads carried by each of said radially extensible supports, means for moving the radially extensible support to present the label carrying suction pads into label applying engagement with the containers, and means for moving the longitudinally reciprocable suction pads along with and at the same speed as the containers to apply the labels directly to successive groups of containers each cycle of operation.

31. In a cyclically operated labeling machine, means for supporting and continuously advancing containers in uniformly spaced relation and in groups of a predetermined number of containers each cycle, and means for applying labels to successive continuously moving groups of containers each cycle comprising a rotary turret, a plurality of radially extensible supports mounted on and movable with the turret, and a longitudinally reciprocable bar having a plurality of suction pads carried by each of said radially extensible supports, a plurality of label magazines aligned with the suction pads at one station in the path of movement of the turret, adhesive applying mechanism operative to apply adhesive to the labels, said labels being directly applied to a group of containers at another station.

32. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station of the turret, and a longitudinally reciprocable bar having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels withdrawn by the suction pads, said labels being applied to a group of containers at another station, and means for simultaneously extending the radially mounted suction pads at the label withdrawing station and the label applying station to effect withdrawal of labels and direct application of previously withdrawn labels respectively each cycle of operation.

33. The combination as defined in claim 32 which includes means for centering the spaced containers on the conveyer prior to the labeling operation, said centering means comprising a longitudinally reciprocable supporting member, and means connecting said supporting member to the means for moving the suction pads longitudinally.

34. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a longitudinally reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels withdrawn by the suction pads during movement of the turret, said labels being applied to a group of containers at a label applying station, a source of suction communicating with said suction pads, and means for controlling the suction to effect withdrawal of the labels from the magazines, said suction being maintained to hold the labels against the pads during the adhesive applying operation and until the pads arrive at the label applying station, said control means including means for discontinuing the suction at said label applying station and for directing a surge of air under pressure to said pads to release the labels at said label applying station.

35. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a longitudinally reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels during movement of the turret, said labels being applied to a group of containers at another station of operation, a source of suction communicating with said suction pads, and means for controlling the suction to effect withdrawal of the labels from the magazines and to maintain the suction to the pads until they arrive at the labeling station, gripper means carried by the turret for engaging the leading edge of each label carried by the pads to prevent displacement thereof, and means for operating said grippers to engage the labels when they are withdrawn at said withdrawing station, and to release the labels at said applying station.

36. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a longitudinally reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels withdrawn by the suction pads, said labels being applied to a group of containers at another station of operation, a source of suction communicating with said suction pads, and means for controlling the suction to effect withdrawal of the labels from the magazines and to maintain the suction to the pads until they arrive at the labeling station, said control means including cyclically operated means for detecting the presence of a group of continuously advancing containers at a point preceding the labeling mechanism, and means responsive to said detecting means for discontinuing the suction to the pads at the label withdrawing station in the event that said group is absent at said point whereby to prevent withdrawal of labels during such cycle.

37. In a cyclically operated labeling machine, means for supporting and continuously advancing containers in groups of a predetermined number of containers each cycle, and means for applying labels to successive continuously moving groups of containers each cycle comprising a rotary turret, a radially extensible support at each station of the turret, and a reciprocable member having a plurality of suction pads carried by each of said radially extensible supports, a plurality of label magazines aligned with the suction pads at one station of the turret comprising the label withdrawing station, adhesive applying mechanism operative to apply adhesive to the labels withdrawn by the suction pads during movement of the turret, said labels being applied to a group of containers at another station of operation, a source of suction communicating with said suction pads, and means for controlling the suction to effect withdrawal of the labels from the magazines and to maintain the suction to the pads until they arrive at the labeling station, said control means including means for detecting the presence of a full set of labels on said labeling pads, and means responsive to said detecting means for discontinuing the suction in the event that less than a full set of labels is withdrawn, the presence of less than a full set of labels on said pads being detected by a loss of suction at the pad from which a label is missing.

38. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a longitudinally reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels, said labels being directly applied to a group of containers at another station of operation, a source of suction communicating with said suction pads, and means for controlling the suction to effect withdrawal of the labels from the magazines and to maintain the suction to the pads until they arrive at the labeling station, said control means including a cyclically operated means for detecting the presence of a group of continuously advancing containers at a point preceding the labeling mechanism, and means responsive to said detecting means for discontinuing the suction to the pads at the label withdrawing station in the event that said group is absent at said point whereby to prevent withdrawal of labels during such cycle, and means for preventing operation of the adhesive applying means when no labels are present on the suction pads.

39. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a radially reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels, said labels being directly applied to a group of containers at another station of operation, a source of suction communicating with said suction pads, and means for controlling the suction to effect withdrawal of the labels from the magazines and to maintain the suction to the pads until they arrive at the labeling station, said control means including means for detecting the presence of a full set of labels on said labeling pads, and means responsive to said detecting means for discontinuing the suction in the event that less than a full set of labels is withdrawn, and means for preventing operation of the adhesive applying mechanism in the event that less than a full set of labels are present on the suction pads.

40. The combination as defined in claim 39 wherein corresponding labeling mechanisms are provided for applying labels to opposite sides of the containers, and wherein the control means is operative to render inoperative the adhesive applying mechanisms of both labeling mechanisms in the event that less than a full set of labels is present on the suction pads of one labeling mechanism.

41. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a longitudinally reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels, said labels being applied to a group of containers at another station of operation, said magazines being disposed above the turret, a support for said magazines, said support being pivotally mounted to permit rocking of the same to provide access to the turret.

42. In a cyclically operated labeling machine, means for supporting and continuously advancing containers in groups of a predetermined number of containers each cycle, and means for applying labels to successive continuously moving groups of containers each cycle comprising an intermittently operated rotary turret, a radially extensible support at each station in the turret, and a longitudinally reciprocable member having a plurality of suction pads carried by each of said radially extensible supports, a plurality of label magazines aligned with the suction pads at one station of the intermittently operated turret comprising the label withdrawing station, adhesive applying mechanism operative to apply adhesive to the labels withdrawn by the suction pads during movement of the turret, said labels being applied to a group of containers at another station of operation, said adhesive applying means including a supply roll, a plurality of rocker arms, an applying roller carried by each rocker arm, and means for rocking said arms to present the rollers from a position against the supply roll into the path of the label carrying suction pads to apply the adhesive to the labels each cycle of operation, and means for mounting the rollers in said arms to permit axial rocking of the rollers and self-alignment with the surfaces of the suction pads during the adhesive applying operation.

43. In a cyclically operated labeling machine, means for supporting and continuously advancing containers in groups of a predetermined number of containers each cycle, means for applying labels to successive continuously moving groups of containers each cycle including an intermittently rotated turret, a radially extensible support at each station of the turret, a longitudinally reciprocable member having a plurality of suction pads carried by each support, a plurality of label magazines from which labels are withdrawn by said suction pads at one station of operation, means for applying adhesive to the labels during movement of the turret, said labels being directly applied to a group of continuously moving containers at another station of operation, means including a rocker cam for reciprocating said radially extensible supports, gripper means carried by the turret for engaging the leading edge of each label, and a cam piece carried by said rocker cam for operating said gripper means to effect gripping of the labels at the withdrawing station and to effect release of the grippers prior to arrival at said labeling station.

44. In a cyclically operated labeling machine, in combination, means for supporting and continuously advancing containers in predetermined spaced relation, means for applying labels to a group of a predetermined number of continuously moving spaced containers each cycle including an intermittently operated turret, and groups of spaced labeling pads carried by the turret, means for cyclically indexing said turret to present successive groups of spaced pads in position to apply labels to successive groups of containers each cycle, and means for locking the turret in its indexed position at the end of each indexing movement.

45. In a cyclically operated labeling machine, in combination, means for supporting and continuously advancing containers in predetermined spaced relation, labeling mechanism for applying labels to a group of a predetermined number of continuously moving spaced containers each cycle of operation, a container supply conveyer for feeding containers in a line, means for releasing successive foremost containers in the supply line onto said advancing means arranged to assure release a predetermined number of containers each cycle equal to the group to be labeled, means cooperating with said releasing means for spacing the containers in said predetermined spaced relation, means for centering the continuously moving spaced containers prior to the labeling operation, and container wiping means for pressing the applied labels against succesive groups of continuously moving containers each cycle of operation.

46. In a cyclically operated labeling machine, in combination, means for supporting and continuously advancing containers in predetermined spaced relation, means for applying labels to a group of a predetermined number of continuously moving spaced containers each cycle of operation, and container wiping means for pressing the applied labels against successive groups of continuously moving spaced containers each cycle, said wiping means comprising a table mounted for transverse and longitudinal movement, a plurality of resiliently mounted wiping pads carried by said table, and modified crank operated means for moving said table to present the wiping pads into engagement with and to travel along with successive groups of continuously moving containers whereby to maintain the wiping pads in firm pressing engagement with the containers for a relatively long time each cycle, said modified crank means including a pair of spaced and radially slotted crank arms rotated at a constant and uniform angular velocity in timed relation to the movement of the bottles, a pair of crank pins secured to the table and having portions cooperating with said radial slots, and stationary cams having cam paths into which said pins are extended to produce said modified movement upon rotation of the crank arms.

47. The combination as defined in claim 46 wherein each cam path is arranged to move its crank pin radially inwardly during an initial portion of its modified movement to produce uniform longitudinal components equal to the speed of and parallel to the container movement, and to move its crank pin radially outwardly during a succeeding portion of its modified movement to continue the uniform longitudinal components equal to the speed of and parallel to the container movement.

48. The combination as defined in claim 46 wherein the crank pins are moved radially in said slotted crank arms to produce uniform longitudinal components equal to the speed of and parallel to the container movement during the wiping operation.

49. The combination as defined in claim 48 wherein the resilient wiping pads are spring urged toward their respective containers as they approach and come into contacting alignment therewith.

50. The combination as defined in claim 49 wherein provision is made for restraining the forward movement of said wiping pads during their approach into alignment until the pads arrive in alignment with their respective containers whereupon the pads are released to engage the bottles.

51. In a cyclically operated labeling machine, in combination, means for supporting and continuously advancing containers in predetermined spaced relation, labeling mechanism for applying labels to a group of a predetermined number of continuously moving spaced containers each cycle of operation, a container supply conveyer for feeding containers in a line, means for releasing successive foremost containers in the supply line onto said advancing means arranged to assure release a predetermined number of containers each cycle equal to the group to be labeled, means cooperating with said releasing means for spacing the containers in said predetermined spaced relation, means for centering the continuously moving spaced containers prior to the labeling operation, and container wiping means for pressing the applied labels against successive groups of continuously moving containers each cycle of operation, and an adjustable and tiltable platen on which said centering, labeling and wiping operating mechanisms are mounted and means for adjusting said platen to accommodate containers of different heights and widths, and containers having angular faces to be labeled.

52. The combination as defined in claim 51 wherein the adjusting means comprises supporting side frames mounted for vertical adjustment, laterally adjustable brackets carried by said side frames, and pivotally mounted brackets carried by said laterally adjustable brackets and on which said platen is secured, said pivotally mounted brackets arranged to be adjustably rocked to present the operating mechanisms carried by the platen at right angles to the faces of the containers to be operated on.

References Cited

UNITED STATES PATENTS

| | | | |
|---|---|---|---|
| 2,494,186 | 1/1950 | Magnusson | 271—32 |
| 2,638,202 | 5/1953 | Carter | 156—493 |
| 2,725,156 | 11/1955 | Manas | 156—566 |
| 2,878,919 | 3/1959 | Jones | 198—34 |
| 2,940,630 | 6/1960 | Carter | 156—352 |

EARL M. BERGERT, *Primary Examiner.*

J. P. MELOCHE, *Assistant Examiner.*